US007657883B2

(12) United States Patent
Jensen

(10) Patent No.: US 7,657,883 B2
(45) Date of Patent: *Feb. 2, 2010

(54) INSTRUCTION DISPATCH SCHEDULER EMPLOYING ROUND-ROBIN APPARATUS SUPPORTING MULTIPLE THREAD PRIORITIES FOR USE IN MULTITHREADING MICROPROCESSOR

(75) Inventor: Michael Gottlieb Jensen, Cambridgeshire (GB)

(73) Assignee: MIPS Technologies, Inc., Sunnyvale, CA (US)

( * ) Notice: Subject to any disclaimer, the term of this patent is extended or adjusted under 35 U.S.C. 154(b) by 1037 days.

This patent is subject to a terminal disclaimer.

(21) Appl. No.: 11/087,070

(22) Filed: Mar. 22, 2005

(65) Prior Publication Data

US 2006/0206692 A1    Sep. 14, 2006

(51) Int. Cl.
    G06F 9/45    (2006.01)
    G06F 9/30    (2006.01)
(52) U.S. Cl. .................. 717/161; 712/203; 712/205; 712/207
(58) Field of Classification Search ......... 712/206–207, 712/214–215, 203, 205; 717/149, 159, 161
    See application file for complete search history.

(56) References Cited

U.S. PATENT DOCUMENTS

| 4,078,251 | A |   | 3/1978 | Hamilton |
| 4,126,895 | A |   | 11/1978 | Weemaes et al. |
| 4,924,380 | A |   | 5/1990 | McKinney et al. |
| 5,095,460 | A |   | 3/1992 | Rodeheffer |
| 5,276,887 | A |   | 1/1994 | Haynie |
| 5,309,382 | A |   | 5/1994 | Tamura et al. |
| 5,357,512 | A |   | 10/1994 | Khaira et al. |
| 5,528,513 | A |   | 6/1996 | Vaitzblit et al. |
| 5,546,554 | A |   | 8/1996 | Yung et al. |
| 5,570,356 | A | * | 10/1996 | Finney et al. ............... 370/476 |
| 5,734,877 | A |   | 3/1998 | Ries et al. |
| 5,745,778 | A |   | 4/1998 | Alfieri |

(Continued)

FOREIGN PATENT DOCUMENTS

DE    10110504    10/2001

(Continued)

OTHER PUBLICATIONS

Ooi et al. "Multiplex: Unifying Conventional and Speculative Thread-Level Parallelism on a Chip Multiprocessor", Jun. 2001, ACM, pp. 368-380.*

(Continued)

*Primary Examiner*—Anna Deng
(74) *Attorney, Agent, or Firm*—Sterne, Kessler, Goldstein & Fox PLLC

(57) ABSTRACT

A dispatch scheduler in a multithreading microprocessor is disclosed. Each of N concurrently executing threads has one of P priorities. P N-bit round-robin vectors are generated, each being a 1-bit left-rotated and subsequently sign-extended version of an N-bit 1-hot input vector indicating the last thread selected for dispatching at the priority. N P-input muxes each receive a corresponding one of the N bits of each of the P round-robin vectors and selects the input specified by the thread priority. Selection logic selects an instruction for dispatching from the thread having a dispatch value greater than or equal to any of the threads left thereof in the N-bit input vectors. The dispatch value of each of the threads comprises a least-significant bit equal to the corresponding P-input mux output, a most-significant bit that is true if the instruction is dispatchable, and middle bits comprising the priority of the thread.

24 Claims, 30 Drawing Sheets

U.S. PATENT DOCUMENTS

| | | | |
|---|---|---|---|
| 5,793,993 | A | 8/1998 | Broedner et al. |
| 5,832,278 | A | 11/1998 | Pham |
| 5,860,000 | A | 1/1999 | Biswas et al. |
| 5,898,694 | A | 4/1999 | Ilyadis et al. |
| 5,913,049 | A | 6/1999 | Shiell et al. |
| 5,938,742 | A | 8/1999 | Faddell et al. |
| 5,941,980 | A * | 8/1999 | Shang et al. ............... 712/204 |
| 6,032,218 | A | 2/2000 | Lewin et al. |
| 6,073,159 | A | 6/2000 | Emer et al. |
| 6,076,157 | A | 6/2000 | Borkenhagen et al. |
| 6,094,435 | A | 7/2000 | Hoffman et al. |
| 6,101,193 | A | 8/2000 | Ohba |
| 6,105,051 | A | 8/2000 | Borkenhagen et al. |
| 6,105,053 | A | 8/2000 | Kimmel et al. |
| 6,105,127 | A | 8/2000 | Kimura et al. |
| 6,163,827 | A | 12/2000 | Viswanadham et al. |
| 6,170,051 | B1 | 1/2001 | Dowling |
| 6,212,544 | B1 | 4/2001 | Borkenhagen et al. |
| 6,237,081 | B1 | 5/2001 | Le et al. |
| 6,272,520 | B1 | 8/2001 | Sharangpani et al. |
| 6,272,579 | B1 | 8/2001 | Lentz et al. |
| 6,295,600 | B1 | 9/2001 | Parady |
| 6,385,715 | B1 | 5/2002 | Merchant et al. |
| 6,389,449 | B1 | 5/2002 | Nemirovsky et al. |
| 6,434,155 | B1 | 8/2002 | Jones et al. |
| 6,470,016 | B1 | 10/2002 | Kalkunte et al. |
| 6,477,562 | B2 | 11/2002 | Nemirovsky et al. |
| 6,516,369 | B1 | 2/2003 | Bredin |
| 6,542,921 | B1 * | 4/2003 | Sager ........................ 718/108 |
| 6,549,930 | B1 | 4/2003 | Chrysos et al. |
| 6,556,571 | B1 | 4/2003 | Shahrier et al. |
| 6,563,818 | B1 | 5/2003 | Sang et al. |
| 6,567,839 | B1 | 5/2003 | Borkenhagen et al. |
| 6,609,190 | B1 | 8/2003 | Kahle et al. |
| 6,633,939 | B2 | 10/2003 | Butta' et al. |
| 6,647,449 | B1 | 11/2003 | Watts |
| 6,658,447 | B2 | 12/2003 | Cota-Robles |
| 6,665,760 | B1 | 12/2003 | Dotson |
| 6,694,425 | B1 | 2/2004 | Eickemeyer |
| 6,721,874 | B1 | 4/2004 | Le et al. |
| 6,754,736 | B1 | 6/2004 | Ogawa et al. |
| 6,792,446 | B2 | 9/2004 | Merchant et al. |
| 6,810,426 | B2 | 10/2004 | Mysore et al. |
| 6,868,529 | B1 | 3/2005 | Frannhagen |
| 6,918,116 | B2 | 7/2005 | Ang |
| 6,971,103 | B2 * | 11/2005 | Hokenek et al. ............ 718/107 |
| 6,987,517 | B1 | 1/2006 | Donovan et al. |
| 7,007,153 | B1 | 2/2006 | Berenbaum et al. |
| 7,015,913 | B1 | 3/2006 | Lindholm et al. |
| 7,035,997 | B1 * | 4/2006 | Musoll et al. ............... 712/205 |
| 7,051,189 | B2 | 5/2006 | Warnes |
| 7,096,470 | B2 | 8/2006 | Brown et al. |
| 7,120,714 | B2 | 10/2006 | O'Connor et al. |
| 7,149,880 | B2 * | 12/2006 | Kottapalli .................. 712/214 |
| 7,185,178 | B1 | 2/2007 | Barreh et al. |
| 7,269,712 | B2 | 9/2007 | Cho |
| 7,334,086 | B2 | 2/2008 | Hass et al. |
| 7,360,064 | B1 * | 4/2008 | Steiss et al. ................. 712/219 |
| 7,395,414 | B2 * | 7/2008 | Le et al. ..................... 712/216 |
| 7,441,101 | B1 * | 10/2008 | Steiss et al. ................. 712/205 |
| 2002/0062435 | A1 | 5/2002 | Nemirovsky et al. |
| 2002/0083173 | A1 | 6/2002 | Musoll et al. |
| 2002/0087840 | A1 | 7/2002 | Kottapalli |
| 2003/0018686 | A1 | 1/2003 | Kalafatis et al. |
| 2003/0028816 | A1 | 2/2003 | Bacon |
| 2003/0182536 | A1 | 9/2003 | Teruyama |
| 2003/0233394 | A1 | 12/2003 | Rudd et al. |
| 2004/0060052 | A1 | 3/2004 | Brown et al. |
| 2004/0128448 | A1 | 7/2004 | Stark et al. |
| 2004/0139441 | A1 | 7/2004 | Kaburaki et al. |
| 2004/0215944 | A1 | 10/2004 | Burky et al. |
| 2004/0215945 | A1 | 10/2004 | Burky et al. |
| 2004/0215947 | A1 * | 10/2004 | Ward et al. .................. 712/245 |
| 2004/0216105 | A1 | 10/2004 | Burky et al. |
| 2004/0216106 | A1 | 10/2004 | Kalla et al. |
| 2005/0076189 | A1 | 4/2005 | Wittenburg et al. |
| 2005/0138328 | A1 | 6/2005 | Moy et al. |
| 2005/0169304 | A1 * | 8/2005 | Murata ........................ 370/466 |
| 2006/0004989 | A1 | 1/2006 | Golla |
| 2006/0004995 | A1 | 1/2006 | Hetherington et al. |
| 2006/0095732 | A1 | 5/2006 | Tran et al. |
| 2006/0123420 | A1 | 6/2006 | Nishikawa |
| 2006/0168254 | A1 | 7/2006 | Norton et al. |
| 2006/0168393 | A1 | 7/2006 | Christensen et al. |
| 2006/0179194 | A1 | 8/2006 | Jensen et al. |
| 2006/0179274 | A1 | 8/2006 | Jones et al. |
| 2006/0179276 | A1 | 8/2006 | Banerjee et al. |
| 2006/0179279 | A1 | 8/2006 | Jones et al. |
| 2006/0179280 | A1 | 8/2006 | Jensen et al. |
| 2006/0179281 | A1 | 8/2006 | Jensen et al. |
| 2006/0179283 | A1 | 8/2006 | Jensen et al. |
| 2006/0179284 | A1 | 8/2006 | Jensen et al. |
| 2006/0179439 | A1 | 8/2006 | Jones et al. |
| 2006/0206686 | A1 | 9/2006 | Banerjee et al. |
| 2006/0212853 | A1 | 9/2006 | Sutardja |
| 2007/0089112 | A1 | 4/2007 | Jensen |
| 2007/0113053 | A1 | 5/2007 | Jensen et al. |
| 2007/0204137 | A1 | 8/2007 | Tran |
| 2008/0069115 | A1 | 3/2008 | Jensen |
| 2008/0069128 | A1 | 3/2008 | Jensen |
| 2008/0069129 | A1 | 3/2008 | Jensen |
| 2008/0069130 | A1 | 3/2008 | Jensen |
| 2008/0155233 | A1 * | 6/2008 | Ward et al. .................. 712/220 |

FOREIGN PATENT DOCUMENTS

| | | |
|---|---|---|
| EP | 1351117 | 8/2003 |
| WO | WO02/39269 | 5/2002 |

OTHER PUBLICATIONS

Parceisa et al. "Reducing wire delay penalty through value prediction", Dec. 2000, ACM, pp. 1-10.*

"RTOS Operations Put in Hardware IP", Electronic Engineering Times article, posted Jan. 17, 2005 by Ron Wilson. http://www.eetasia.com/article_content.php3?article_id=8800356670.

"A Survey of Processors With Explicit Multithreading", in ACM Computing Surveys, vol. 35, No. 1, Mar. 2003, pp. 29-63 by Theo Ungerer, et al.

"Interleaving: A Multithreading Technique Targeting Multiprocessors and Workstations", from Proceedings of the 6th International Conference on Architectural Support for Programming Languages and Operating Systems, 1994 by Laudon et al.

"Instruction Recycling on a Multiple-Path Processor", in 5th International Symposium on High Performance Computer Architecture, Jan. 1999 by Wallace et al.

MIPS SOC-it 101 System Controller Family User's Manual, MD0163, Rev. 01.05, May 18, 2004, p. 49-50.

MIPS SOC-it 101 System Controller Family Integrator's Guide, MD0162, Rev. 01.03, May 18, 2004, p. 31-35.

MIPS SOC-it 101 System Controller Family Datasheet, MD0164, Rev. 01.04, May 19, 2004, p. 25-26.

Shin et al. "Dynamic Scheduling Issues in SMT Architectures." Parallel and Distributed Processing Symposium, 2003. Apr. 22, 2003. pp. 77-84. XP010645608. ISBN: 0-76950-1926-1.

Fiske et al. "Thread Prioritization: A Thread Scheduling Mechanism for Multiple-Context Parallel Processors." Future Generations Computer Systems, Elsevier Science Publishers. Amsterdam, NL. vol. 11, No. 6, Oct. 1995. pp. 503-518, XP004002214 ISSN: 0167-739X.

Ilhyun et al. "Understanding Sceduling Replay Schemes." High Performance Computer Architecture. 2004. Department of Electrical and Computer Engineering. University of Wisconsin-Madison. Feb. 14, 2004. XP010778841. ISBN: 0-7695-2053-7.

Sigmund et al. "On Speculation Control in Simultaneous Multithreaded Processors." Journal of Universal Computer Science. vol. 7, No. 9. Sep. 28, 2001. pp. 848-868. XP009069084. ISSN 0948-695X.

Hennessy et al. "Computer Architecture—A Quantative Approach, 3rd edition." 2002. Morgan Kaufmann, USA. XP002388271. ISBN: 1558607242. pp. 181-187.

Sazeides, Yiannakis. "Modeling Value Speculation." High-Performance Computer Architecture, 2002. Feb. 2, 2002. pp. 189-200. XP010588723. ISBN: 07695-1525-8.

"Mercury Computer Systems Introduces the MC432 Serial RapidIO Switch With a Breakthrough Feature Set." connectiviyZONE Products for the week of Dec. 12, 2005. Downloaded on Aug. 18, 2006 from http://www.analogzone.com/iop_1212.htm.

"Tundra Launches Industry's First Serial RapidIO Switch." connectivityZONE Products for the week of Feb. 14, 2005. Downloaded on Aug. 18, 2006 from http://www.analogzone.com/iop_0214.htm.

"Tsi568A." Technical Specifications. Tundra Semiconductor Corporation. 2006. Downloaded on Aug. 18, 2006 from http://www.tundra.com/product_detail.aspx?id=1399.

"MC432 8-port Switch Short Datasheet." Revision 1.2. Mercury Computer Systems, Inc. Feb. 7, 2006.

Shen & Lipasti; Modern Processor Design: Fundamentals of Superscalar Processors; 2003; McGraw-Hill Companies, Inc; Beta Edition; pp. 252, 281, 283-285.

Mano & Kime; Logic and Computer Design Fundamentals; 2001; Prentice Hall; Second Edition Updated; p. 119.

Cazorla et al. "DCache Warn: an I-Fetch Policy to Increase SMT Efficiency." 18th International Parallel and Distributed Processing Symposium. Apr. 26, 2004, pp. 74-83. XP002405769 Los Alamitos, CA. USA.

Tullsen et al. "Exploiting Choice: Instruction Fetch and Issue on an Implementable Simultaneous Multithreading Processor." Computer Architecture News, ACM. New York, NY, US. vol. 24, No. 2, May 1, 1996. pp. 191-202, XP000592185. ISSN: 0163-5964 Paragraph 5.2.

Roth et al. "Speculative data-driven multithreading." High-Performance Computer Architecture, 2001. HPCA. The Seventh International Symposium On Monterrey, Mexico Jan. 19-24, 2001, Los Alamitos, CA, USA. IEEE Comput. Soc. US. Jan. 19, 2001. pp. 37-48, XP010531673. ISBN: 0-7695-1019-1.

Wallace et al. "Threaded multiple path execution." Computer Architecture, 1998. Proceedings. The 25th Annual International Symposium on Barcelona. Spain Jun. 27-Jul. 1, 1998. Los Alamitos, CA, USA. IEEE Comput. SOC, US, Jun. 27, 1998. pp. 238-249, XP010291395. ISBN 0-8186-8491-7.

Kreuzinger et al. "Real-time Event-Handling and Scheduling on a Multithreaded Java Microcontroller." Microprocessors and Microsystems, 1PC Business Press LTD. London, GB. vol. 27, No. 1, Feb. 1, 2003, pp. 19-31. XP004404896. ISSN: 0141-9331.

Pouwelse et al. "Energy Priority Scheduling for Variable Voltage Processors." Proceedings of the 2001 International Symposium on Low Power Electronics and Design. ISLPED. Huntington Beach, CA. Aug. 6-7, 2001. pp. 28-33, XP001134578. ISBN: 1-58113-371-5.

MIPS32 Architecture for Programmers, vol. III; The MIPS32 Privileged Resource Architecture. MIPS Technologies, Mar. 12, 2001, pp. 1,2,7,37-39, 49, 53-57. XP002407506.

U.S. Office Action for U.S. Appl. No. 11/086,258, filed Jan. 16, 2007, pp. 1-17 and cover sheet.

Lebeck, A.R. et al. "A Large, Fast Instruction Window for Tolerating Cache Misses." Proceedings. 29th Annual International Symposium on Computer Architecture, 2002. Publication Date: 2002. pp. 59-70.

Shen & Lipasti. "Modern Processor Design: Fundamentals of Superscalar Processors." 2004. McGraw-Hill Companies. p. 259.

Kessler, R.E. "The Alpha 21264 Microprocessor." Compaq Computer Corporation. Mar.-Apr. 1999 IEEE Macro. pp. 24-36.

U.S. Appl. No. 09/616,385, filed Jul. 14, 2000, Musoll et al.

U.S. Appl. No. 09/706,154, filed Nov. 3, 2000, Nemirovsky et al.

"MIPS32 34K Processor Core Family Engingeering Specification", MD 00413, Rev. 02, Feb. 16, 2005.

* cited by examiner

*Instruction/Skid Buffer Operation*

Increased Pipeline Utilization Efficiency Operation

Policy Manager (PM) and
TCSchedule Register Specifying Leaky-Bucket Parameters Dynamically-Allocatable Skid Buffers Dynamically-Allocatable Skid Buffer Operation Single Instruction/Skid Buffer

Fig. 17  Round-Robin Generator
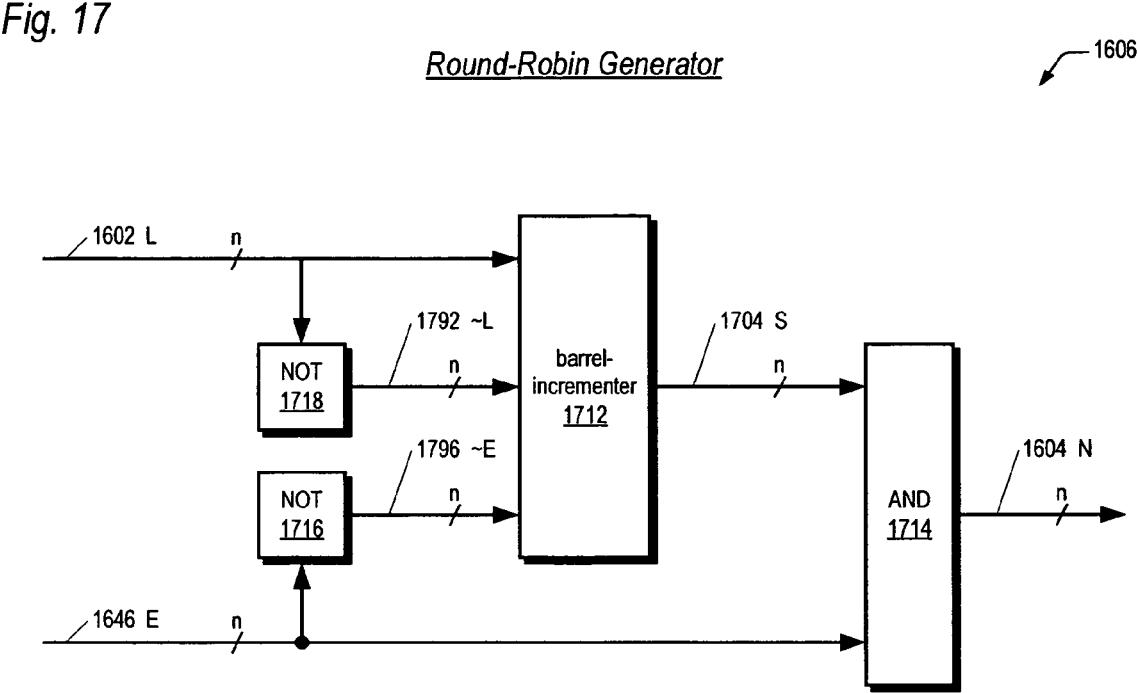
Fig. 18A  Barrel-Incrementer
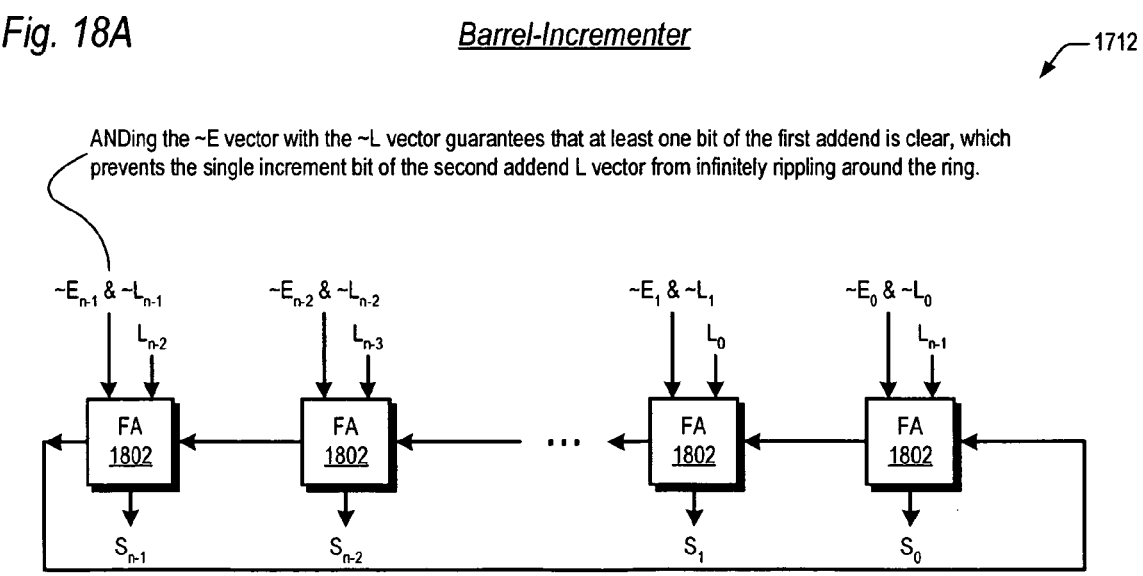

*Fig. 18B*     Optimized Barrel-Incrementer Using Half-Adders
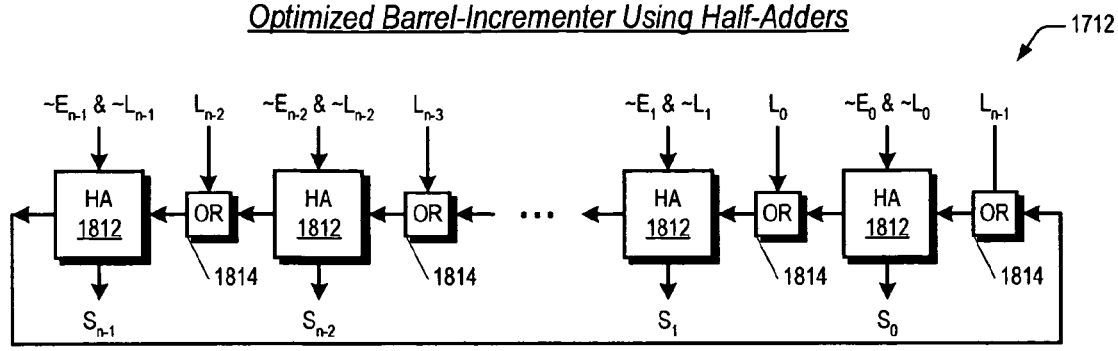
*Fig. 18C*     Dual-Row Barrel-Incrementer
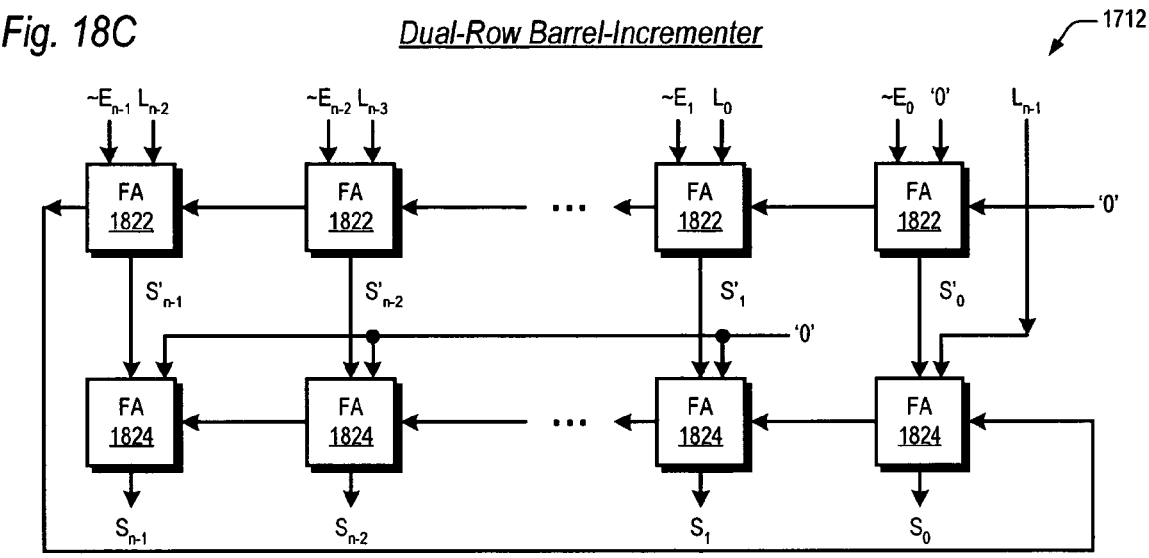
*Fig. 18D*     Optimized Dual-Row Barrel-Incrementer Using Half-Adders
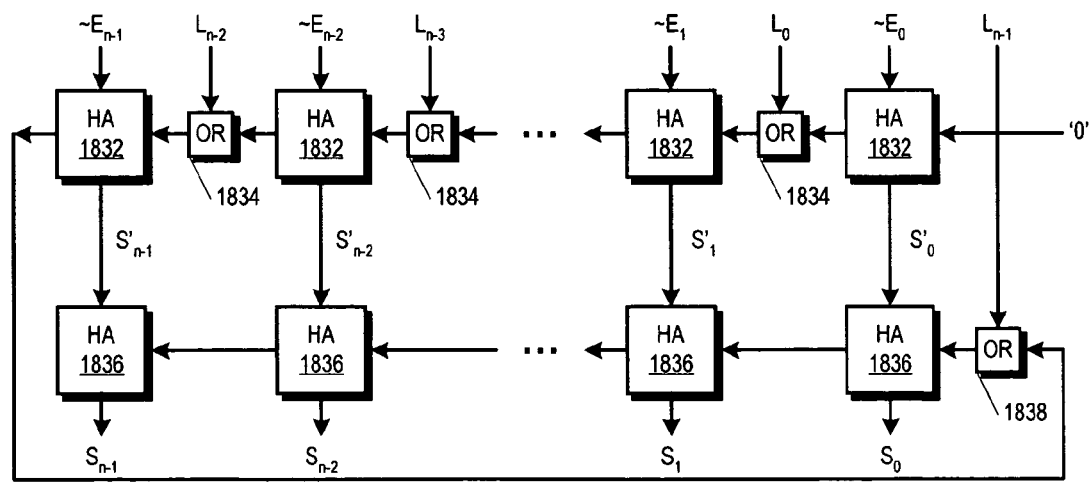

Dispatch Scheduler Example 1

Result: TC 1 is selected for dispatch because it has the greatest DS_TC_priority. Although all TC's are issuable and all are at the same PM_TC_priority 3 (which is highest priority), TC 1 was selected as as the next round-robin TC at priority 3 since TC 0 was the last selected TC at priority 3 and TC 1 was the issuable TC rotatively left of TC 0.

Fig. 19B

Dispatch Scheduler Example 2

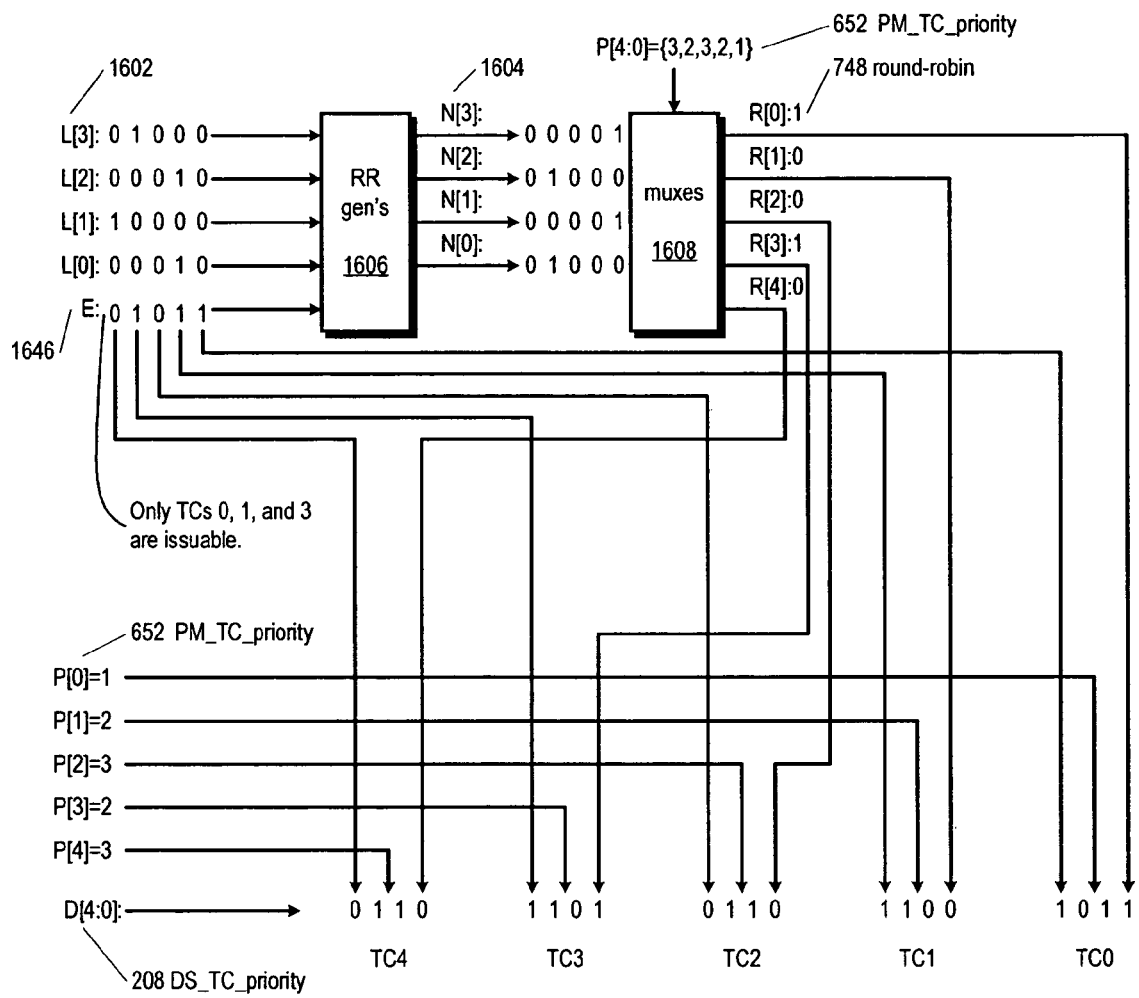

Result: TC 3 is selected for dispatch because it has the greatest DS_TC_priority.
Although TC 1 also is issuable and at the highest PM_TC_priority which has an issuable instruction (priority 2), TC 3 is selected because the round-robin bit is set for TC 3 (not TC 1) at priority 2, since TC 1 was the last selected TC at priority 2 and TC 3 is the next issuable TC rotatively left of TC 1 (since TC 2 is not issuable, i.e., is not enabled to dispatch instructions).
Although the round-robin bit is set for TC 0 because it was selected as the round-robin TC at priority 1, TC 0 is not selected for dispatch because its DS_TC_priority is lower than TC 3 and TC 1.
TC 4 was skipped at priority 3 for round-robin since it was not issuable, and TC 2 was skipped at priorities 2 and 0 for round-robin since it was not issuable.

Dispatch Scheduler (DS) (Alternate Embodiment)

Fig. 21

*Round-Robin Generator*

Advantageously, the round-robin logic of this alternate embodiment does not require knowledge of which threads are issuable for dispatching in order to generate the round-robin indicator indicating the next TC to be selected at the PM_TC_priority level. The combination of the sign-extended N vector in conjunction with the issuable bit and PM_TC_priority level to create a dispatch priority that is used by the greater-than-or-equal comparators insures that the correct round-robin TC is selected.

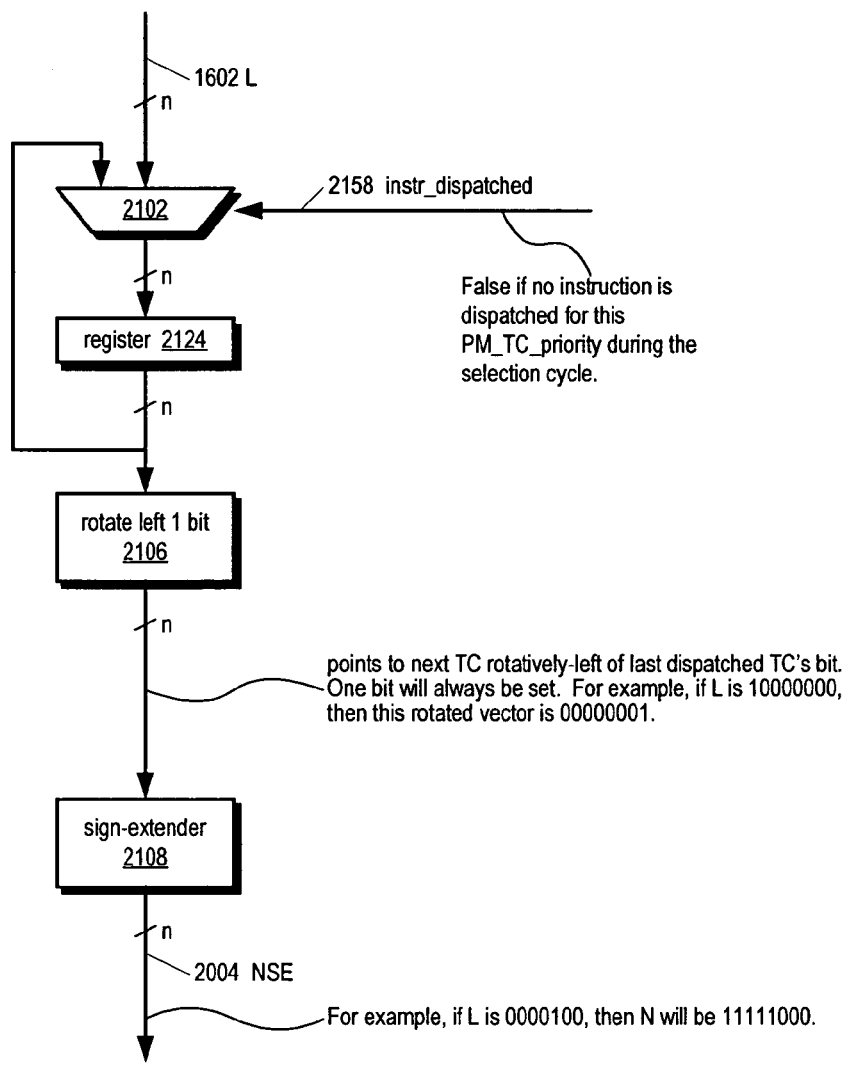

Fig. 22A

Dispatch Scheduler (Alternate Embodiment) Example 1

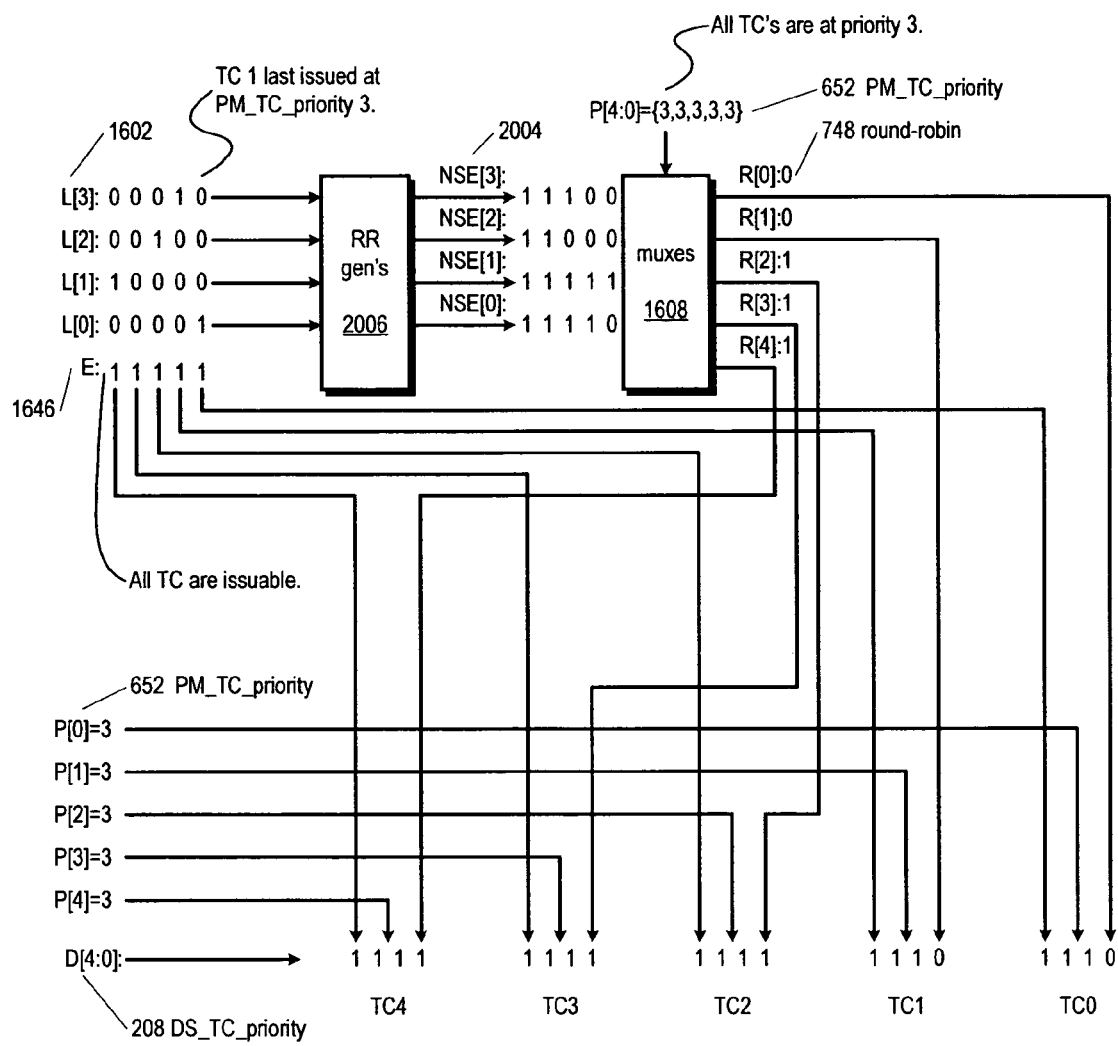

Result: TC 2 is selected for dispatch because it is the highest TC in the instruction selection logic mux tree (i.e., right-most bit in the NSE vector) that has the greatest or equal DS_TC_priority.
Although all TC's are issuable and all are at the same PM_TC_priority 3 (which is highest priority), TC 2 was selected as the next round-robin TC at priority 3 since TC 1 was the last selected TC at priority 3 and TC 2 was the TC rotatively left of TC 1.

Dispatch Scheduler (Alternate Embodiment) Example 2

Result: TC 3 is selected for dispatch because it is the highest TC in the instruction selection logic mux tree (i.e., right-most bit in the NSE vector) that has the greatest or equal DS_TC_priority since TC 2 is not issuable.

Dispatch Scheduler (Alternate Embodiment) Example 3

Result: TC 0 is selected for dispatch because it is the highest TC in the instruction selection logic mux tree (i.e., right-most bit in the NSE vector) that has the greatest or equal DS_TC_priority since TC 2 is not issuable and TC 3 and 4 are at a lower PM_TC_priority.

Dispatch Scheduler (Alternate Embodiment) Example 4

Result: TC 1 is selected for dispatch because it is the highest TC in the instruction selection logic mux tree (i.e., right-most bit in the NSE vector) that has the greatest or equal DS_TC_priority since even though TC 0 and 1 are at the same PM_TC_priority and are issuable, TC 1 is first in the sign-extended NSE vector.

Round-Robin Multithreaded Fetch Director

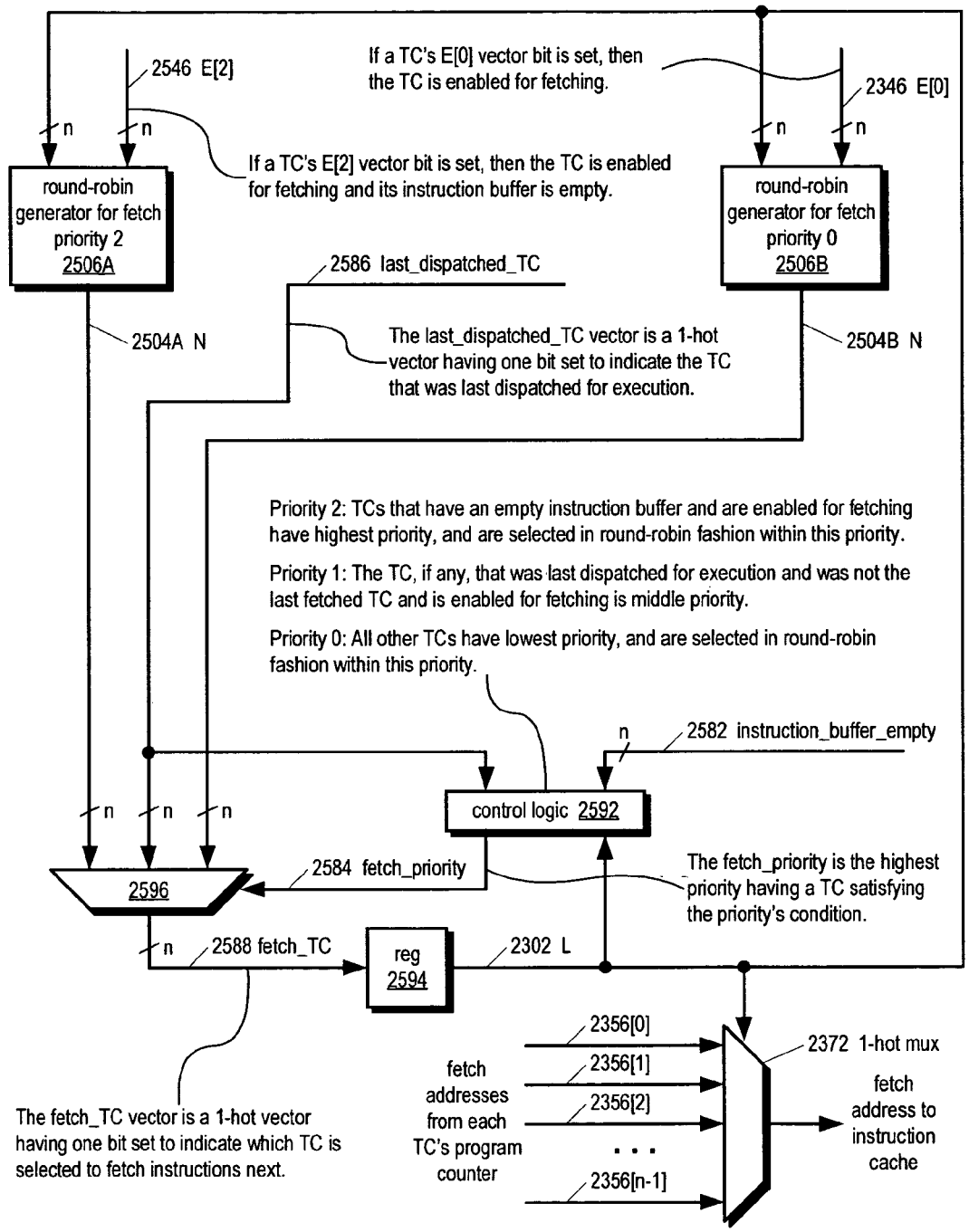

INSTRUCTION DISPATCH SCHEDULER EMPLOYING ROUND-ROBIN APPARATUS SUPPORTING MULTIPLE THREAD PRIORITIES FOR USE IN MULTITHREADING MICROPROCESSOR

CROSS REFERENCE TO RELATED APPLICATIONS

This application is related to the following co-pending Non-Provisional U.S. Patent Applications, which are hereby incorporated by reference in their entirety for all purposes:

| Serial No. (Docket No.) | Filing Date | Title |
| --- | --- | --- |
| 11/051997 (MIPS.0199-00-US) | Feb. 4, 2005 | BIFURCATED THREAD SCHEDULER IN A MULTITHREADING MICROPROCESSOR |
| 11/051980 (MIPS.0200-00-US) | Feb. 4, 2005 | LEAKY-BUCKET THREAD SCHEDULER IN A MULTITHREADING MICROPROCESSOR |
| 11/051979 (MIPS.0201-00-US) | Feb. 4, 2005 | MULTITHREADING MICROPROCESSOR WITH OPTIMIZED THREAD SCHEDULER FOR INCREASING PIPELINE UTILIZATION EFFICIENCY |
| 11/051998 (MIPS.0201-01-US) | Feb. 4, 2005 | MULTITHREADING PROCESSOR INCLUDING THREAD SCHEDULER BASED ON INSTRUCTION STALL LIKELIHOOD PREDICTION |
| 11/051978 (MIPS.0202-00-US) | Feb. 4, 2005 | INSTRUCTION/SKID BUFFERS IN A MULTITHREADING MICROPROCESSOR |

This application is related to and filed concurrently with the following Non-Provisional U.S. Patent Applications, each of which is incorporated by reference in its entirety for all purposes:

| Serial No. (Docket No.) | Filing Date | Title |
| --- | --- | --- |
| 11/087064 (MIPS.0204-00-US) | | BARREL-INCREMENTER-BASED ROUND-ROBIN APPARATUS AND INSTRUCTION DISPATCH SCHEDULER EMPLOYING SAME FOR USE IN MULTITHREADING MICROPROCESSOR |
| 11/086258 (MIPS.0209-00-US) | | RETURN DATA SELECTOR EMPLOYING BARREL-INCREMENTER-BASED ROUND-ROBIN APPARATUS |
| 11/087063 (MIPS.0210-00-US) | | FETCH DIRECTOR EMPLOYING BARREL-INCREMENTER-BASED ROUND-ROBIN APPARATUS FOR USE IN MULTITHREADING MICROPROCESSOR |

FIELD OF THE INVENTION

The present invention relates in general to the field of multithreading processors, and particularly to the use of round-robin fairness methods in dispatch schedulers thereof.

BACKGROUND OF THE INVENTION

Microprocessor designers employ many techniques to increase microprocessor performance. Most microprocessors operate using a clock signal running at a fixed frequency. Each clock cycle the circuits of the microprocessor perform their respective functions. According to Hennessy and Patterson (see *Computer Architecture: A Quantitative Approach*, 3rd Edition), the true measure of a microprocessor's performance is the time required to execute a program or collection of programs. From this perspective, the performance of a microprocessor is a function of its clock frequency, the average number of clock cycles required to execute an instruction (or alternately stated, the average number of instructions executed per clock cycle), and the number of instructions executed in the program or collection of programs. Semiconductor scientists and engineers are continually making it possible for microprocessors to run at faster clock frequencies, chiefly by reducing transistor size, resulting in faster switching times. The number of instructions executed is largely fixed by the task to be performed by the program, although it is also affected by the instruction set architecture of the microprocessor. Large performance increases have been realized by architectural and organizational notions that improve the instructions per clock cycle, in particular by notions of parallelism.

One notion of parallelism that has improved the instructions per clock cycle, as well as the clock frequency, of microprocessors is pipelining, which overlaps execution of multiple instructions within pipeline stages of the microprocessor. In an ideal situation, each clock cycle one instruction moves down the pipeline to a new stage, which performs a different function on the instruction. Thus, although each individual instruction takes multiple clock cycles to complete, because the multiple cycles of the individual instructions overlap, the average clocks per instruction is reduced. The performance improvements of pipelining may be realized to the extent that the instructions in the program permit it, namely to the extent that an instruction does not depend upon its predecessors in order to execute and can therefore execute in parallel with its predecessors, which is commonly referred to as instruction-level parallelism. Another way in which instruction-level parallelism is exploited by contemporary microprocessors is the issuing of multiple instructions for execution per clock cycle. These microprocessors are commonly referred to as superscalar microprocessors.

What has been discussed above pertains to parallelism at the individual instruction-level. However, the performance improvement that may be achieved through exploitation of instruction-level parallelism is limited. Various constraints imposed by limited instruction-level parallelism and other performance-constraining issues have recently renewed an interest in exploiting parallelism at the level of blocks, or sequences, or streams of instructions, commonly referred to as thread-level parallelism. A thread is simply a sequence, or stream, of program instructions. A multithreaded microprocessor concurrently executes multiple threads according to some scheduling policy that dictates the fetching and issuing of instructions of the various threads, such as interleaved, blocked, or simultaneous multithreading. A multithreaded microprocessor typically allows the multiple threads to share the functional units of the microprocessor (e.g., instruction fetch and decode units, caches, branch prediction units, and load/store, integer, floating-point, SIMD, etc. execution units) in a concurrent fashion. However, multithreaded microprocessors include multiple sets of resources, or contexts, for storing the unique state of each thread, such as multiple program counters and general purpose register sets, to facilitate the ability to quickly switch between threads to fetch and issue instructions.

One example of a performance-constraining issue addressed by multithreading microprocessors is the fact that accesses to memory outside the microprocessor that must be performed due to a cache miss typically have a relatively long latency. It is common for the memory access time of a contemporary microprocessor-based computer system to be between one and two orders of magnitude greater than the cache hit access time. Instructions dependent upon the data missing in the cache are stalled in the pipeline waiting for the data to come from memory. Consequently, some or all of the pipeline stages of a single-threaded microprocessor may be idle performing no useful work for many clock cycles. Multithreaded microprocessors may solve this problem by issuing instructions from other threads during the memory fetch latency, thereby enabling the pipeline stages to make forward progress performing useful work, somewhat analogously to, but at a finer level of granularity than, an operating system performing a task switch on a page fault. Other examples of performance-constraining issues addressed by multithreading microprocessors are pipeline stalls and their accompanying idle cycles due to a data dependence; or due to a long latency instruction such as a divide instruction, floating-point instruction, or the like; or due to a limited hardware resource conflict. Again, the ability of a multithreaded microprocessor to issue instructions from other threads to pipeline stages that would otherwise be idle may significantly reduce the time required to execute the program or collection of programs comprising the threads.

Because there are multiple threads in a multithreading processor competing for limited resources, such as instruction fetch and execution bandwidth, there is a need to fairly arbitrate among the threads for the limited resources. One fair arbitration scheme used in other contexts is a round-robin arbitration scheme. In a round-robin arbitration scheme, an order of the requestors is maintained and each requestor gets a turn to use the requested resource in the maintained order. The circuitry to implement a round-robin arbitration scheme in which each of the requesters requests the resource each time the resource becomes available is not complex. A conventional round-robin circuit may be implemented as a simple N-bit barrel shifter, wherein N is the number of requestors and one bit corresponds to each of the N requesters. One bit of the barrel shifter is initially true, and the single true bit is rotated around the barrel shifter each time a new requestor is selected. One characteristic of such a round-robin circuit is that the complexity is N. In particular, the integrated circuit area and power consumed by the barrel shifter grows linearly with the number of requestors N.

However, the circuitry to implement a round-robin arbitration scheme in which only a variable subset of the requesters may be requesting the resource each time the resource becomes available is more complex. A conventional round-robin circuit accommodating a variable subset of requesting requesters may be implemented by a storage element storing an N-bit vector, denoted L, having one bit set corresponding to the previously selected requestor and combinational logic receiving the L vector and outputting a new N-bit selection vector, denoted N, according to the following equation, where E.i indicates whether a corresponding one of the requestors is currently requesting:

$$N.i =$$
; This requestor is enabled, i.e., is requesting.
  E.i AND
; The requestor to the right was selected last time.
  (L.i−1 OR
; A requestor further to the right was selected last
; time AND the requestors in between are disabled.
  (~E.i−1 AND L.i−2) OR
  (~E.i−1 AND ~E.i−2 AND L.i−3) OR
  . . .
; This requestor was selected last time,
; but no other requestors are enabled.
  (~E.i−1 AND ~E.i−2 AND ~E.i−3 AND . . . ~E.i+1 AND L.i))

As may be observed from the equation above, the complexity of the conventional round-robin circuit accommodating a variable subset of disabled requestors has complexity $N^2$. Thus, as the number of requesters—such as the number of threads in a multithreading microprocessor—becomes relatively large, the size of the conventional circuit may become burdensome on the processor in terms of size and power consumption, particularly if more than one such circuit is needed in the processor.

Furthermore, in some applications, the requestors may have multiple priority levels; i.e., some requesters may have higher priority than others. It is desirable to select requesters fairly within each of the priority levels. That is, it is desirable for requestors to be chosen in a round-robin manner within each priority level independent of the order requesters are chosen within the other priority levels. Furthermore, the priority levels of the various requesters may change dynamically over time. Finally, a particular application in which the requestors may have multiple priority levels is in a dispatch scheduler in a multithreaded microprocessor. Therefore, what is also needed is a dispatch scheduler in a multithreading microprocessor that incorporates a simple and fast round-robin apparatus and method that accommodates a variable subset of all threads requesting instruction dispatch at a time, and which does so independent of the priority level, among multiple priority levels, at which the threads are requesting to be dispatched.

BRIEF SUMMARY OF INVENTION

The present invention also provides a simple and fast round-robin apparatus and method that accommodates a variable subset of the multiple threads having an issuable instruction each dispatch cycle that generates a round-robin indicator for each of multiple priority levels at which a thread may be requesting to dispatch. Advantageously, the round-robin vector may be generated in parallel with the generation of the issuable indicators and the generation of the priority level information. That is, the apparatus generates the round-robin indicator without the need for knowing the priority level of each thread and without knowing which threads have an issuable instruction in a given selection cycle, thereby potentially enabling a shorter clock cycle of the multithreading microprocessor. Advantageously, the apparatus scales linearly in complexity with the number of threads.

In one aspect, the present invention provides a multithreading microprocessor that concurrently executes N threads each having a priority, the priority being one of P priorities. The microprocessor includes an execution pipeline, for executing the instructions dispatched thereto. The microprocessor also includes P round-robin vectors, corresponding to the P priorities, each having N bits corresponding to the N threads, each being a 1-bit left-rotated and subsequently sign-extended version of an N-bit input vector, the input vector having a single bit true corresponding to a last one of the N threads selected for dispatching at a corresponding one of the P priorities. The microprocessor also includes N P-input muxes, each coupled to receive a corresponding one of the N bits of each of the P round-robin vectors, each configured to select for output one of the P inputs specified by the corresponding thread priority. The microprocessor also includes selection logic, coupled to receive an instruction from each of the N threads and to select for dispatching to the execution pipeline one of the N instructions corresponding to one of the N threads having a dispatch value greater than or equal to any of the N threads left thereof in the N-bit input vectors. The dispatch value of each of the N threads comprises a least-significant bit equal to the corresponding P-input mux output, a most-significant bit that is true if the corresponding instruction is dispatchable, and middle bits comprising the priority of the thread.

In another aspect, the present invention provides an apparatus for dispatching instructions to an execution pipeline in a multithreading microprocessor that concurrently executes N threads each having a priority, the priority being one of P priorities. The apparatus includes P round-robin vectors, corresponding to the P priorities, each having N bits corresponding to the N threads, each being a 1-bit left-rotated and subsequently sign-extended version of an N-bit input vector, the input vector having a single bit true corresponding to a last one of the N threads selected for dispatching at a corresponding one of the P priorities. The apparatus also includes N P-input muxes, each coupled to receive a corresponding one of the N bits of each of the P round-robin vectors, each configured to select for output one of the P inputs specified by the corresponding thread priority. The apparatus also includes selection logic, coupled to receive an instruction from each of the N threads and to select for dispatching to the execution pipeline one of the N instructions corresponding to one of the N threads having a dispatch value greater than or equal to any of the N threads left thereof in the N-bit input vectors. The dispatch value of each of the N threads comprises a least-significant bit equal to the corresponding P-input mux output, a most-significant bit that is true if the corresponding instruction is dispatchable, and middle bits comprising the priority of the thread.

In another aspect, the present invention provides a method for dispatching instructions to an execution pipeline in a multithreading microprocessor that concurrently executes N threads each having a priority, the priority being one of P priorities. The method includes generating P round-robin vectors, corresponding to the P priorities, each having N bits corresponding to the N threads, each being a 1-bit left-rotated and subsequently sign-extended version of an N-bit input vector, the input vector having a single bit true corresponding to a last one of the N threads selected for dispatching at a corresponding one of the P priorities. The method also includes, for each of the N threads, receiving a corresponding one of the N bits of each of the P round-robin vectors, and selecting as a round-robin bit one of the P received corresponding one of the N bits of each of the P round-robin vectors specified by the corresponding thread priority. The method also includes receiving an instruction from each of the N threads, and selecting for dispatching to the execution pipeline one of the N instructions corresponding to one of the N threads having a dispatch value greater than or equal to any of the N threads left thereof in the N-bit input vectors. The dispatch value of each of the N threads comprises a least-significant bit equal to the round-robin bit of the thread, a most-significant bit that is true if the corresponding instruction of the thread is dispatchable, and middle bits comprising the priority of the thread.

In another aspect, the present invention provides a computer program product for use with a computing device, the computer program product comprising a computer usable medium, having computer readable program code embodied in the medium, for causing an apparatus for dispatching instructions to an execution pipeline in a multithreading microprocessor that concurrently executes N threads each having a priority, the priority being one of P priorities. The computer readable program code includes first program code for providing P round-robin vectors, corresponding to the P priorities, each having N bits corresponding to the N threads, each being a 1-bit left-rotated and subsequently sign-extended version of an N-bit input vector, the input vector having a single bit true corresponding to a last one of the N threads selected for dispatching at a corresponding one of the P priorities. The computer readable program code also includes second program code for providing N P-input muxes, each coupled to receive a corresponding one of the N bits of each of the P round-robin vectors, each configured to select for output one of the P inputs specified by the corresponding thread priority. The computer readable program code also includes third program code for providing selection logic, coupled to receive an instruction from each of the N threads and to select for dispatching to the execution pipeline one of the N instructions corresponding to one of the N threads having a dispatch value greater than or equal to any of the N threads left thereof in the N-bit input vectors, wherein the dispatch value of each of the N threads comprises a least-significant bit equal to the corresponding P-input mux output, a most-significant bit that is true if the corresponding instruction is dispatchable, and middle bits comprising the priority of the thread.

In another aspect, the present invention provides a computer data signal embodied in a transmission medium, comprising computer-readable program code for providing an apparatus for dispatching instructions to an execution pipeline in a multithreading microprocessor that concurrently executes N threads each having a priority, the priority being one of P priorities. The program code includes first program code for providing P round-robin vectors, corresponding to the P priorities, each having N bits corresponding to the N threads, each being a 1-bit left-rotated and subsequently sign-extended version of an N-bit input vector, the input vector having a single bit true corresponding to a last one of the N threads selected for dispatching at a corresponding one of the P priorities. The program code also includes second program code for providing N P-input muxes, each coupled to receive a corresponding one of the N bits of each of the P round-robin vectors, each configured to select for output one of the P inputs specified by the corresponding thread priority. The program code also includes third program code for providing selection logic, coupled to receive an instruction from each of the N threads and to select for dispatching to the execution pipeline one of the N instructions corresponding to one of the N threads having a dispatch value greater than or equal to any of the N threads left thereof in the N-bit input vectors, wherein the dispatch value of each of the N threads comprises a least-significant bit equal to the corresponding P-input mux output, a most-significant bit that is true if the corresponding instruction is dispatchable, and middle bits comprising the priority of the thread.

BRIEF DESCRIPTION OF THE DRAWINGS

FIG. 17 is a block diagram illustrating a round-robin generator of FIG. 16 according to one embodiment of the present invention.

FIG. 18 is four block diagrams illustrating the barrel-incrementer of FIG. 17 according to four embodiments of the present invention.

FIG. 21 is a block diagram illustrating the round-robin generator of FIG. 20 according to one embodiment of the present invention.

FIG. 25 is a block diagram illustrating a round-robin multithreaded fetch director for operation in the instruction fetcher of FIG. 1 according to an alternate embodiment of the present invention.

DETAILED DESCRIPTION

Figure 1:
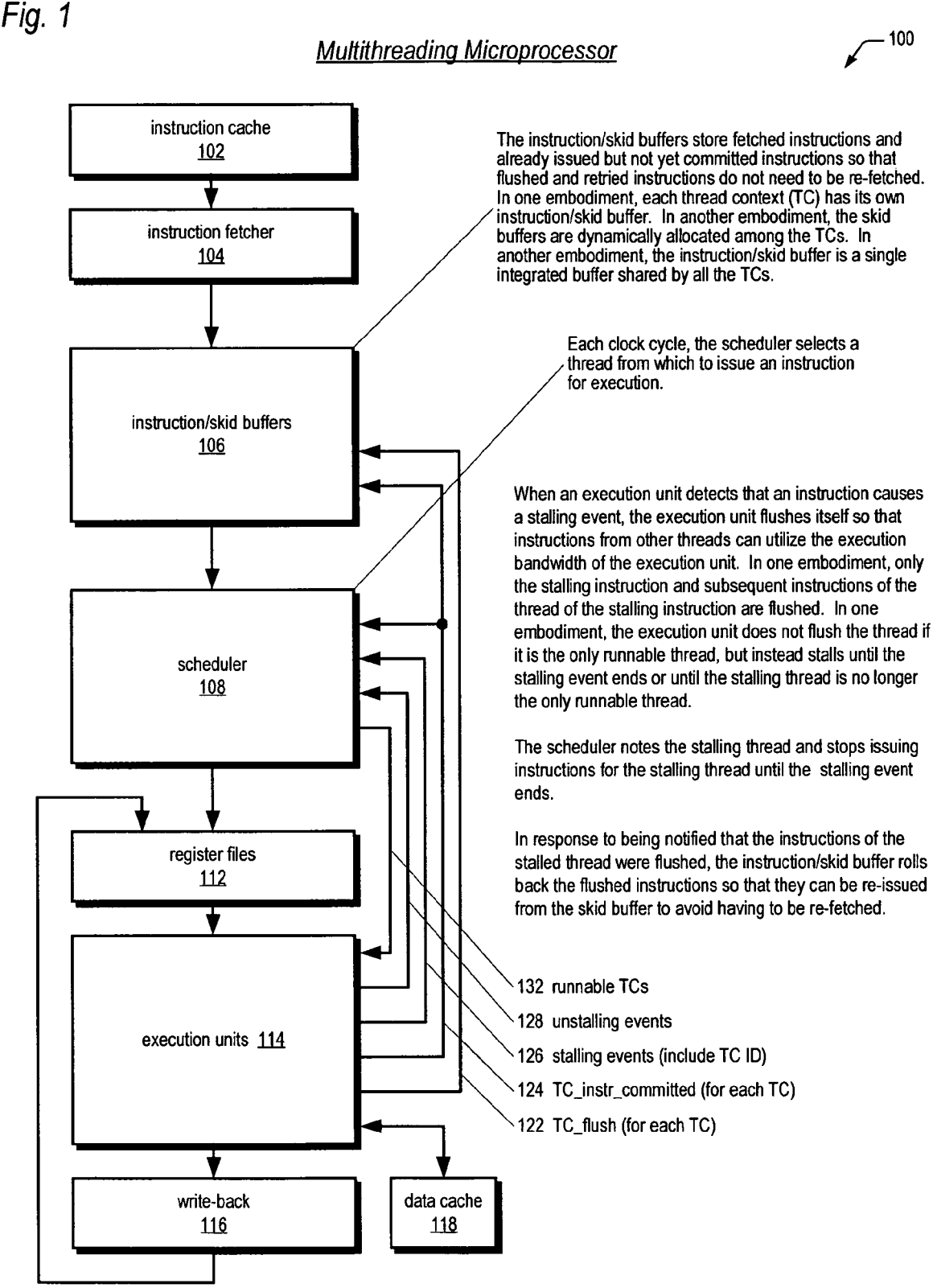
FIG. 1 is a block diagram illustrating a pipelined multithreading microprocessor according to the present invention.

Referring now to FIG. 1, a block diagram illustrating a pipelined multithreading microprocessor 100 according to the present invention is shown. The microprocessor 100 is configured to concurrently execute a plurality of threads. A thread—also referred to herein as a thread of execution, or instruction stream—comprises a sequence, or stream, of program instructions. The threads may be from different programs executing on the microprocessor 100, or may be instruction streams from different parts of the same program executing on the microprocessor 100, or a combination thereof.

Each thread has an associated thread context (TC). A thread context comprises a collection of storage elements, such as registers or latches, and/or bits in the storage elements of the microprocessor 100 that describe the state of execution of a thread. That is, the thread context describes the state of its respective thread, which is unique to the thread, rather than state shared with other threads of execution executing concurrently on the microprocessor 100. By storing the state of each thread in the thread contexts, the microprocessor 100 is configured to quickly switch between threads to fetch and issue instructions. In one embodiment, each thread context includes a program counter (PC), a general purpose register set, and thread control registers, which are included in register files 112 of the microprocessor 100.

The microprocessor 100 concurrently executes the threads according to a scheduling policy that dictates the fetching and issuing of instructions of the various threads. Various embodiments for scheduling the dispatching of instructions from the multiple threads are described herein. The terms instruction "issue" and "dispatch" are used interchangeably herein. The multithreaded microprocessor 100 allows the multiple threads to share the functional units of the microprocessor 100 (e.g., instruction fetch and decode units, caches, branch prediction units, and execution units, such as load/store, integer, floating-point, SIMD, and other execution units) in a concurrent fashion.

The microprocessor 100 includes an instruction cache 102 for caching program instructions—in particular, the instructions of the various threads—fetched from a system memory of a system including the microprocessor 100. The microprocessor 100 also includes an instruction fetcher 104, or instruction fetch pipeline 104, coupled to concurrently fetch instructions of the multiple threads from the instruction cache 102 and/or system memory into instruction/skid buffers 106, coupled to the instruction fetcher 104. In one embodiment, the instruction fetch pipeline 104 includes a four stage pipeline. The instruction/skid buffers 106 provide instructions to an instruction scheduler 108, or thread scheduler 108. In one embodiment, each thread has its own instruction/skid buffer 106. Each clock cycle, the scheduler 108 selects an instruction from one of the threads and issues the instruction for execution by execution stages of the microprocessor 100 pipeline. The register files 112 are coupled to the scheduler 108 and provide instruction operands to execution units 114 that execute the instructions. The microprocessor 100 also includes a data cache 118 coupled to the execution units 114. The execution units 114 may include, but are not limited to, integer execution units, floating-point execution units, SIMD execution units, load/store units, and branch execution units. In one embodiment, the integer execution unit pipeline includes four stages: a register file (RF) access stage in which the register file 112 is accessed, an address generation (AG) stage, an execute (EX) stage, and a memory second (MS) stage. In the EX stage, simple ALU operations are performed (such as adds, subtracts, shifts, etc.). Additionally, the data cache 118 is a two-cycle cache that is accessed during a first clock cycle in the EX stage and is accessed during a second clock cycle in the MS stage. Each thread context includes its own register file 112, and each register file includes its own program counter, general purpose register set, and thread control registers. The instruction fetcher 104 fetches instructions of the threads based on the program counter value of each thread context. It is noted that some of the execution units 114 may be pipelined, and some extensively. The microprocessor 100 pipeline also includes a write-back stage 116 that writes instruction results back into the register files 112. In one embodiment, the microprocessor 100 pipeline also includes an exception resolution stage coupled between the execution units 114 and the write-back stage 116.

The execution units 114 generate a TC_instr_committed signal 124 associated with each thread context to indicate that an instruction of the specified thread has been committed for execution. An instruction has been committed for execution if the instruction is guaranteed not to be flushed by the microprocessor 100 pipeline, but instead to eventually complete execution, which generates a result and updates the architectural state of the microprocessor 100. In one embodiment, multiple instructions may be committed per clock cycle, and the TC_instr_committed signals 124 indicate the number of instructions committed for the thread context that clock cycle. The TC_instr_committed signals 124 are provided to the scheduler 108. In response to the TC_instr_committed signal 124, the scheduler 108 updates a virtual water level indicator for the thread that is used by the thread scheduling policy of the scheduler 108 to accomplish required quality-of-service, as described below with respect to FIGS. 9 and 10.

The TC_instr_committed signals 124 are also provided to the respective instruction/skid buffers 106. In response to the TC_instr_committed signal 124, the instruction/skid buffer 106 updates a pointer to effectively remove the instruction from the buffer 106. In a conventional microprocessor, instructions are removed from a conventional instruction buffer and issued for execution. However, advantageously, the instruction/skid buffers 106 described herein continue to store instructions after they have been issued for execution. The instructions are not removed from the instruction/skid buffers 106 until the execution units 114 indicate that an instruction has been committed for execution via the respective TC_instr_committed signal 124, as described in detail below with respect to FIGS. 3 and 4.

The scheduler 108 provides to the execution units 114 a runnable TCs signal 132. The runnable TCs signal 132 specifies which of the thread contexts are runnable, i.e., which thread contexts the scheduler 108 may currently issue instructions from. In one embodiment, a thread context is runnable if the thread context is active and is not blocked by other conditions (such as being Halted, Waiting, Suspended, or Yielded), as described below with respect to FIG. 7. In particular, the execution units 114 use the runnable TCs signal 132 to determine whether a stalled thread context is the only runnable thread context for deciding whether or not to flush the instructions of the stalled thread context, as described in detail below with respect to FIG. 5.

The execution units 114 provide to the scheduler 108 a stalling events signal 126. The stalling events signal 126 indicates that an instruction has stalled, or would have stalled, in an execution unit 114 for the reason specified by the particular stalling event signal 126. In addition, the stalling events signal 126 includes an identifier identifying the thread context of the stalled instruction. The execution units 114 also provide to the scheduler 108 an unstalling events signal 128. In response to the stalling events signal 126, the scheduler 108 stops issuing instructions for the stalled thread context until a relevant unstalling event 128 is signaled, as described in more detail below with respect to FIG. 5.

Examples of events that would cause an execution unit 114 to stall in response to an instruction include, but are not limited to, the following. First, the instruction may be dependent upon unavailable data, such as data from a load instruction that misses in the data cache 118. For example, an add instruction may specify an operand which is unavailable because a preceding load instruction that missed in the data cache 118 and the operand has not yet been fetched from system memory. Second, the instruction may be dependent upon data from a long-running instruction, such as a divide or other long arithmetic instruction, or an instruction that moves a value from a coprocessor register, for example. Third, the instruction may introduce a conflict for a limited hardware resource. For example, in one embodiment the microprocessor 100 includes a single divider circuit. If a divide instruction is already being executed by the divider, then a second divide instruction must stall waiting for the first divide instruction to finish. For another example, in one embodiment the microprocessor 100 instruction set includes a group of instructions for performing low-level management operations of the instruction cache 102. If an instruction cache management instruction is already being executed, then a second instruction cache management instruction must stall waiting for the first to finish. For another example, in one embodiment, the microprocessor 100 includes a load queue that includes a relatively small number of slots for storing in-progress data cache 118 refills. When a load instruction misses in the data cache 118, a load queue entry is allocated and a processor bus transaction is initiated to obtain the missing data from system memory. When the data is returned on the bus, it is stored into the load queue and is subsequently written into the data cache 118. When the bus transaction is complete and all the data is written to the data cache 118, the load queue entry is freed. However, when the load queue is full, a load miss causes a pipeline stall. Fourth, the instruction may follow an EHB instruction. In one embodiment, the microprocessor 100 instruction set includes an EHB (Execution Hazard Barrier) instruction that is used by software to stop instruction execution until all execution hazards have been cleared. Typically, instructions following an EHB instruction will stall in the pipeline until the EHB instruction is retired. Fifth, the instruction may follow a load or store instruction addressed to interthread communication (ITC) space in its same thread context. In one embodiment, the microprocessor 100 supports loads and stores to an ITC space comprising synchronized storage, which can block for arbitrarily long times causing instructions in the same thread context following the ITC load or store to stall.

Conversely, examples of unstalling events 128 include, but are not limited to, the following: load data that missed in the data cache 118 is returned; a limited hardware resource is freed up, such as a divider circuit, the instruction cache 102, or a load queue slot; an EHB instruction, long-running instruction, or load/store instruction to inter-thread communication (ITC) space completes.

The execution units 114 also generate a TC_flush signal 122 associated with each thread context to indicate that the instructions of the specified thread in the execution portion of the pipeline (i.e., portion of the pipeline below the scheduler 108) have been flushed, or nullified. In one embodiment, flushing or nullifying an instruction comprises clearing a valid bit associated with the instruction in the pipeline, which prevents the pipeline from updating the architectural state of the microprocessor 100 in response to results of the instruction. One reason an execution unit 114 may generate a TC_flush signal 122 is when an instruction of a thread would stall in the execution unit 114, as described above. Nullifying or flushing the instruction removes the reason for the instruction to be stalled, since the results generated for the instruction will be disregarded and therefore need not be correct. Advantageously, by flushing the stalling instruction, instructions of other threads may continue to execute and utilize the execution bandwidth of the execution pipeline, thereby potentially increasing the overall performance of the microprocessor 100, as described in more detail below. In one embodiment, only instructions of the stalling thread are flushed, which may advantageously reduce the number of pipeline bubbles introduced by the flush, and in some cases may cause only one bubble associated with the stalling instruction, depending upon the composition of instructions from the various threads present in the execution unit 114 pipeline. In one embodiment, the TC_flush signal 122 signal indicates that all uncommitted instructions of the thread context have been flushed. In another embodiment, the execution unit 114 may flush fewer than the number of uncommitted instructions present in the execution unit 114, namely the stalling instruction and any newer instructions of the stalling thread context, but not flush uncommitted instructions of the thread context that are older than the stalling instruction. In this embodiment, the TC_flush signal 122 signal also indicates a number of instructions that were flushed by the execution unit 114.

The TC_flush signals 122 are provided by the execution units 114 to their respective instruction/skid buffers 106. The instruction/skid buffer 106 uses the TC_flush signal 122 to roll back the state of the instructions in the buffer 106 as described below with respect to FIGS. 3 and 4. Because the instruction/skid buffers 106 continue to store instructions until they have been committed not to be flushed, any instructions that are flushed may be subsequently re-issued from the instruction/skid buffers 106 without having to be re-fetched from the instruction cache 102. This has the advantage of potentially reducing the penalty associated with flushing stalled instructions from the execution pipeline to enable instructions from other threads to execute. Reducing the likelihood of having to re-fetch instructions is becoming increasingly important since instruction fetch times appear to be increasing. This is because, among other things, it is becoming more common for instruction caches to require more clock cycles to access than in older microprocessor designs, largely due to the decrease in processor clock periods. Thus, the penalty associated with an instruction re-fetch may be one, two, or more clock cycles more than in earlier designs.

Figure 2:
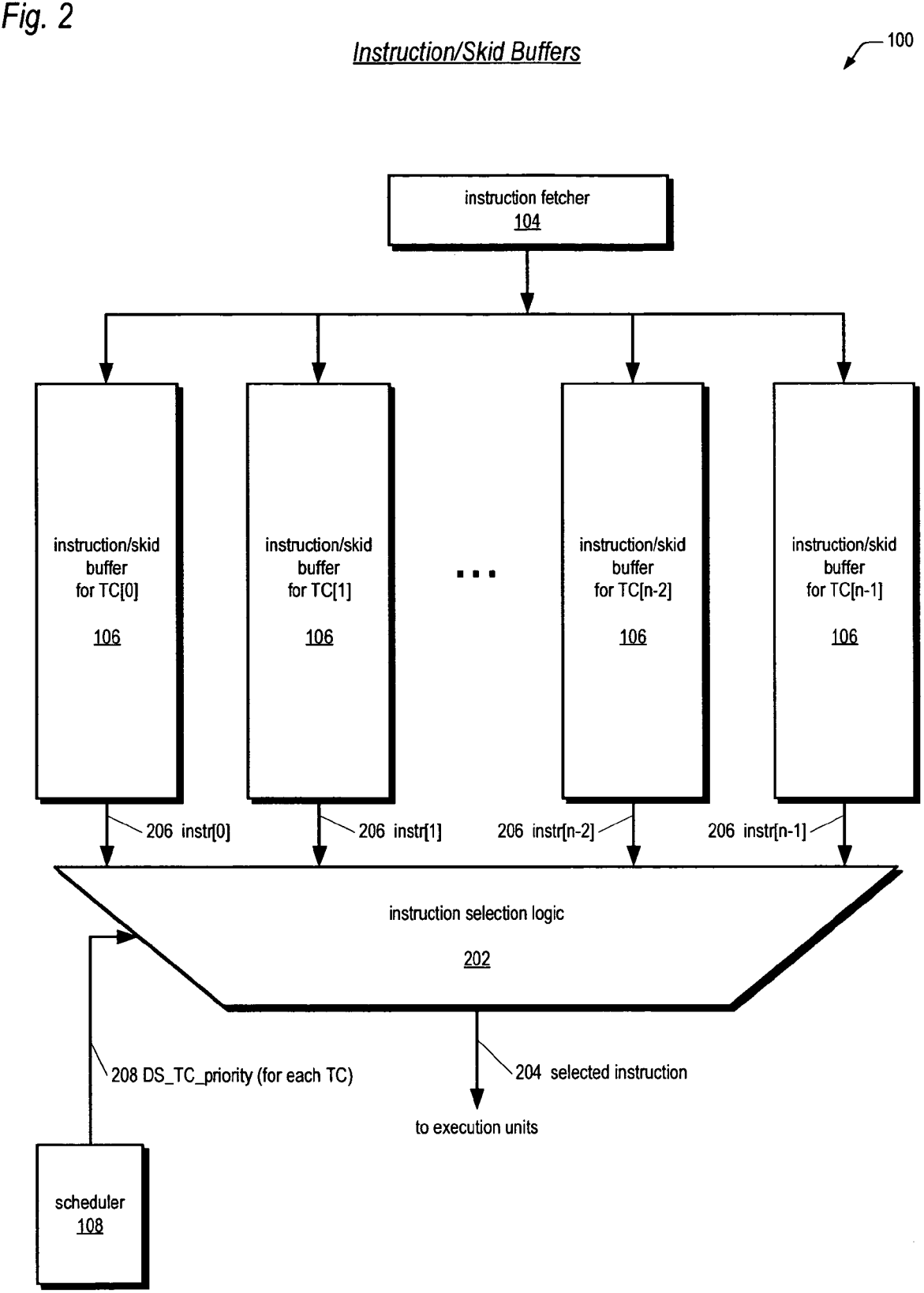
FIG. 2 is a block diagram illustrating portions of the microprocessor of FIG. 1, and in particular, instruction/skid buffers according to one embodiment of the present invention.

Referring now to FIG. 2, a block diagram illustrating portions of the microprocessor 100 of FIG. 1, and in particular, instruction/skid buffers 106 according to one embodiment of the present invention is shown. FIG. 2 illustrates a plurality of instruction/skid buffers 106 for a plurality of respective thread contexts into which the instruction fetcher 104 of FIG. 1 fetches instructions. The structure and operation of the instruction/skid buffers 106 according to one embodiment are shown in more detail below with respect to FIGS. 3 and 4. Each instruction/skid buffer 106 provides an instruction 206 to instruction selection logic 202. Each clock cycle, the instruction selection logic 202 selects one of the instructions 206 as selected instruction 204 for provision to the execution units 114 to be executed. The instruction selection logic 202 selects the selected instruction 204 in response to a DS_TC_priority signal 208 provided by the scheduler 108 of FIG. 1 for each thread context. Operation of the DS_TC_priority signal 208 is described in more detail below with respect to FIGS. 7 and 8.

Although an embodiment is described in which the microprocessor 100 is a scalar processor, i.e., only issues for execution one instruction per clock cycle, it should be understood that the instruction selection logic 202 may be configured to operate within a superscalar processor that issues multiple instructions per clock cycle. Furthermore, the instruction selection logic 202 may be configured to select instructions for issue from multiple and different thread contexts per clock cycle, commonly referred to as simultaneous multithreading.

Figure 3:
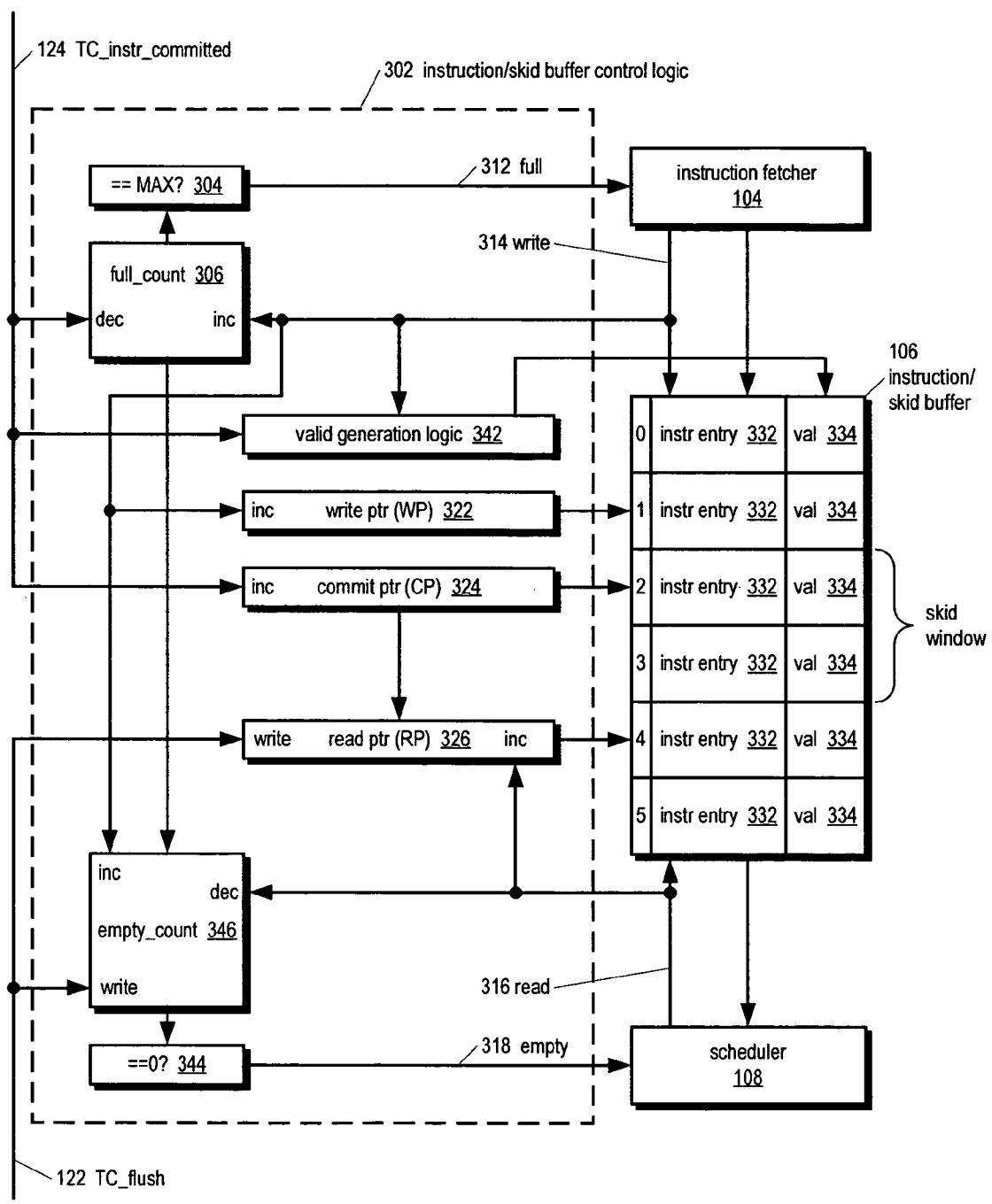
FIG. 3 is a block diagram illustrating an instruction/skid buffer exemplifying one of the instruction/skid buffers of FIG. 2 and associated control logic according to the present invention.

Referring now to FIG. 3, a block diagram illustrating an instruction/skid buffer 106 exemplifying one of the instruction/skid buffers 106 of FIG. 2 and associated control logic 302 according to the present invention is shown. Each of the instruction/skid buffers 106 of FIG. 2 is similar to the instruction/skid buffer 106 shown in FIG. 3. That is, although only one instruction/skid buffer 106 and associated control logic 302 is shown in FIG. 3, in one embodiment one instruction/skid buffer 106 and associated control logic 302 exists for each thread context. The instruction/skid buffer 106 includes a plurality of entries 332, each for storing an instruction, and an associated valid bit 334, for indicating whether the associated instruction is valid. FIG. 3 illustrates an instruction/skid buffer 106 with six entries, denoted 0 through 5. In the embodiment of FIG. 3, the instruction/skid buffer 106 is configured as a circular queue of entries.

The instruction fetcher 104 of FIG. 1 generates a write signal 314 to the instruction/skid buffer 106 each time it writes an instruction into the instruction/skid buffer 106. The write signal 314 is also provided to the control logic 302. The control logic 302 generates a full signal 312 to the instruction fetcher 104 to indicate that the instruction/skid buffer 106 is full so that the instruction fetcher 104 will not write more instructions into the instruction/skid buffer 106 until the instruction/skid buffer 106 is no longer full.

The scheduler 108 of FIG. 1 generates a read signal 316 each time it reads an instruction from the instruction/skid buffer 106. The read signal 316 is also provided to the control logic 302. The control logic 302 generates an empty signal 318 to the scheduler 108 to indicate that the instruction/skid buffer 106 is empty so that the scheduler 108 will not attempt to read another instruction from the instruction/skid buffer 106 until the instruction/skid buffer 106 is no longer empty.

The control logic 302 includes valid generation logic 342 that updates the valid bits 334 of the instruction/skid buffer 106. The valid generation logic 342 receives the TC_instr_committed signal 124 of FIG. 1 for the respective thread context. Each time the execution units 114 generate the TC_instr_committed signal 124, the valid generation logic 342 invalidates the oldest valid instruction in the instruction/skid buffer 106. The valid generation logic 342 also receives the write signal 314 from the instruction fetcher 104. Each time the instruction fetcher 104 generates the write signal 314 the valid generation logic 342 marks the entry valid in the instruction/skid buffer 106 into which the instruction was written.

The control logic 302 also includes a full_count counter 306 that stores the number of valid instructions present in the instruction/skid buffer 106. The full_count counter 306 is incremented by the write signal 314 from the instruction fetcher 104 and decremented by the TC_instr_committed signal 124. The control logic 302 also includes a comparator 304 that compares the full_count 306 to the maximum number of instructions that may be stored in the instruction/skid buffer 106 (i.e., the total number of entries 332 in the instruction/skid buffer 106) to generate a true value on the full signal 312 when the full_count 306 equals the maximum number of instruction/skid buffer 106 instructions.

The control logic 302 also includes an empty_count counter 346 that stores the number of valid instructions present in the instruction/skid buffer 106 that currently are eligible for issuing. The empty_count 346 may be less than the full_count 306 at certain times since some valid instructions may be present in the instruction/skid buffer 106 which have already been issued to the execution pipeline (but have not yet been committed) and therefore are not currently eligible for issuing. The empty_count counter 346 is incremented by the write signal 314 from the instruction fetcher 104 and decremented by the read signal 316 from the scheduler 108. The control logic 302 also includes a comparator 344 that compares the empty_count 346 to zero to generate a true value on the empty signal 318 when the empty_count 346 equals zero. Additionally, the empty_count counter 346 is written with the value of the full_count counter 306 in response to a true value on the TC_flush signal 122 of FIG. 1.

The control logic 302 also includes a write pointer 322, commit pointer 324, and read pointer 326, each of which is a counter initialized to entry 0 of the instruction/skid buffer 106. Each of the counters wraps back to zero when incremented beyond its maximum value, which is one less than the number of entries in the instruction/skid buffer 106. The write pointer 322 specifies the next entry in the instruction/skid buffer 106 into which the instruction fetcher 104 writes an instruction and is incremented by the write signal 314 after the instruction is written. The commit pointer 324 specifies the next instruction in the instruction/skid buffer 106 to be committed and is incremented by the TC_instr_committed signal 124. The read pointer 326 specifies the next entry in the instruction/skid buffer 106 from which the scheduler 108 reads an instruction and is incremented by the read signal 316 after the instruction is read. Additionally, the read pointer 326 is written with the value of the commit pointer 324 in response to a true value on the TC_flush signal 122. As shown in FIG. 3, the skid window includes the entries of the instruction/skid buffer 106 starting at the commit pointer 324 up to, but not including, the entry pointed to by the read pointer 326. The skid window includes the valid instructions that have already been issued for execution but have not yet been committed.

Figure 4:
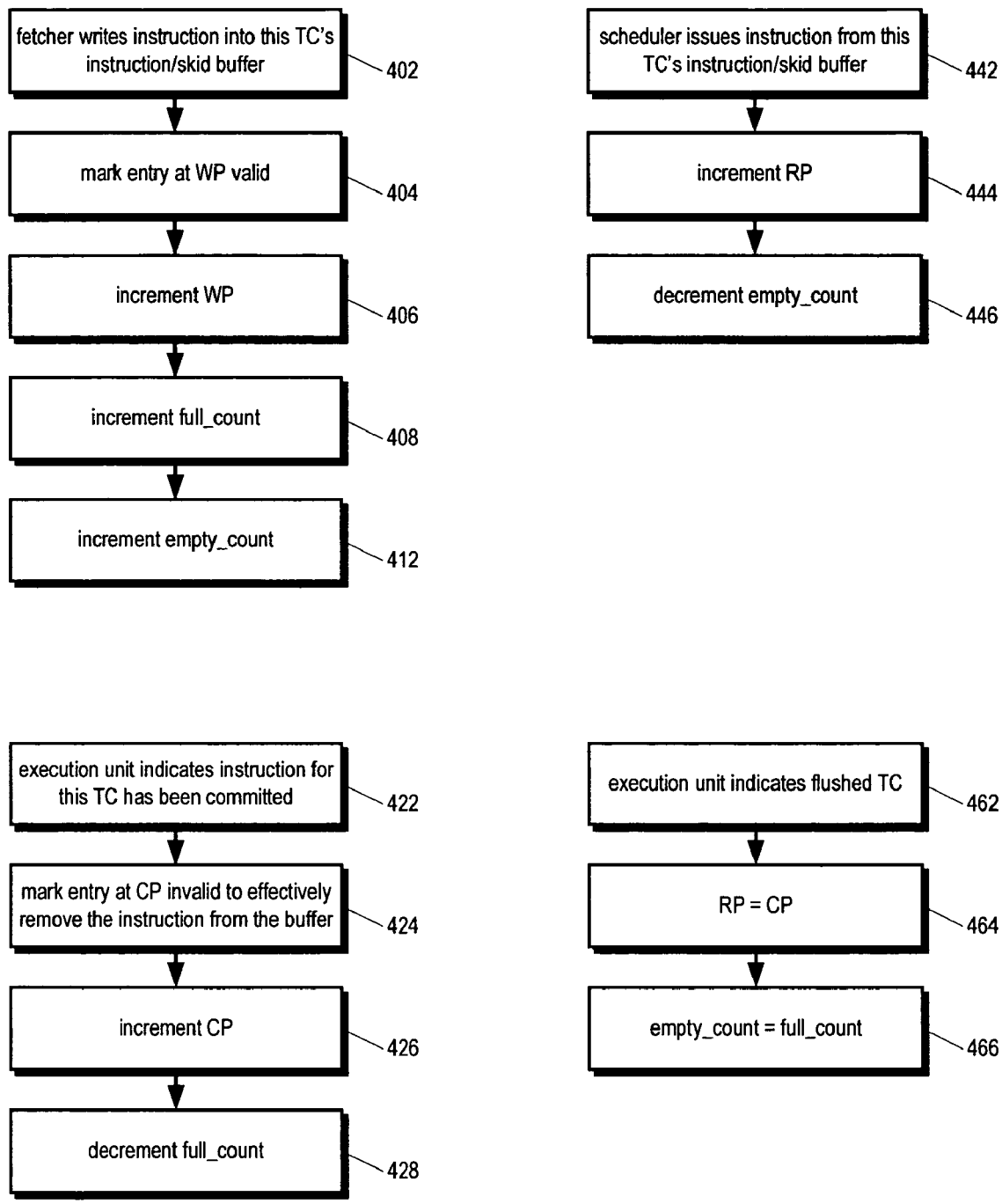
FIG. 4 is four flowcharts illustrating operation of the instruction/skid buffer of FIG. 3 according to the present invention.

Referring now to FIG. 4, four flowcharts illustrating operation of the instruction/skid buffer 106 of FIG. 3 according to the present invention are shown. Each of the flowcharts illustrates actions performed by the instruction/skid buffer 106 in response to a different event. Flow of the first flowchart begins at block 402.

At block 402, the instruction fetcher 104 of FIG. 1 asserts the write signal 314 of FIG. 3 for the respective instruction/skid buffer 106 and writes an instruction into the instruction/skid buffer 106. Flow proceeds to block 404.

At block 404, the valid generation logic 342 marks the entry specified by the write pointer 322 as valid in response to the write signal 314. Flow proceeds to block 406.

At block 406, the write pointer 322 of FIG. 3 is incremented in response to the write signal 314. Flow proceeds to block 408.

At block 408, the full_count counter 306 of FIG. 3 is incremented in response to the write signal 314. Flow proceeds to block 412.

At block 412, the empty_count counter 346 of FIG. 3 is incremented in response to the write signal 314. Flow of the first flowchart ends at block 412.

Flow of the second flowchart begins at block 422.

At block 422, an execution unit 114 of FIG. 1 asserts the TC_instr_committed signal 124 of FIG. 1 for the thread context associated with the instruction/skid buffer 106. Flow proceeds to block 424.

At block 424, the valid generation logic 342 marks the entry specified by the commit pointer 324 of FIG. 3 as invalid in response to the TC_instr_committed signal 124, thereby effectively removing the instruction from the buffer. Flow proceeds to block 426.

At block 426, the commit pointer 324 is incremented in response to the TC_instr_committed signal 124. Flow proceeds to block 428.

At block 428, the full_count counter 306 is decremented in response to the TC_instr_committed signal 124. Flow of the second flowchart ends at block 428.

In one embodiment, rather than receiving the TC_instr_committed signal 124, the control logic 302 receives another signal from the execution unit 114 that simply indicates an instruction should be removed from the instruction/skid buffer 106, even though the instruction may not yet be guaranteed not to require re-dispatching. In one embodiment, the signal indicates an instruction has reached a predetermined re-dispatch pipeline stage. If the control logic 302 detects that the instruction has reached the predetermined stage, the control logic 302 removes the instruction from the instruction/skid buffer 106. In another embodiment, the signal indicates each clock cycle whether an instruction has been running, i.e., has not been stalled, but has instead proceeded to the next pipeline stage. If the control logic 302 detects that the instruction has been running a predetermined number of clock cycles, the control logic 302 removes the instruction from the instruction/skid buffer 106. In these embodiments, the likelihood that an instruction will require re-dispatching once it reaches a particular stage in the execution pipeline 114 is low enough to justify removing it from the instruction/skid buffer 106 to make room for another instruction to be written into the instruction/skid buffer 106, even though the instruction is not yet guaranteed not to require re-dispatching. In this embodiment, if the execution unit 114 subsequently indicates that the instruction was flushed before completing execution, then the entire instruction/skid buffer 106 for the thread context must be flushed, along with the entire instruction fetch pipeline 104, to guarantee that the thread instructions are issued in proper order.

Flow of the third flowchart begins at block 442.

At block 442, the scheduler 108 of FIG. 1 asserts the read signal 316 of FIG. 3 for the respective instruction/skid buffer 106 and reads an instruction from the instruction/skid buffer 106 to issue to the execution pipeline. Flow proceeds to block 444.

At block 444, the read pointer 326 of FIG. 3 is incremented in response to the read signal 316. Flow proceeds to block 446.

At block 446, the empty_count counter 346 is decremented in response to the read signal 316. Flow of the third flowchart ends at block 446.

Flow of the fourth flowchart begins at block 462.

At block 462, asserts the TC_flush signal 122 for the thread context associated with the instruction/skid buffer 106. Flow proceeds to block 464.

At block 464, the read pointer 326 is loaded with the commit pointer 324 in response to the TC_flush signal 122. Flow proceeds to block 466.

At block 466, the empty_count counter 346 is loaded with the full_count 306 in response to the TC_flush signal 122. Flow of the fourth flowchart ends at block 466.

As discussed above, in one embodiment, the TC_flush signal 122 signal indicates that the execution unit 114 has flushed all uncommitted instructions of the thread context. The fourth flowchart of FIG. 4 describes operation of the instruction/skid buffer 106 for this embodiment. However, in another embodiment, the execution unit 114 may flush fewer than the number of uncommitted instructions present in the execution unit 114, namely the stalling instruction and any newer instructions of the stalling thread context, but not flush uncommitted instructions of the thread context that are older than the stalling instruction. In this embodiment, the TC_flush signal 122 signal also indicates a number of instructions that were flushed by the execution unit 114. In this embodiment, at block 464 the number of instructions flushed is subtracted from the read pointer 326, rather than updating the read pointer 326 with the commit pointer 324. Additionally, at block 466, the number of instructions flushed is added to the empty_count 346, rather than updating the empty_count 346 with the full_count counter 306.

Figure 5:
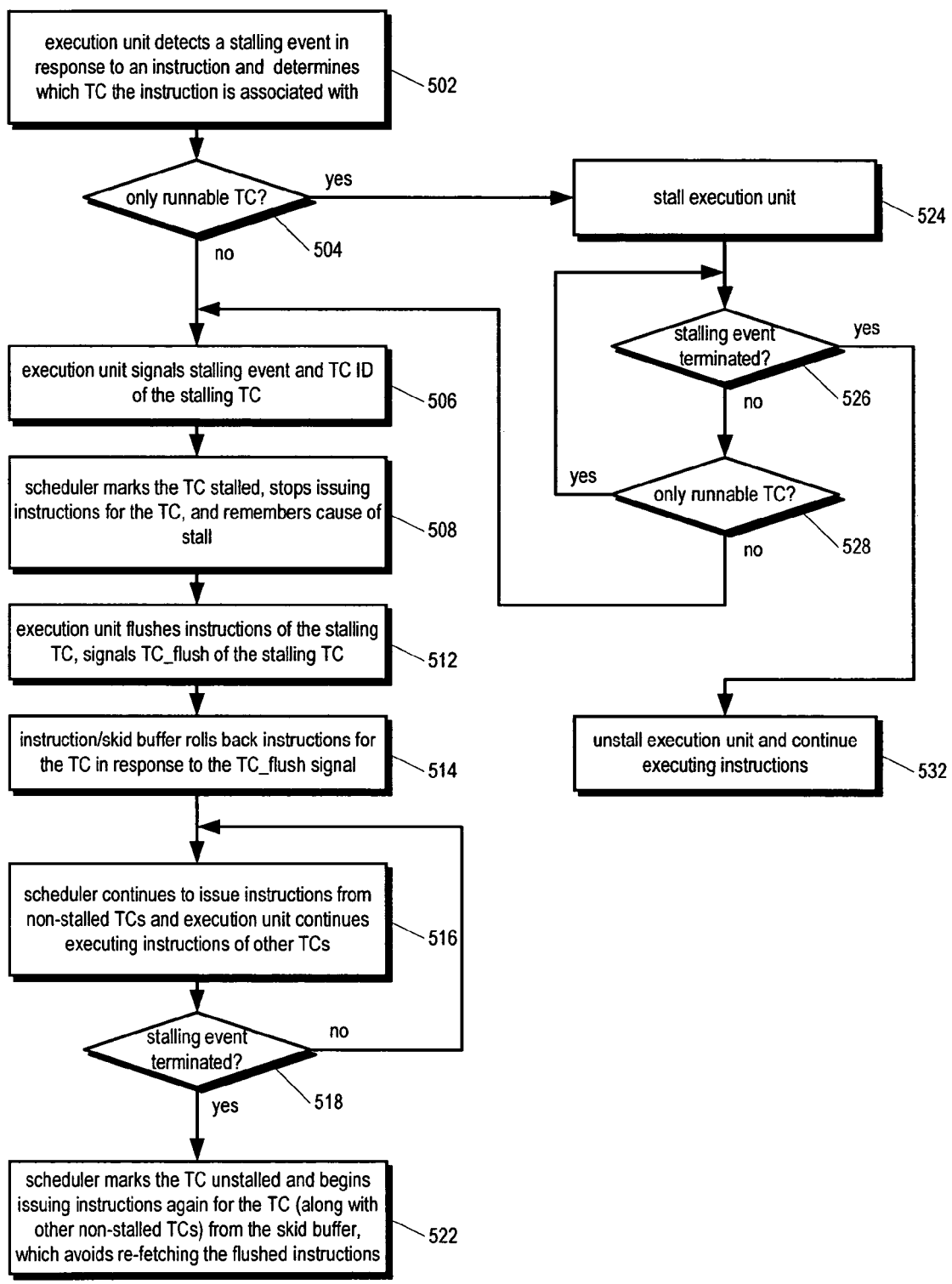
FIG. 5 is a flowchart illustrating operation of the microprocessor of FIG. 1 to flush a stalled thread context to improve execution bandwidth utilization according to the present invention.

Referring now to FIG. 5, a flowchart illustrating operation of the microprocessor 100 of FIG. 1 to flush a stalled thread context to improve execution bandwidth utilization according to the present invention is shown. Flow begins at block 502.

At block 502, an execution unit 114 of FIG. 1 detects a stalling event, such as one of those described above with respect to the stalling events signal 126 of FIG. 1, in response to an instruction, i.e., the stalling instruction. The execution unit 114 also determines which thread context the stalling instruction is associated with, i.e., the stalling thread context. In one embodiment, each instruction, as it proceeds down the pipeline, is accompanied by a unique thread context identifier that the execution unit 114 uses to identify the stalling thread context. In one embodiment, the execution unit 114 does not stall in response to the stalling event 126, but instead flushes the instruction according to block 512 in the same clock cycle in which the stalling event 126 is detected, thereby alleviating a need to stall the execution unit 114. In another embodiment, if required by timing considerations, the execution unit 114 may actually stall for one clock cycle in response to the stalling event 126 until the stalled instruction can be flushed according to block 512 below. Flow proceeds to block 504.

At decision block 504, the execution unit 114 determines whether the stalling thread context is the only runnable thread context, by examining the runnable TCs signal 132 of FIG. 1. If so, flow proceeds to block 526; otherwise, flow proceeds to block 506.

At block 506, the execution unit 114 signals the stalling event via stalling events signal 126 and also provides the identifier of the stalling thread context. Flow proceeds to block 508.

Figure 7:
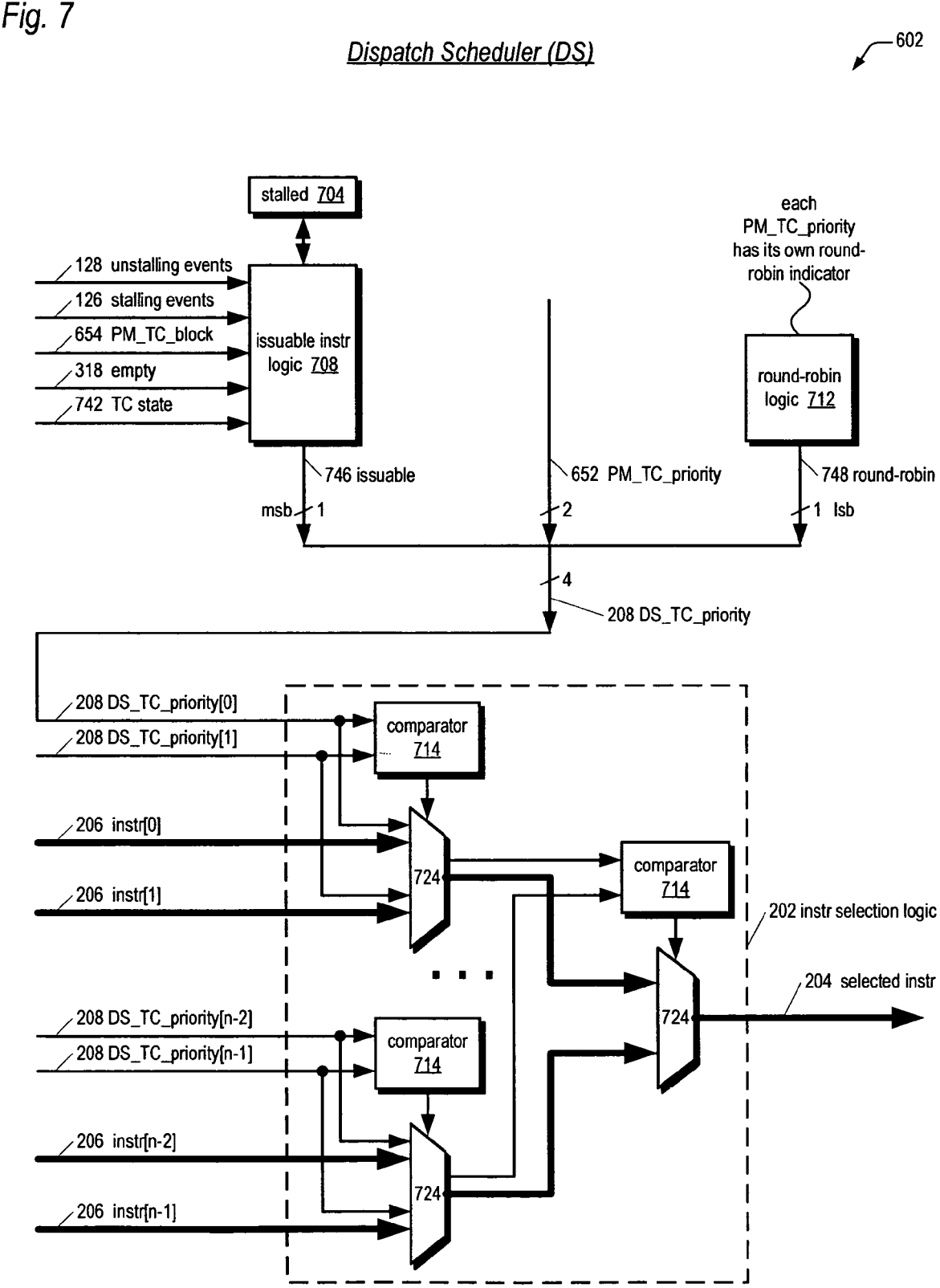
FIG. 7 is a block diagram illustrating in more detail the dispatch scheduler of FIG. 6 and the instruction selection logic of FIG. 2 according to the present invention.

At block 508, the scheduler 108 marks the stalling thread context stalled, stops issuing instructions for the thread context, and saves state regarding the cause of the stalling event. In the embodiment of FIG. 7, the issuable instruction logic 708 sets the stalled indicator 704 to a true value to mark the thread context stalled, which causes the issuable instruction logic 708 to generate a false value on the issuable 746 signal. Flow proceeds to block 512.

At block 512, the execution unit 114 nullifies, i.e., flushes, all instructions of the stalling thread context in the execution unit 114 and generates a true value on the TC_flush signal 122 of FIG. 1 associated with the stalling thread context, i.e., the flushed thread context. It is understood that the execution unit 114 only flushes the stalling instruction and subsequent instructions, but does not flush instructions preceding the stalling instructions; otherwise, the stalling condition might never end. In one embodiment, the execution unit 114 flushes instructions of all thread contexts, rather than just the stalling thread context. However, the embodiment that only flushes the stalling thread context has the advantage of potentially introducing fewer pipeline bubbles since instructions of other thread contexts may still be remaining in the execution unit 114 to execute, thereby potentially causing the microprocessor 100 to be more efficient than the embodiment that flushes all thread contexts. Flow proceeds to block 514.

At block 514, the instruction/skid buffer 106 of FIG. 1 rolls back the flushed instructions in response to the TC_flush signal 122, such as described with respect to embodiments of FIGS. 3 and 4, or 13 and 14, or 15. Flow proceeds to block 516.

At block 516, the scheduler 108 continues to issue instructions for thread contexts that are not marked stalled, according to its thread scheduling policy. In the embodiment of FIG. 7, the stalled indicator 704 indicates whether an instruction is stalled or unstalled. Additionally, the execution unit 114 continues to execute instructions of the other thread contexts that are in the execution unit 114 after the flush at block 512 and subsequently dispatched instructions. Flow proceeds to decision block 518.

At decision block 518, the scheduler 108 determines whether the stalling event terminated. The scheduler 108 determines whether the stalling event for the stalling thread context terminated in response to the execution unit 114 signaling an unstalling event via the unstalling events signal 128 of FIG. 1 and further based on the state regarding the cause of the stalling event saved at block 508. If the stalling event for the stalling thread context terminated, flow proceeds to block 522; otherwise, flow returns to block 516.

At block 522, the scheduler 108 marks the stalling thread context unstalled and begins issuing instructions for the (no longer) stalling thread context again, along with other non-stalled thread contexts. In the embodiment of FIG. 7, the issuable instruction logic 708 sets the stalled indicator 704 to a false value to mark the thread context unstalled. Flow ends at block 522.

At block 524, because the stalling thread context is the only runnable thread context, the execution unit 114 stalls at the stalling instruction in order to insure correct program execution. Flow proceeds to decision block 526.

At decision block 526, the scheduler 108 determines whether the stalling event terminated. If so, flow proceeds to block 532; otherwise, flow proceeds to decision block 528.

At decision block 528, the execution unit 114 determines whether the stalled thread context is the only runnable thread context, by examining the runnable TCs signal 132 of FIG. 1. If so, flow proceeds to block 526; otherwise, flow proceeds to block 506.

At decision block 528, the execution unit 114 determines whether the stalling thread context is still the only runnable thread context. If so, flow returns to decision block 526; otherwise, flow proceeds to block 506.

At block 532, the execution unit 114 unstalls and continues executing the (no longer) stalling instruction and other instructions. Advantageously, when the stalling event ends, the stalled instruction and subsequent instructions may commence execution immediately without having to be re-issued, which would be required if they had been flushed according to block 512. Thus, advantageously, by not flushing a stalling thread context if it is the only runnable thread context, the microprocessor 100 potentially improves performance. Flow ends at block 532.

As may be seen from FIG. 5, detecting a stalling event 126 in an execution unit 114 and flushing the instruction from the execution unit 114 to enable instructions of other threads to be dispatched to and executed in the execution unit 114 may advantageously make more efficient use of the execution unit 114 by avoiding wasted clock cycles due to execution pipeline bubbles. By flushing the instruction in response to an actual condition in which the instruction would stall, the microprocessor 100 potentially achieves higher performance.

Figure 6:
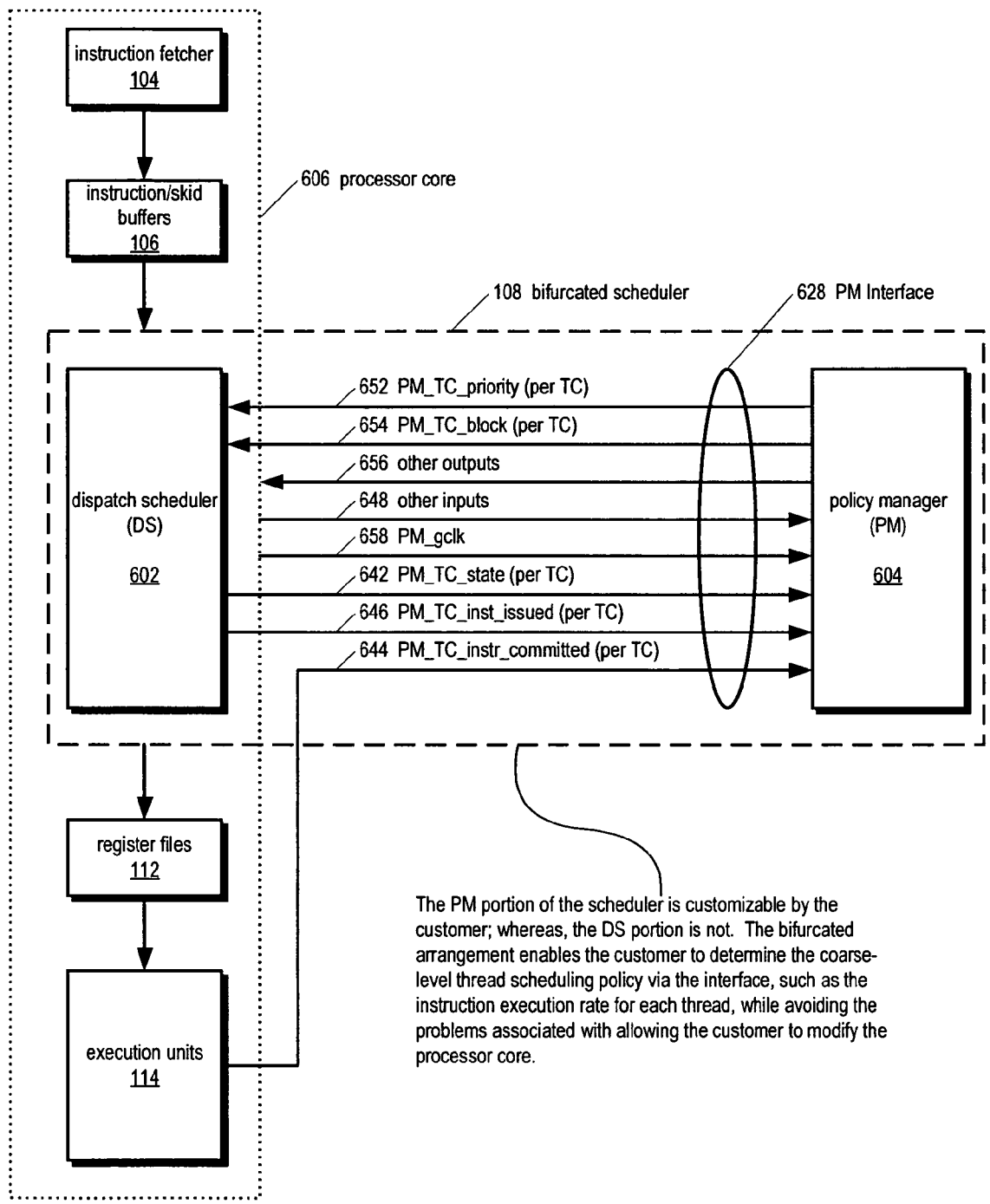
FIG. 6 is a block diagram illustrating the scheduler within the microprocessor of FIG. 1 according to one embodiment of the present invention in which the scheduler is bifurcated.

Referring now to FIG. 6, a block diagram illustrating the scheduler 108 within the microprocessor 100 of FIG. 1 according to one embodiment of the present invention in which the scheduler 108 is bifurcated is shown. The bifurcated scheduler 108 comprises a dispatch scheduler (DS) 602 portion and a policy manager (PM) 604 portion. The dispatch scheduler 602 portion is comprised within a processor core 606 of microprocessor 100; whereas, the policy manager 604 portion is comprised outside of the processor core 606. The processor core 606 is the portion of the microprocessor 100 that is not customizable by the customer; whereas, the policy manager 604 is customizable by the customer. In one embodiment, the processor core 606 is a synthesizable core, also referred to as a soft core. The design of a synthesizable core is capable of being reduced to a manufacturable representation quickly and easily using automated tools, commonly referred to as synthesis tools.

The processor core 606 provides an interface 628 to the policy manager 604 comprising a plurality of signals. In one embodiment, the inputs to the dispatch scheduler 602 and output signals from the dispatch scheduler 602 are registered, to advantageously enable the non-core policy manager 604 logic to interface with the processor core 606 in a manner that alleviates certain timing problems that might be otherwise introduced by a bifurcated scheduler. Furthermore, the interface 628 is easy for the customer to understand, which eases the design of the policy manager 604 scheduling policy.

In Table 1 below, the various signals comprising the policy manager interface 628 according to one embodiment are shown. Table 1 specifies the signal name, the direction of the signal relative to the policy manager 604, and a brief description of each signal. Table 1 describes an embodiment in which the microprocessor 100 includes nine thread contexts for storing state associated with up to nine threads of execution. Furthermore, the embodiment enables the microprocessor 100 to be configured as up to two virtual processing elements (VPEs). In one embodiment, the microprocessor 100 substantially conforms to a MIPS32 or MIPS64 Instruction Set Architecture (ISA) and includes a control Coprocessor 0, referred to in Table 1 as CP0, which includes thread control registers substantially conforming to a Coprocessor 0 specified in the MIPS Privileged Resource Architecture (PRA) and the MIPS Multithreading Application Specific Extension (MT ASE). Several of the signals described in Table 1 are used to access CP0 registers.

TABLE 1

| Signal Name | Direction | Description |
| --- | --- | --- |
| PM_gclk | Input | Processor Clock |
| PM_gfclk | Input | Free running Processor Clock |
| PM_greset_pre | Input | Global Reset. Register before use. |
| PM_gscanenable | Input | Global Scan Enable. |
| PM_vpemap[8:0] | Input | Assignment of TCs to VPEs |
| | | Encoding    Meaning |
| | | 1#0    TC belongs to VPE 0 |
| | | 1#1    TC belongs to VPE 1 |
| PM_cp0_reg_ex | Input | Register number for CP0 read. |
| PM_cp0_sel_ex | Input | Register select for CP0 read. |
| PM_cp0_rvpe_ex | Input | VPE select for CP0 read. |
| PM_cp0_rtc_ex | Input | TC select for CP0 read. |
| PM_cp0_run_ex | Input | Clock Enable for register holding PM_cp0_rdata_ms. |
| PM_cp0_rdata_ms | Output | CP0 read data. Input to hold register controlled by PM_cp0_run_ex should be zero when PM CP0 registers not selected. |
| PM_cp0_wr_er | Input | CP0 register write strobe. |
| PM_cp0_reg_er | Input | Register number for CP0 write. |
| PM_cp0_sel_er | Input | Register select for CP0 write. |
| PM_cp0_wvpe_er | Input | VPE select for CP0 write. |
| PM_cp0_wtc_er | Input | TC select for CP0 write. |
| PM_cp0_wdata_er | Input | CP0 write data. |
| PM_vpe_dm[1:0] | Input | Debug Mode. DM bit of the CP0 Debug Register for the two VPEs. |
| PM_vpe_exl[1:0] | Input | Exception Level. EXL bit of the CP0 Status Register for the two VPEs. |
| PM_vpe_erl[1:0] | Input | Error Level. ERL bit of the CP0 Status Register for the two VPEs. |
| PM_tc_state_0[2:0] | Input | State of TC 0. |

TABLE 1-continued

| Signal Name | Direction | Description | |
|---|---|---|---|
| | | Encoding | Meaning |
| | | 3#000 | InActive. |
| | | 3#001 | Active. |
| | | 3#010 | Yielded. |
| | | 3#011 | Halted. |
| | | 3#100 | Suspended. |
| | | 3#101 | Waiting on ITC. |
| | | 3#110 | WAITing due to WAIT. |
| | | 3#111 | Used as SRS. |
| PM_tc_state_1[2:0] | Input | State of TC 1. See PM_tc_state_0 for encoding. | |
| PM_tc_state_2[2:0] | Input | State of TC 2. See PM_tc_state_0 for encoding. | |
| PM_tc_state_3[2:0] | Input | State of TC 3. See PM_tc_state_0 for encoding. | |
| PM_tc_state_4[2:0] | Input | State of TC 4. See PM_tc_state_0 for encoding. | |
| PM_tc_state_5[2:0] | Input | State of TC 5. See PM_tc_state_0 for encoding. | |
| PM_tc_state_6[2:0] | Input | State of TC 6. See PM_tc_state_0 for encoding. | |
| PM_tc_state_7[2:0] | Input | State of TC 7. See PM_tc_state_0 for encoding. | |
| PM_tc_state_8[2:0] | Input | State of TC 8. See PM_tc_state_0 for encoding. | |
| PM_tc_ss[8:0] | Input | Single Stepping. SSt bit of the Debug Register for the 9 TCs. | |
| PM_tc_inst_issued[8:0] | Input | Instruction issued by Dispatch Scheduler. | |
| PM_tc_instr_committed[8:0] | Input | Instruction committed. | |
| PM_tc_fork[8:0] | Input | FORK instruction has created a new TC. PM_tc_instr_committed contains which TC executed the FORK. | |
| PM_tc_priority_0[1:0] | Output | Priority of TC 0. | |
| PM_tc_priority_1[1:0] | Output | Priority of TC 1. | |
| PM_tc_priority_2[1:0] | Output | Priority of TC 2. | |
| PM_tc_priority_3[1:0] | Output | Priority of TC 3. | |
| PM_tc_priority_4[1:0] | Output | Priority of TC 4. | |
| PM_tc_priority_5[1:0] | Output | Priority of TC 5. | |
| PM_tc_priority_6[1:0] | Output | Priority of TC 6. | |
| PM_tc_priority_7[1:0] | Output | Priority of TC 7. | |
| PM_tc_priority_8[1:0] | Output | Priority of TC 8. | |
| PM_tc_block[8:0] | Output | Prevent Dispatch Scheduler from issuing instructions for selected TCs. | |
| PM_vpe_relax_enable[1:0] | Output | Relax function Enabled for the two VPEs. | |
| PM_vpe_relax_priority_0[1:0] | Output | Relax Priority of VPE 0. | |
| PM_vpe_relax_priority_1[1:0] | Output | Relax Priority of VPE 1. | |
| PM_vpe_exc_enable[1:0] | Output | Exception function Enabled for the two VPEs. | |
| PM_vpe_exc_priority_0[1:0] | Output | Exception Priority of VPE 0. | |
| PM_vpe_exc_priority_1[1:0] | Output | Exception Priority of VPE 1. | |

Some of the particular signals of the policy manager interface 628 specified in Table 1 will now be described in more detail. The policy manager 604 specifies to the dispatch scheduler 602 the priority of the respective thread context via the PM_TC_priority 652 output. In one embodiment, the PM_TC_priority 652 comprises two bits and the dispatch scheduler 602 allows the policy manager 604 to specify one of four different priorities for a thread context. The policy manager 604 instructs the dispatch scheduler 602 to stop issuing instructions for a thread context by generating a true value on the respective PM_TC_block 654 output. Thus, the policy manager 604 may affect how the dispatch scheduler 602 issues instructions for the various thread contexts via the PM_TC_priority 652 and PM_TC_block 654 outputs, as described in more detail below, particularly with respect to FIGS. 7 through 11 below.

The processor core 606 provides the PM_gclk 658 to the policy manager 604, which enables the policy manager 604 to adjust the PM_TC_priority 652 periodically based on the PM_gclk 658, as described below with respect to FIG. 9. The dispatch scheduler 602 communicates the state for each thread context via respective PM_TC_state 642 input. As shown in Table 1, a thread context may be in one of eight states as follows. InActive: the dispatch scheduler 602 may not issue instructions of the thread context because the thread context is not currently associated with a thread of execution. Active: the thread context is currently associated with a thread of execution; therefore, the dispatch scheduler 602 may issue instructions of the thread context for execution if no other blocking conditions are present. Yielded: the dispatch scheduler 602 may not issue instructions of the thread context for execution because the thread has executed a YIELD instruction, which causes the thread context to be blocked on a specified event. Halted: the dispatch scheduler may not issue instructions of the thread context for execution because the thread context has been halted by itself or by another thread. Suspended: the dispatch scheduler 602 may not issue instructions of the thread context for execution because the thread executed a DMT or DVPE instruction, or because the microprocessor 100 or VPE is currently servicing an exception. A DMT instruction suspends multithreading operation for the VPE. A DVPE instruction suspends multithreading operation for the entire microprocessor 100. Waiting on ITC: the dispatch scheduler 602 may not issue instructions of the thread context for execution because the thread context is blocked waiting to load/store data from/to a location in interthread communication (ITC) space specified by a load/store instruction executed by the thread. WAITing due to WAIT: the dispatch scheduler 602 may not issue instructions of the thread context for execution because the thread has executed a WAIT instruction, which causes the thread context to be blocked until an interrupt has occurred. Used as SRS: the dispatch scheduler 602 may not issue instructions of the thread context because the thread context is not and cannot be associated with a thread of execution because the thread context register set is used for shadow register set operation.

The dispatch scheduler 602 communicates to the policy manager 604 that it has issued an instruction for a thread context via a respective PM_TC_inst_issued 646 input. The execution units 114 communicate to the policy manager 604 that they have committed an instruction of a thread context via a respective PM_TC_instr_committed 644 input. In one embodiment, the PM_TC_instr_committed 644 signal indicates execution of the instruction has been completed. In another embodiment, the PM_TC_instr_committed 644 signal indicates the instruction is guaranteed not to be flushed, i.e., to eventually complete execution, but may not have yet been completed. The salient point is that the PM_TC_instr_committed 644 input provides to the policy manager 604 information about executed instructions as opposed to merely dispatched instructions (as communicated by the PM_TC_inst_issued input 646), which may be different since some instructions may be speculatively dispatched and never complete. This may be an important distinction to the policy manager 604 since some threads in an application may require a particular quality-of-service, as discussed below with respect to FIG. 9. In one embodiment, the PM_TC_instr_committed signal 644 is a registered version of the TC_instr_committed signal 124. Thus, the processor core 606 provides feedback about the issuance and execution of instructions for the various thread contexts and state of the thread contexts via the PM_TC_inst_issued 646, PM_TC_instr_committed 644, and PM_TC_state 642 inputs, as described in more detail below, particularly with respect to FIGS. 7 through 11 below.

In one embodiment, the dispatch scheduler 602 also provides to the policy manager 604 a relax function, whose purpose is to enable the microprocessor 100 to save power when the application thread contexts do not require full processor bandwidth, without actually going to sleep. The relax function operates as if there is an additional thread context to be scheduled. However, when the relax thread context is selected for issue, the dispatch scheduler 602 does not issue an instruction. The policy manager 604 maintains a RELAX_LEVEL counter (per-VPE) that operates similar to the TC_LEVEL 918 counters (described below with respect to FIG. 9), except that it uses a RELAX_RATE for incrementing and is decremented when a relaxed instruction slot completes. In one embodiment, the microprocessor 100 includes a VPESchedule register per-VPE similar to the TCSchedule register 902 that enables software to specify the RELAX_RATE. The relax function is enabled or disabled via the PM_vpe_relax_enable signals specified in Table 1, and the relax thread context priority is specified via the PM_vpe_relax_priority signals.

In one embodiment, the dispatch scheduler 602 also provides to the policy manager 604 an exception function, whose purpose is to enable an exception thread context to have its own independent priority from the normal thread contexts. The policy manager maintains an EXC_LEVEL counter (per-VPE) that operates similar to the TC_LEVEL 918 counters (described below with respect to FIG. 9), except that it uses an EXC_RATE for incrementing and is decremented when an exception instruction slot completes. When the exception mode is enabled and an exception is taken for the VPE, then the thread contexts of the VPE will all be set to the exception priority. In one embodiment, software specifies the EXC_RATE via the VPESchedule registers. The exception function is enabled or disabled via the PM_vpe_exc_enable signals specified in Table 1, and the exception thread context priority is specified via the PM_vpe_exc_priority signals.

Referring now to FIG. 7, a block diagram illustrating in more detail the dispatch scheduler 602 of FIG. 6 and the instruction selection logic 202 of FIG. 2 according to the present invention is shown. The instruction selection logic 202 includes a tree of muxes 724 controlled by comparators 714. Each mux 724 receives an instruction 206 of FIG. 2 from two different thread contexts. Each mux 724 also receives the instruction's 206 associated DS_TC_priority 208 of FIG. 2. The comparator 714 associated with each mux 724 also receives the pair of DS_TC_priority signals for the two thread contexts and controls its associated mux 724 to select the instruction 206 and DS_TC_priority 208 with the highest DS_TC_priority 208 value. The selected instructions 206 and DS_TC_priorities 208 propagate down the tree until the final mux 724 selects the selected instruction 204 of FIG. 2 with the highest DS_TC_priority 208 for provision to the execution pipeline.

FIG. 7 shows logic of the dispatch scheduler 602, namely a stalled indicator 704, issuable instruction logic 708, and round-robin logic 712. In one embodiment, the stalled indicator 704 and issuable instruction logic 708 are replicated within the dispatch scheduler 602 for each thread context to generate a DS_TC_priority 208 for each thread context. In contrast, the round-robin logic 712 is instantiated once for each possible PM_TC_priority 652 and generates a round-robin indicator for each PM_TC_priority 652. For example, FIG. 7 illustrates an embodiment in which the policy manager 604 may specify one of four possible PM_TC_priorities 652; hence, the round-robin logic 712 is instantiated four times in the dispatch scheduler 602 and generates four respective round-robin indicators.

In one embodiment, the round-robin indicator includes one bit per thread context of the microprocessor 100. The bit of the round-robin indicator associated with its respective thread context is provided as round-robin bit 748 as shown in FIG. 7. If the round-robin bit 748 is true, then it is the thread context's turn in the round-robin scheme to be issued among the other thread contexts that are currently at the same PM_TC_priority 652.

The issuable instruction logic 708 receives the unstalling events signal 128 and stalling events signal 126 from the execution units 114 of FIG. 1, the PM_TC_block 654 signal from the policy manager 604 of FIG. 6, the empty signal 318 of FIG. 3 from the instruction/skid buffer 106, and TC state 742 signals. In one embodiment, the TC state 742 signals convey similar information to the PM_TC_state 642 signals of FIG. 6. The issuable instruction logic 708 sets the stalled indicator 704 to mark the thread context stalled in response to a stalling events signal 126 that identifies the thread context. The issuable instruction logic 708 also stores state in response to the stalling event 126 to remember the cause of the stall. Conversely, the issuable instruction logic 708 clears the stalled indicator 704 in response to an unstalling events signal 128 if the unstalling event 128 is relevant to the cause of the stall. The issuable instruction logic 708 generates an issuable 746 signal in response to its inputs. The issuable 746 signal is true if the instruction 206 pointed to by the read pointer 326 of the instruction/skid buffer 106 for the thread context is issuable. In one embodiment, an instruction is issuable if the TC state signals 742 indicate the thread context is in the Active state and is not blocked by other conditions (such as being Halted, Waiting, Suspended, or Yielded), the stalled indicator 704 is false, and the PM_TC_block 654 and empty 318 signals are false.

The issuable 746 bit, the PM_TC_priority 652 bits, and the round-robin bit 748 are combined to create the DS_TC_priority 208. In the embodiment of FIG. 7, the issuable 746 bit is the most significant bit, the round-robin bit 748 is the least significant bit, and the PM_TC_priority 652 is the two middle significant bits. As may be observed, because the issuable bit 746 is the most significant bit of the DS_TC_priority 652, a non-issuable instruction will be lower priority than all issuable instructions. Conversely, the round-robin bit 748 is only used to select a thread if more than one thread context has an issuable instruction and has the same highest PM_TC_priority 652.

Figure 8:
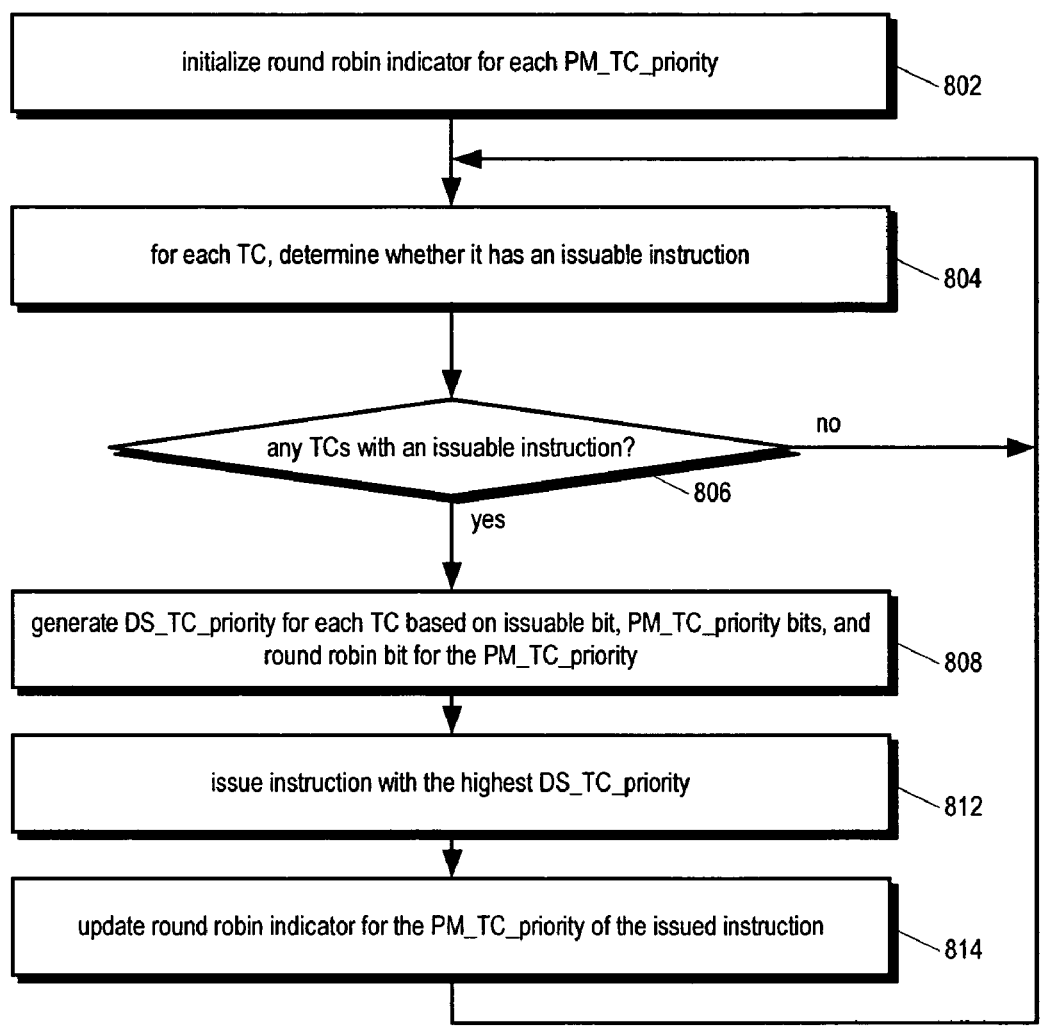
FIG. 8 is a flowchart illustrating operation of the dispatch scheduler of FIG. 7 according to the present invention.

Referring now to FIG. 8, a flowchart illustrating operation of the dispatch scheduler 602 of FIG. 7 according to the present invention is shown. Flow begins at block 802.

At block 802, the dispatch scheduler 602 initializes each round-robin indicator for each PM_TC_priority 652. Flow proceeds to block 804.

At block 804, the dispatch scheduler 602 determines, for each thread context, whether the thread context has an issuable instruction 206. That is, the issuable instruction logic 708 for each thread context generates a value on the issuable 746 signal. In one embodiment, the issuable instruction logic 708 generates a true signal on the issuable 746 signal only if the TC state signals 742 indicate the thread context is in the Active state and is not blocked by other conditions (such as being Halted, Waiting, Suspended, or Yielded), the stalled indicator 704 is false, and the PM_TC_block 654 and empty 318 signals are false. Flow proceeds to decision block 806.

At decision block 806, the dispatch scheduler 602 determines, by examining the issuable 746 signal for each of the thread contexts, whether there are any thread contexts that have an issuable instruction 206. If not, flow returns to block 804 until at least one thread context has an issuable instruction 206; otherwise, flow proceeds to block 808.

At block 808, the dispatch scheduler 602 generates the DS_TC_priority 208 for the instruction 206 of each thread context based on the issuable 746 bit of the thread context, the PM_TC_priority 652 of the thread context, and the round-robin bit 748 of the PM_TC_priority 652 of the thread context. Flow proceeds to block 812.

At block 812, the dispatch scheduler 602 issues the instruction 206 with the highest DS_TC_priority 208. In other words, the dispatch scheduler 602 issues the instruction from the thread context that has an issuable instruction and has the highest PM_TC_priority 652. If multiple thread contexts meet that criteria, the dispatch scheduler 602 issues the instruction from the thread context whose turn it is to issue as indicated by the round-robin bit 748 for the PM_TC_priority 652 of the thread contexts. Flow proceeds to block 814.

At block 814, the round-robin logic 712 updates the round-robin indicator for the PM_TC_priority 652 based on which of the thread contexts was selected to have its instruction issued. Flow returns to block 804.

Figure 9:
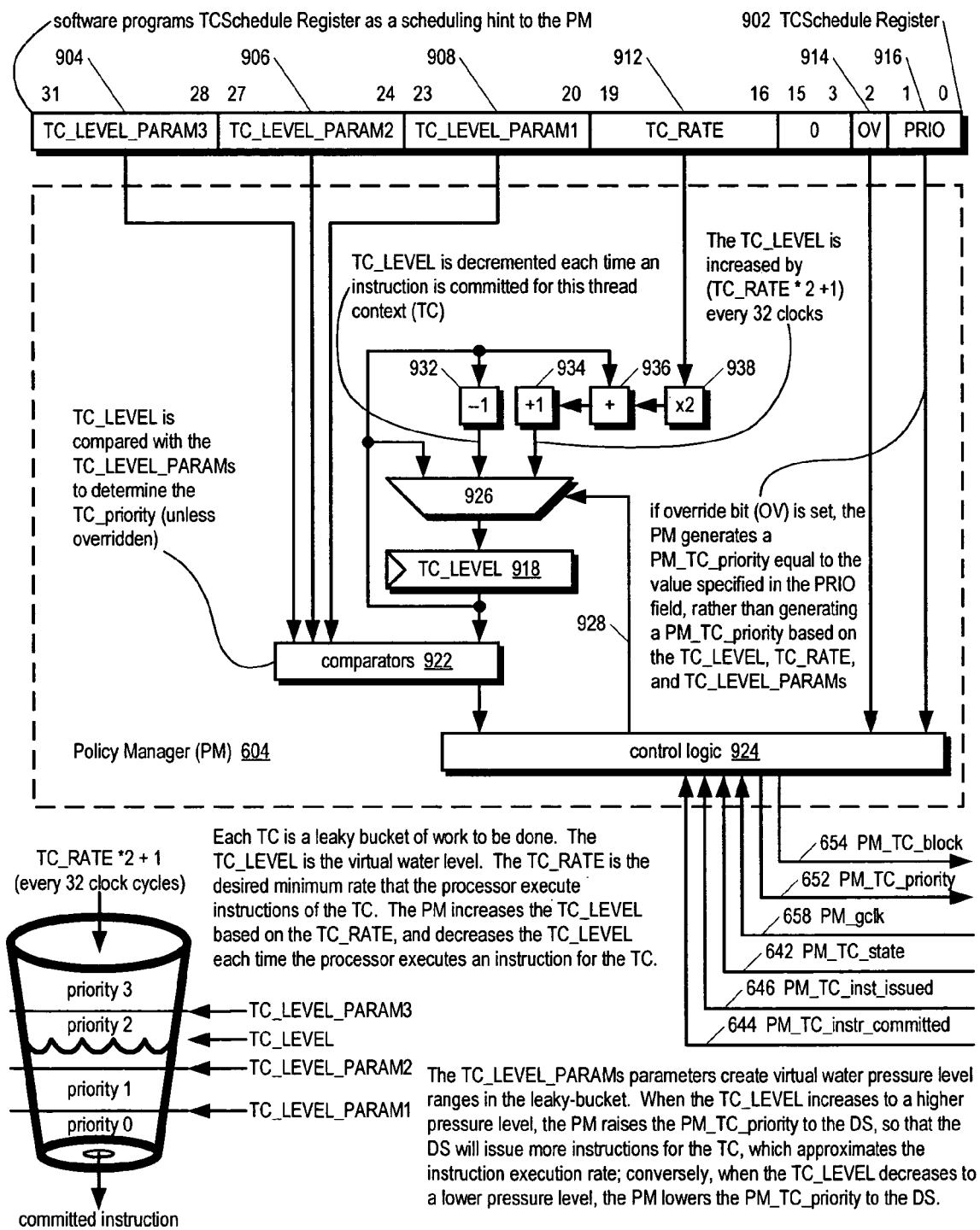
FIG. 9 is a block diagram illustrating the policy manager of FIG. 6 and a TCSchedule register according to the present invention.

Referring now to FIG. 9, a block diagram illustrating the policy manager 604 of FIG. 6 and a TCSchedule register 902 according to the present invention is shown.

The microprocessor 100 includes a TCSchedule register 902 for each thread context. The TCSchedule register 902 is software-programmable and provides a means for software to provide a thread scheduling hint to the policy manager 604. In one embodiment, the TCSchedule register 902 is comprised within the Coprocessor 0 register discussed above with respect to FIG. 6 and Table 1, and in particular is comprised within the policy manager 604. The TCSchedule register 902 includes six fields: TC_LEVEL_PARAM1 908, TC LEVEL_PARAM2 906, TC_LEVEL_PARAM3 904, TC_RATE 912, OV 914, and PRIO 916. In the embodiment of FIG. 9, the TC_LEVEL_PARAM1 908, TC_LEVEL_PARAM2 906, TC_LEVEL_PARAM3 904, and TC_RATE 912 fields comprise four bits, the PRIO 916 field comprises two bits, and the OV 914 field is a single bit.

The policy manager 604 logic shown in FIG. 9 comprises control logic 924; comparators 922 coupled to provide their output to the control logic 924; a TC_LEVEL 918 register coupled to provide its output as an input to the comparators 924; and a three-input mux 926 that is coupled to provide its output as the input to the TC_LEVEL 918 register. The mux 926 receives on its first input the output of the TC_LEVEL 918 register for retaining the correct value. The mux 926 receives on its second input the output of a decrementer 932 whose input is the output of the TC_LEVEL 918 register. The mux 926 receives on its third input the output of an incrementer 934 whose input is the output of an adder 936 that adds the output of the TC_LEVEL 918 register and the output of a multiplier 938 that multiplies the TC_RATE 912 by 2. The TC_RATE 912 is an indication of the desired execution rate of the thread context, i.e., the number of instructions to be completed per unit time. In the embodiment of FIG. 9, the TC_RATE 912 indicates the number of instructions of the thread that should be completed every 16 clock cycles. Although the logic just listed is shown only once in FIG. 9, the logic is replicated within the policy manager 604 for each thread context to generate the PM_TC_block 654 and PM_TC_priority 652 signals and to receive the PM_TC_state 642, PM_TC_inst_committed 644, PM_TC_inst_issued 646, and PM_gclk 658 signals for each thread context.

The policy manager 604 employs a modified leaky-bucket algorithm to accomplish the high-level thread scheduling policy of the scheduler 108. The TC_LEVEL 918 register is analogous to the water level in a bucket. The TC_LEVEL 918 is essentially a measure of the amount of work that needs to be done by the thread context. In one embodiment, the TC_LEVEL 918 register comprises a 12-bit register initialized to zero. The control logic 924 generates a control signal 928 to control which input the mux 926 selects. Every 32 clock cycles, the mux 926 selects the output of the incrementer 936 for storing in the TC_LEVEL 918 register, which increases the TC_LEVEL 918 by the quantity (TC_RATE*2+1). In one embodiment, the number of clock cycles between updates of the TC_LEVEL 918 based on the TC_RATE 912 is also programmable. On other clock cycles, the mux 926 selects the output of the decrementer 932 to decrement the TC_LEVEL 918 if the PM_TC_instr_committed signal 644 indicates an instruction for the thread context has been committed for execution. Thus, software can affect the virtual water level in the thread context's bucket by adjusting the TC_RATE 912 value of the thread's TCSchedule register 902. In the embodiment of FIG. 9, the value of the TC_RATE 912 indicates the number of instructions per 16 clock cycles it is desired for the microprocessor 100 to execute for the thread context.

As the water level in a leaky bucket increases, so does the water pressure, which causes the water to leak out at a higher rate. Analogously, the TC_LEVEL_PARAM fields 904/906/908 are programmed with monotonically increasing values that define virtual water pressure ranges. The comparators 922 compare the TC_LEVEL 918 with the TC_LEVEL_PARAMs 904/906/908 and provide their result to the control logic 924, which generates the PM_TC_priority 652 based on which of the virtual water pressure ranges the TC_LEVEL 918 falls in. As illustrated by the leaky bucket of FIG. 9, the control logic 924 generates a PM_TC_priority 652 value of 3 (the highest priority) if the most significant nibble of the TC_LEVEL 918 is above the TC_LEVEL_PARAM3 904 value; the control logic 924 generates a PM_TC_priority 652 value of 2 if the most significant nibble of the TC_LEVEL 918 is between the TC_LEVEL_PARAM3 904 value and the TC_LEVEL_PARAM2 906 value; the control logic 924 generates a PM_TC_priority 652 value of 1 if the most significant nibble of the TC_LEVEL 918 is between the TC_LEVEL_ PARAM2 906 value and the TC_LEVEL_PARAM1 908 value; and the control logic 924 generates a PM_TC_priority 652 value of 0 (the lowest priority) if the most significant nibble of the TC_LEVEL 918 is below the TC_LEVEL_ PARAM1 908 value. Analogously, increasing the PM_TC_priority 652 level increases the pressure on the dispatch scheduler 602 to issue instructions for the thread context, while decreasing the PM_TC_priority 652 level decreases the pressure on the dispatch scheduler 602 to issue instructions for the thread context.

As discussed above, in some applications using the microprocessor 100, different threads may require different instruction execution rates, which is programmable using the TC_RATE 912 field. Furthermore, different threads may require different resolutions, i.e., the period of time over which the instruction execution rate is measured. That is, some threads, although perhaps not requiring a high execution rate, may not be starved for instruction execution beyond a minimum time period. That is, the thread requires a particular quality-of-service. As may be observed from FIG. 9 and the explanation thereof, the TC_LEVEL_PARAMs 904/906/ 908 may be employed to accomplish a required resolution for each thread. By assigning TC_LEVEL_PARAMs 904/906/ 908 that are relatively close to one another, a higher resolution may be accomplished; whereas, assigning TC_LEVEL_ PARAMs 904/906/908 that are relatively far apart, creates a lower resolution. Thus, software may achieve the desired quality-of-service goals via the policy manager 604 by adjusting the TC_LEVEL_PARAMs 904/906/908 for each thread context to achieve the needed resolution on the instruction execution rate.

If the OV bit 914 is set, the control logic 924 ignores the values of the TC_LEVEL_PARAMs 904/906/908, TC_RATE 912, and TC_LEVEL 918, and instead generates a value on the PM_TC_priority 652 signal equal to the value specified in the PRIO field 916. This allows software to bypass the leaky bucket policy and directly control the priority of one or more of the thread contexts, if necessary.

In one embodiment, if the TC_LEVEL 918 saturates to its maximum value for a predetermined number of clock cycles, then the microprocessor 100 signals an interrupt to enable software to make thread scheduling adjustments at a higher level, in particular by changing the values in one or more of the TCSchedule registers 902. In one embodiment, the interrupt may be masked by software.

In one embodiment, the microprocessor 100 instruction set includes a YIELD instruction, which a thread context may execute to instruct the scheduler 108 to stop issuing instructions for the thread context until a specified event occurs. In one embodiment, when a thread is YIELDed, the policy manager 604 temporarily disables updates of the thread's TC_LEVEL 918 so that the thread's PM_TC_priority is preserved until the thread becomes unYIELDed. In another embodiment, the policy manager 604 continues to update the thread's TC_LEVEL 918, likely causing the thread's PM_TC_priority to increase, such that when the thread becomes unYIELDed it will temporarily have a high priority to aid the thread in essentially priming its pump. In one embodiment, the behavior of the policy manager 604 toward a YIELDed thread is programmable by software.

It should be understood that although an embodiment is described in which specific numbers of bits are used to specify the PM_TC_priority 652, TC_LEVEL_PARAMs 904/906/908, TC_RATE 912, TC_LEVEL 918, etc., the scheduler 108 is not limited in any way to the values used in the embodiment; rather, the scheduler 108 may be configured to use various different number of bits, priorities, levels, rates, etc. as required by the particular application in which the microprocessor 100 is to be used. Furthermore, although a policy manager 604 has been described which employs a modified leaky-bucket thread scheduling policy, it should be understood that the policy manager 604 may be configured to employ any of various thread scheduling policies while still enjoying the benefits of a bifurcated scheduler 108. For example, in one embodiment, the policy manager 604 employs a simple round-robin thread scheduling policy in which the PM_TC_priority 652 outputs for all the thread contexts are tied to the same value. In another embodiment, the policy manager 604 employs a time-sliced thread scheduling policy in which the PM_TC_priority 652 output is raised to the highest priority for one thread context for a number of consecutive clock cycles specified in the TCSchedule register 902 of the thread context, then the PM_TC_priority 652 output is raised to the highest priority for another thread context for a, perhaps different, number of consecutive clock cycles specified in the TCSchedule register 902 of the thread context, and so on for each thread context in a time-sliced fashion.

In one embodiment, the microprocessor 100 instruction set includes a FORK instruction for allocating an available thread context and scheduling execution of a new thread within the newly allocated thread context. In one embodiment, when a thread context FORKs a new thread context, the TC_RATE 912 for the parent thread context is split between itself and the child thread context evenly, i.e., the new TC_RATE 912 is the old TC_RATE 912 divided by two. This has the advantage of preventing a thread context from requesting more processing bandwidth than originally allotted.

As may be observed from the foregoing, bifurcating the scheduler 108 enables the dispatch scheduler 602, which is included in the processor core 606, to be relatively simple, which enables the dispatch scheduler 602 to be relatively small in terms of area and power, and places the application-specific complexity of the thread scheduling policy in the policy manager 604, which is outside the processor core 606. This is advantageous since some applications may not require a complex policy manager 604 and can therefore not be burdened with the additional area and power requirements that would be imposed upon all applications if the scheduler 108 were not bifurcated, as described herein.

Figure 10:
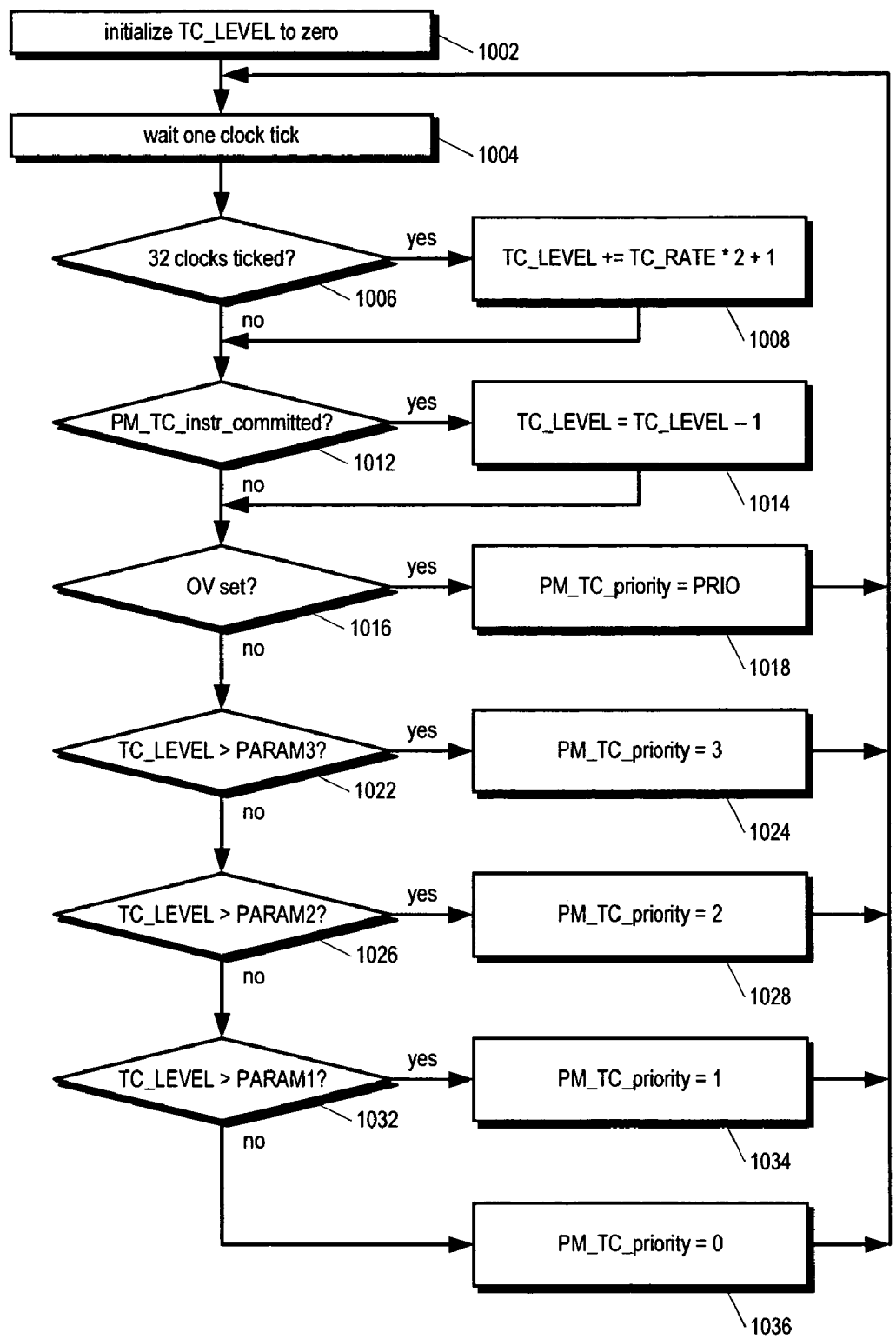
FIG. 10 is a flowchart illustrating operation of the policy manager of FIG. 9 according to the present invention.

Referring now to FIG. 10, a flowchart illustrating operation of the policy manager 604 of FIG. 9 according to the present invention is shown. Although operation is shown for only a single thread context in FIG. 10, the operation specified in FIG. 10 occurs within the policy manager 604 for each thread context. Flow begins at block 1002.

At block 1002, the policy manager 604 initializes the TC_LEVEL 918 to zero. Flow proceeds to block 1004.

At block 1004, the policy manager 604 waits one tick of the PM_gclk 658. Flow proceeds to decision block 1006.

At decision block 1006, the policy manager 604 determines whether 32 PM_gclks 658 have ticked since the last time flow arrived at decision block 1006. If not flow proceeds to decision block 1012; otherwise, flow proceeds to block 1008.

At block 1008, the TC_LEVEL 918 is increased by twice the value of TC_RATE 912 plus one. Flow proceeds to decision block 1012.

At decision block 1012, the policy manager 604 determines whether PM_TC_instr_committed 644 is true. If not, flow proceeds to decision block 1016; otherwise, flow proceeds to block 1014.

At block 1014, the TC_LEVEL 918 is decremented. Flow proceeds to decision block 1016.

At decision block 1016, the policy manager 604 determines whether the OV bit 914 is set. If not, flow proceeds to decision block 1022; otherwise, flow proceeds to block 1018.

At block 1018, the policy manager 604 generates a value on PM_TC_priority 652 equal to the value of the PRIO 916 field. Flow returns to block 1004.

At decision block 1022, the policy manager 604 determines whether the TC_LEVEL 918 is greater than the TC_LEVEL_PARAM3 904 value. If not, flow proceeds to decision block 1026; otherwise, flow proceeds to block 1024.

At block 1024, the policy manager 604 generates a value of 3 (the highest priority) on PM_TC_priority 652. Flow returns to block 1004.

At decision block 1026, the policy manager 604 determines whether the TC_LEVEL 918 is greater than the TC_LEVEL_PARAM2 906 value. If not, flow proceeds to decision block 1032; otherwise, flow proceeds to block 1028.

At block 1028, the policy manager 604 generates a value of 2 on PM_TC_priority 652. Flow returns to block 1004.

At decision block 1032, the policy manager 604 determines whether the TC_LEVEL 918 is greater than the TC_LEVEL_PARAM1 908 value. If not, flow proceeds to block 1036; otherwise, flow proceeds to block 1034.

At block 1034, the policy manager 604 generates a value of 1 on PM_TC_priority 652. Flow returns to block 1004.

At block 1036, the policy manager 604 generates a value of 0 (lowest priority) on PM_TC_priority 652. Flow returns to block 1004.

Figure 11:
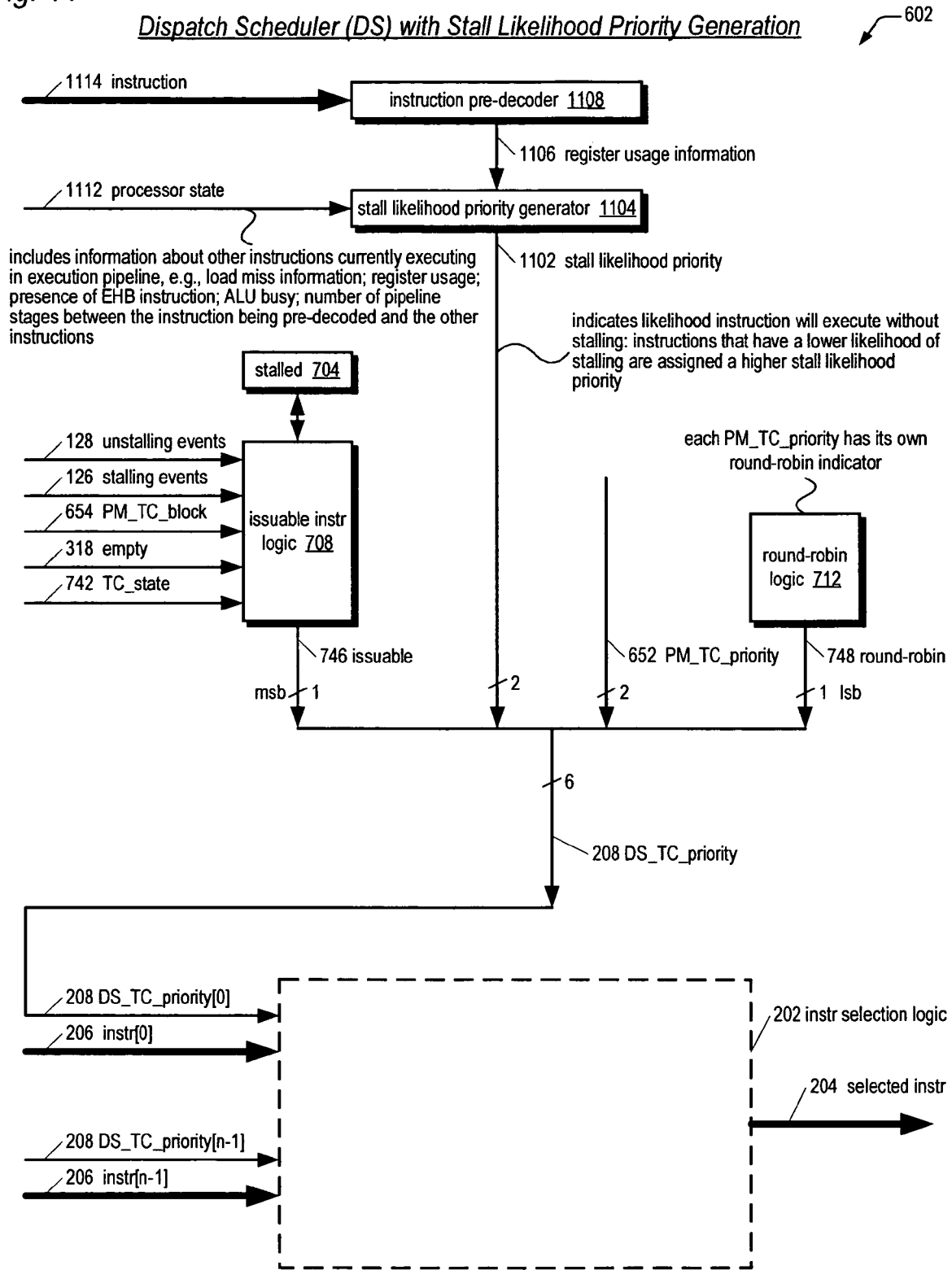
FIG. 11 is a block diagram illustrating in more detail the dispatch scheduler of FIG. 6 and the instruction selection logic of FIG. 2 according to an alternate embodiment of the present invention.

Referring now to FIG. 11, a block diagram illustrating in more detail the dispatch scheduler 602 of FIG. 6 and the instruction selection logic 202 of FIG. 2 according to an alternate embodiment of the present invention is shown. The embodiment of FIG. 11 is similar to the embodiment of FIG. 7; however, the dispatch scheduler 602 of the embodiment of FIG. 11 also includes an instruction pre-decoder 1108 and a stall likelihood priority generator 1104. The pre-decoder 1108 pre-decodes an instruction 1114 to generate register usage information 1106 about the instruction 1114. In one embodiment, the register usage information 1106 specifies which registers of the register file 112 are used as source registers of the instruction and in which stage of the execution pipeline 114 the source register is needed. Additionally, the register usage information 1106 specifies which register of the register file 112 is a destination register of the instruction and at which stage of the execution pipeline 114 the result of the instruction is ready to be stored into the destination register.

The stall likelihood priority generator 1104 generates a stall likelihood priority 1102 for the instruction 1114 based on the register usage information and based on processor state information 1112 received from the microprocessor 100 pipeline. The processor state information 1112 may include, but is not limited to: whether a load has missed in the data cache 118; whether the missing load has already been fetched; the register usage (which may include the register usage information 1106 generated by the instruction pre-decoder 1108), particularly the destination register, of other instructions currently being executed in the execution pipeline; the presence of an EHB instruction in the execution pipeline; whether an ALU is presently busy executing another ALU instruction; the number of pipeline stages currently between the instruction being pre-decoded and the other instructions in the execution pipeline; etc. In the embodiment of FIG. 11, the stall likelihood priority 1102 comprises two bits that are included between the issuable bit 746 and the PM_TC priority bits 652 to form a 6-bit DS_TC_priority 208 of FIG. 2 for use by the instruction selection logic 202 to select the selected instruction 204 of FIG. 2. In an alternate embodiment, the two bits of the stall likelihood priority 1102 are interleaved with the two bits of the PM_TC_priority 652. In one embodiment, the bits are interleaved in the following order from most to least significant: MSB of stall likelihood priority 1102, MSB of PM_TC_priority 652, LSB of stall likelihood priority 1102, LSB or PM_TC_priority 652. This embodiment is an interleaved embodiment conducive to maintaining high overall throughput by the execution pipeline 114.

The stall likelihood priority 1102 indicates the likelihood that the instruction will be executed without stalling based on its register usage. In one embodiment, the stall likelihood priority 1102 comprises two bits, creating four priority levels, and is generated by the stall likelihood priority generator 1104 as follows. An instruction is assigned the highest stall likelihood priority 1102 if it is guaranteed not to stall. For example, the instruction has no register dependencies; or the instruction has enough spacing of pipeline stages between itself and an instruction with which it has a dependency; or the data needed by the instruction is available, such as because missing load data has been returned or because the result of a previous instruction is now available, and therefore the dependency is no longer present. An instruction is assigned the lowest stall likelihood priority 1102 if it is guaranteed to stall. For example, the instruction follows a currently executing EHB instruction; the instruction is a load from an uncacheable memory region; the instruction is a load/store from/to a location in inter-thread communication (ITC) space; or the instruction cannot be executed back-to-back with another instruction in front of it due to a dependency, such as a register dependency. A cacheable load instruction is assigned a next to lowest priority. An instruction is assigned a next to highest priority of it is not guaranteed not to stall, but has a high likelihood of not stalling, such as, for example in one embodiment, an instruction that is dependent upon a result of a multiply, divide, or a floating-point instruction.

In one embodiment, the instruction 1114 is the instruction 206 of FIG. 2 at the read pointer 326 of the instruction/skid buffer 106 for the thread context, i.e., the instruction 206 of the thread context that is the next instruction eligible for issuing. In another embodiment, to improve timing considerations, the instruction pre-decoder 1108 generates the register usage information 1106 for instructions 1114 as they are stored into the instruction/skid buffer 106 of FIG. 1 and stores the register usage information 1106 into the instruction/skid buffer 106 along with the instruction 1114. As the instruction 1114/206 is being read from the instruction/skid buffer 106, the pre-decoded register usage information 1106 is provided to the stall likelihood priority generator 1104 at that time. That is, in this embodiment, the instruction/skid buffers 106 are coupled between the instruction pre-decoder 1108 and the stall likelihood priority generator 1104.

Figure 12:
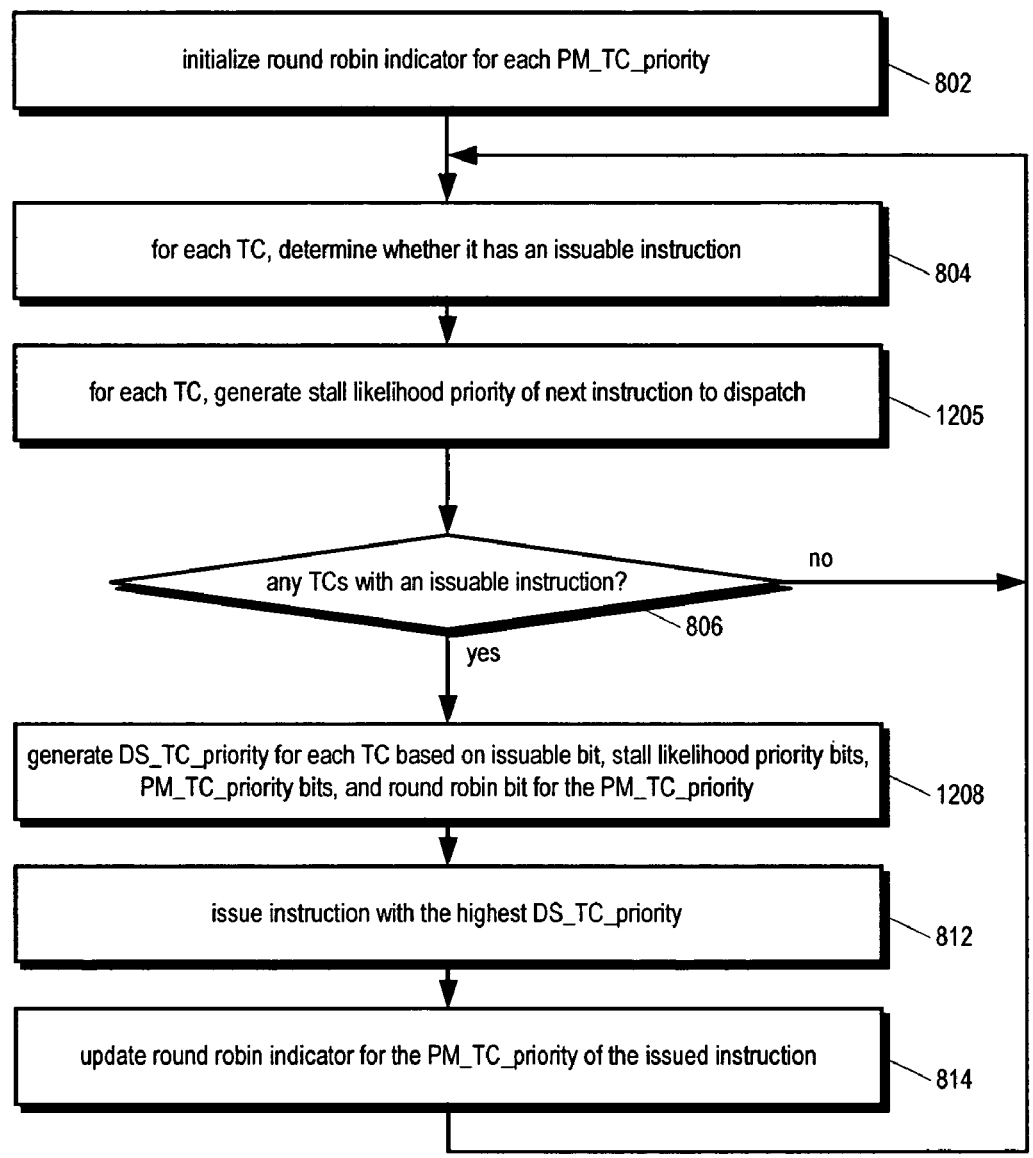
FIG. 12 is a flowchart illustrating operation of the dispatch scheduler of FIG. 11 according to the present invention.

Referring now to FIG. 12, a flowchart illustrating operation of the dispatch scheduler 602 of FIG. 11 according to the present invention is shown. The flowchart of FIG. 12 is similar to the flowchart of FIG. 8, and like-numbered blocks are alike. However, in the flowchart of FIG. 12, block 808 is replaced with block 1208. Additionally, the flowchart of FIG. 12 includes an additional block 1205. Flow proceeds from block 804 to block 1205.

At block 1205, for each thread context, the stall likelihood priority generator 1104 generates the stall likelihood priority 1102 for the instruction 1114 based on the processor state 1112 and the register usage information 1106 of the instruction 1114 of FIG. 11. Flow proceeds from block 1205 to decision block 806.

At decision block 806, the dispatch scheduler 602 determines, by examining the issuable 746 signal for each of the thread contexts, whether there are any thread contexts that have an issuable instruction 206. If not, flow returns to block 804 until at least one thread context has an issuable instruction 206; otherwise, flow proceeds to block 1208.

At block 1208, the dispatch scheduler 602 generates the DS_TC_priority 208 for the instruction 206 of each thread context based on the issuable 746 bit of the thread context, the stall likelihood priority 1102 of the next instruction 206 to dispatch for the thread context, the PM_TC_priority 652 of the thread context, and the round-robin bit 748 of the PM_TC_priority 652 of the thread context. Flow proceeds from block 1208 to block 812.

Figure 13:
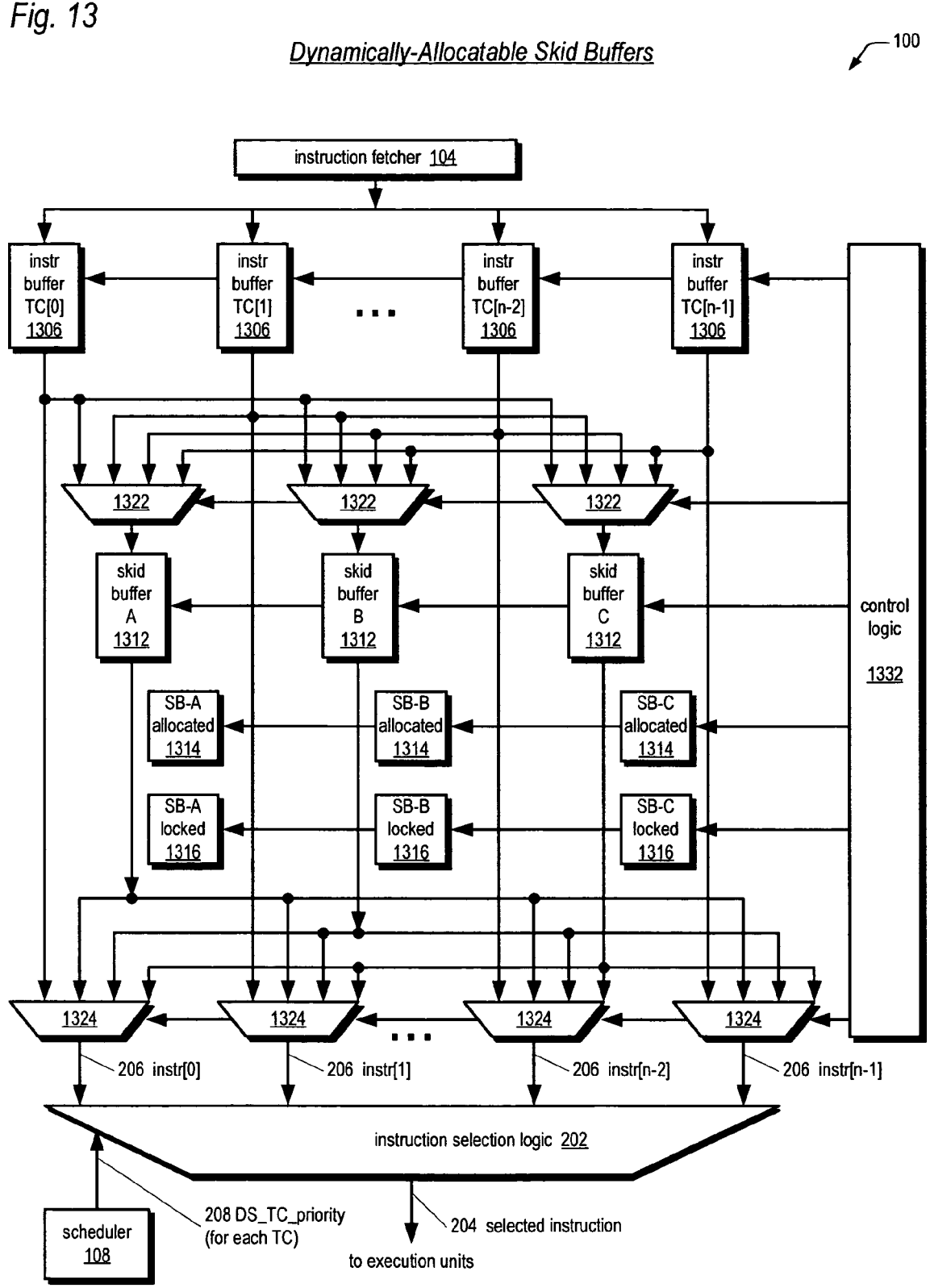
FIG. 13 is a block diagram illustrating shared dynamically-allocatable skid buffers of the microprocessor of FIG. 1 according to an alternate embodiment of the present invention.

Referring now to FIG. 13 a block diagram illustrating shared dynamically-allocatable skid buffers of the microprocessor 100 of FIG. 1 according to an alternate embodiment of the present invention is shown. The microprocessor 100 includes the instruction fetcher 104 and scheduler 108 of FIG. 1. The microprocessor 100 also includes the instruction selection logic 202 that outputs the selected instruction 204 in response to the DS_TC_priority signals 208 of FIG. 2. The microprocessor 100 also includes a plurality of instruction buffers 1306 for a plurality of respective thread contexts into which the instruction fetcher 104 of FIG. 1 fetches instructions. The microprocessor 100 also includes a plurality of skid buffers 1312. In one embodiment, each of the instruction buffers 1306 and skid buffers 1312 comprises a circular FIFO similar to the structure of the instruction/skid buffers 106 of FIG. 3. Advantageously, because the skid buffers 1312 are shared and dynamically allocated by the thread contexts, the number of skid buffers 1312 may be less than the number of thread contexts. FIG. 13 illustrates an embodiment having three skid buffers 1312, denoted skid buffer A, skid buffer B, and skid buffer C. Additionally, each skid buffer 1312 has an associated allocated register 1314 and locked register 1316. The allocated register 1314 indicates whether the associated skid buffer 1312 is allocated for use by a thread context and, if so, which of the thread contexts the skid buffer 1312 is allocated to. Similarly, the locked register 1316 indicates whether the associated skid buffer 1312 is locked for use by a thread context and, if so, which of the thread contexts the skid buffer 1312 is locked for. Allocating and locking skid buffers 1312 for thread contexts is discussed in more detail below with respect to FIG. 14.

The microprocessor 100 also includes a plurality of muxes 1322 associated with each of the skid buffers 1312. Each mux 1322 has its output coupled to the input of its associated skid buffer 1312. Each mux 1322 receives as its inputs the output of each of the instruction buffers 1306. The microprocessor 100 also includes a plurality of muxes 1324 associated with each of the instruction buffers 1306. Each mux 1324 outputs to the instruction selection logic 202 an instruction 206 of FIG. 2 of its respective thread context. Each mux 1324 receives on one input the output of its respective instruction buffer 1306. Each mux 1324 receives on its remaining inputs the output of each of the skid buffers 1312.

Unlike the instruction/skid buffers 106 of FIG. 2, the skid buffers 1312 of FIG. 13 are distinct from the instruction buffers 1306 and are shared and dynamically allocated by the thread contexts on an as-needed basis. This potentially provides a more efficient instruction buffering solution, particularly, a higher performance solution given the same amount of space and power, or a space and power reduction given a similar level of performance. The microprocessor 100 also includes buffer control logic 1332 for controlling the operation of the instruction buffers 1306, skid buffers 1312, muxes 1322 and 1324, allocated registers 1314, and locked registers 1316. Operation of the instruction buffers 1306 and skid buffers 1312 of FIG. 13 will now be described with respect to FIG. 14.

Figure 14:
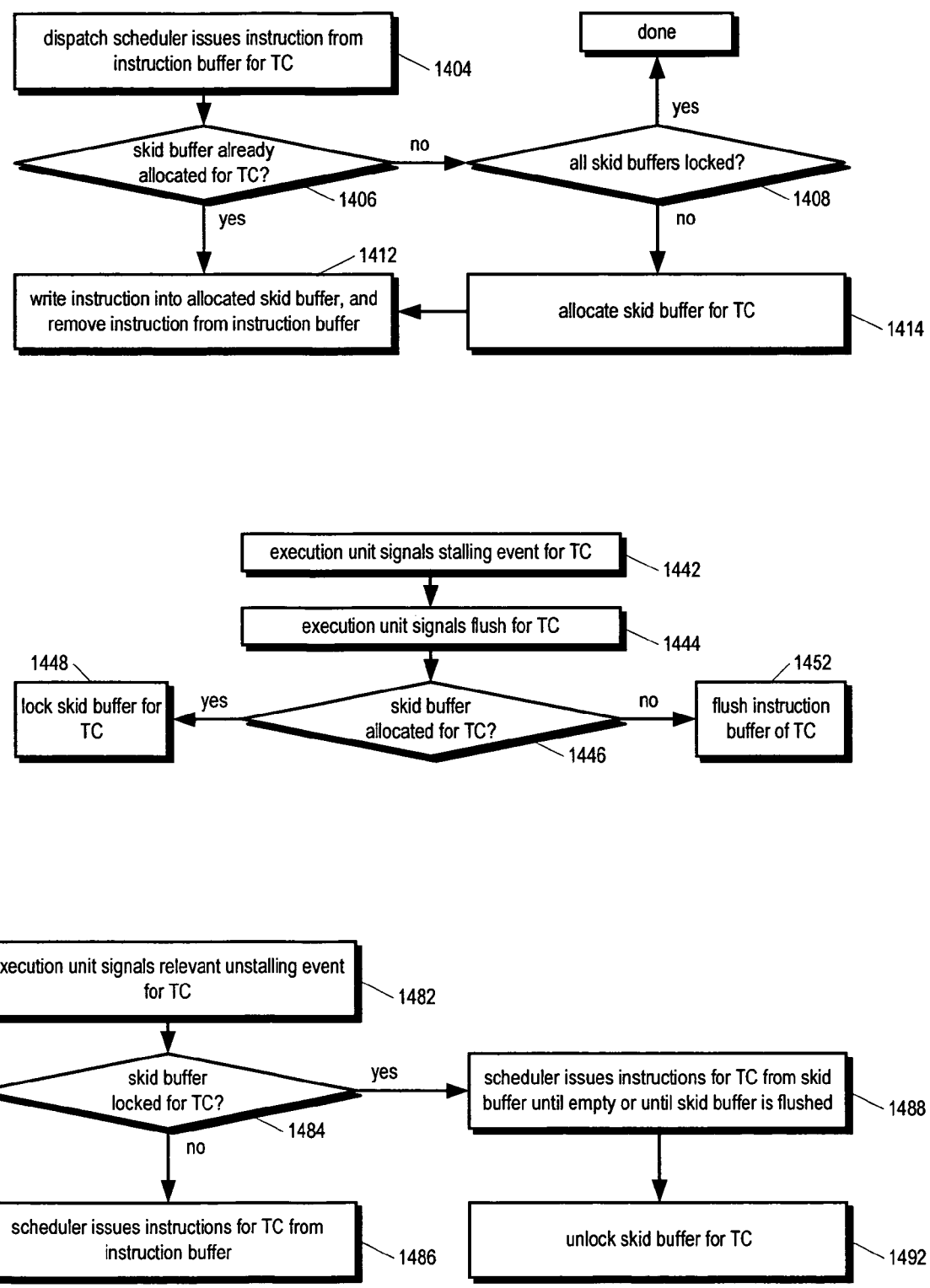
FIG. 14 is three flowcharts illustrating operation of the skid buffers of FIG. 13 according to the present invention.

Referring now to FIG. 14, three flowcharts illustrating operation of the skid buffers of FIG. 13 according to the present invention are shown. Each of the flowcharts illustrates actions performed by the instruction buffers 1306 and skid buffers 1312 of FIG. 13 in response to a different event or set of events. Flow of the first flowchart begins at block 1404.

At block 1404, the dispatch scheduler 602 of FIG. 6 issues an instruction from the instruction buffer 1306. It is noted that the instruction fetcher 104 is continuously writing instructions into the instruction buffer 1306 associated with a thread context, and in particular has written into the instruction buffer 1306 the instruction which is issued at block 1404. Flow proceeds to decision block 1406.

At decision block 1406, buffer control logic 1332 determines whether a skid buffer 1312 is already allocated for the thread context by reading the allocated registers 1314 of FIG. 13. If so, flow proceeds to block 1412; otherwise, flow proceeds to decision block 1408 to determine whether a skid buffer 1312 may be allocated for the thread context.

At decision block 1408, buffer control logic 1332 determines whether all skid buffers are locked by reading the locked registers 1316 of FIG. 13. If not, flow proceeds to block 1414; otherwise, flow ends since no skid buffer 1312 may be allocated for the thread context, which implies that if the thread context is subsequently flushed by the execution pipeline, the flushed instructions must be re-fetched.

At block 1412, the instruction dispatched at block 1404 is written into the skid buffer 1312 that was previously allocated for the thread context, and the instruction is removed from the instruction buffer 1306. Flow ends at block 1412.

At block 1414, buffer control logic 1332 allocates a skid buffer 1312 for the thread context. In one embodiment, the buffer control logic 1332 allocates a skid buffer 1312 for the thread context by writing the thread context identifier to the allocated register 1314 associated with the allocated skid buffer 1312. In one embodiment, the buffer control logic 1332 allocates the emptiest skid buffer 1312. In another embodiment, the buffer control logic 1332 allocates the skid buffers 1312 on a least recently used basis. In another embodiment, the buffer control logic 1332 allocates the skid buffers 1312 on a least recently unlocked basis. In another embodiment, the buffer control logic 1332 allocates the skid buffer 1312 whose thread context currently has the lowest priority. Flow proceeds from block 1414 to block 1412 to write the instruction into the allocated skid buffer 1312.

Flow of the second flowchart begins at block 1442.

At block 1442, an execution unit 114 of FIG. 1 signals a stalling event 126 for a thread context. Flow proceeds to block 1444.

At block 1444, the execution unit 114 signals a TC_flush 122 for the thread context. Flow proceeds to decision block 1446.

At decision block 1446, buffer control logic 1332 determines whether a skid buffer 1312 is allocated for the thread context by reading the allocated registers 1314 of FIG. 13. If not, flow proceeds to block 1452; otherwise, flow proceeds to block 1448.

At block 1448, buffer control logic 1332 locks the allocated skid buffer 1312 for the thread context. In one embodiment, the buffer control logic 1332 locks the skid buffer 1312 for the thread context by writing the thread context identifier to the locked register 1316 associated with the skid buffer 1312. Flow ends at block 1448.

At block 1452, the buffer control logic 1332 flushes the instruction buffer 1306 of the thread context flushed by the execution unit 114. Flow ends at block 1452.

Flow of the third flowchart begins at block 1482.

At block 1482, an execution unit 114 signals a relevant unstalling event 128 for a thread context. Flow proceeds to decision block 1484.

At decision block 1484, buffer control logic 1332 determines whether a skid buffer 1312 is locked for the thread context by reading the locked registers 1316. If so, flow proceeds to block 1488; otherwise, flow proceeds to block 1486.

At block 1486, the scheduler 108 issues instructions for the thread context from the instruction buffer 1306 associated with the thread context. It is noted that these instructions had to be re-fetched into the instruction buffer 1306 since no skid buffer 1312 was locked for the thread context. Flow ends at block 1486.

At block 1488, the scheduler 108 issues instructions for the thread context from the skid buffer 1312 locked for the thread context at block 1448 of the second flowchart until the skid buffer 1312 is empty or until the skid buffer 1312 is flushed, for example, in response to an exception or interrupt or branch misprediction correction. It is noted that these instructions advantageously did not have to be re-fetched. Flow proceeds to block 1492.

At block 1492, the buffer control logic 1332 unlocks the skid buffer 1312 that was locked for the thread context at block 1448 of the second flowchart. Flow ends at block 1492.

Figure 15:
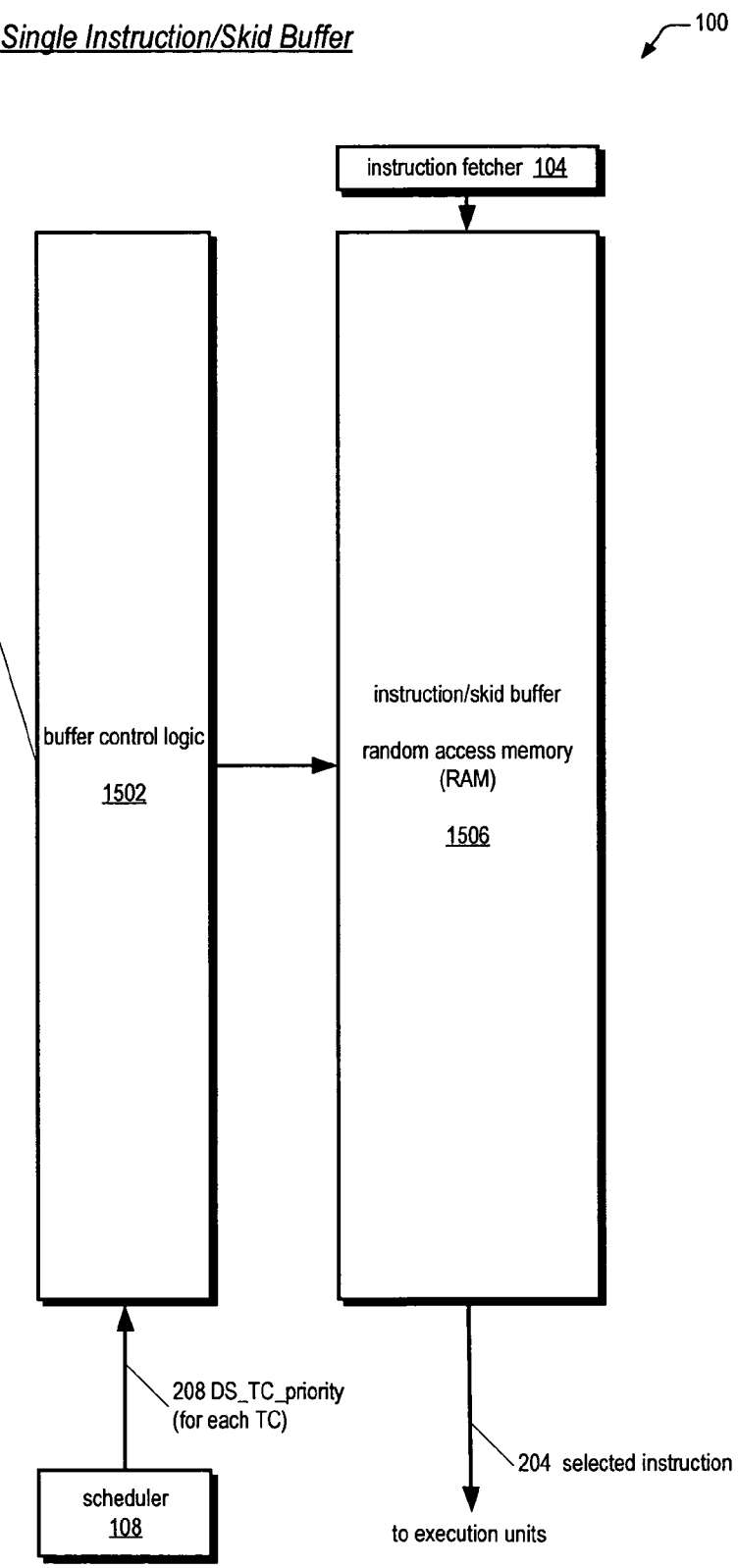
FIG. 15 is a block diagram illustrating a single shared instruction/skid buffer of the microprocessor of FIG. 1 according to an alternate embodiment of the present invention.

Referring now to FIG. 15, a block diagram illustrating a single instruction/skid buffer of the microprocessor 100 of FIG. 1 that is shared by all the thread contexts according to an alternate embodiment of the present invention is shown. The microprocessor 100 of FIG. 15 includes the instruction fetcher 104 and scheduler 108 of FIG. 1. The microprocessor 100 also includes a single instruction/skid buffer 1506 into which the instruction fetcher 104 fetches instructions for all thread contexts. The microprocessor 100 also includes buffer control logic 1502 that receives the DS_TC_priority signals 208 of FIG. 2 from the scheduler 108. The buffer control logic 1502 controls the instruction/skid buffer 1506 to output the selected instruction 204 of FIG. 2 for provision to the execution units 114.

The single instruction/skid buffer 1506 of FIG. 15 is a random access memory (RAM) for storing instructions from all the thread contexts. Consequently, the buffer control logic 1502 maintains a single write pointer (WP) and full_count across all thread contexts that function similar to those described above with respect to FIG. 3. In particular, the write pointer specifies the address of the next location in the RAM 1506 to be written regardless of the thread context of the instruction. Similarly, the full_count is incremented each time an instruction is written into the RAM 1506 and decremented each time an instruction has been committed for execution regardless of the thread context of the instruction.

In contrast, the buffer control logic 1502 maintains a separate read pointer (RP), commit pointer (CP), and empty_count for each thread context similar to those described above with respect to FIG. 3. In particular, the read pointer specifies the address of the next location in the RAM 1506 to be read for the respective thread context; the commit pointer indicates the address of the location in the RAM 1506 of the next instruction to be committed for the respective thread context; and the empty_count is incremented each time an instruction is written into the RAM 1506 for the respective thread context and decremented each time the scheduler 108 reads an instruction from the RAM 1506 for the respective thread context.

In one embodiment, the buffer control logic 1502 maintains a linked-list for each thread context that specifies the locations within the RAM 1506 of the valid instructions for the thread context in the order in which the instructions were fetched into the RAM 1506. The linked list is updated each time an instruction is written into the RAM 1506 and is used to update the read pointer and commit pointer for each thread context.

The buffer control logic 1502 receives the DS_TC_priority signals 208 from the scheduler 108 when the scheduler 108 requests an instruction, and the buffer control logic 1502 responsively selects one of the thread contexts for instruction dispatch and generates the appropriate address to the RAM 1506 to cause the RAM 1506 to output the instruction 204 of the thread context with the highest priority indicated by the DS_TC_priority signals 208.

Although the present invention and its objects, features, and advantages have been described in detail, other embodiments are encompassed by the invention. For example, although embodiments have been described in which the scheduler 108 is bifurcated and in which the parameterized leaky-bucket scheduling policy is included in the portion of the scheduler 108 outside the processor core 606, i.e., outside the customer-modifiable portion of the processor 100, it should be understood that employing a parameterized leaky-bucket scheduler is not limited to a bifurcated scheduler, but may be adapted to a non-bifurcated scheduler, as well as to a scheduler partitioned in any of various manners. In addition, although a bifurcated scheduler has been described in which the policy manager 604 enforces a leaky-bucket scheduling policy, the bifurcated scheduler 108 is not limited to a leaky-bucket thread scheduling policy; rather, the thread scheduling policy enforced by the policy manager of the bifurcated scheduler may be according to any thread scheduling algorithm. Still further, although an embodiment has been described in which the policy manager 604 updates the thread context priorities based on an indication that an instruction has been committed for execution, in other embodiments the policy manager 604 may update the thread context priorities based on other information from the processor core 606, such as an indication that an instruction has been issued (such as indicated by the PM_TC_inst_issued signals 646), an indication that an instruction has been completed or retired from the microprocessor 100, or some other instruction execution-related indication. Additionally, although a particular calculation has been described for employing the TC_RATE 912 to update the TC_LEVEL 918, the TC_LEVEL 918 may be updated according to other manners using the TC_RATE 912.

Figure 16A:
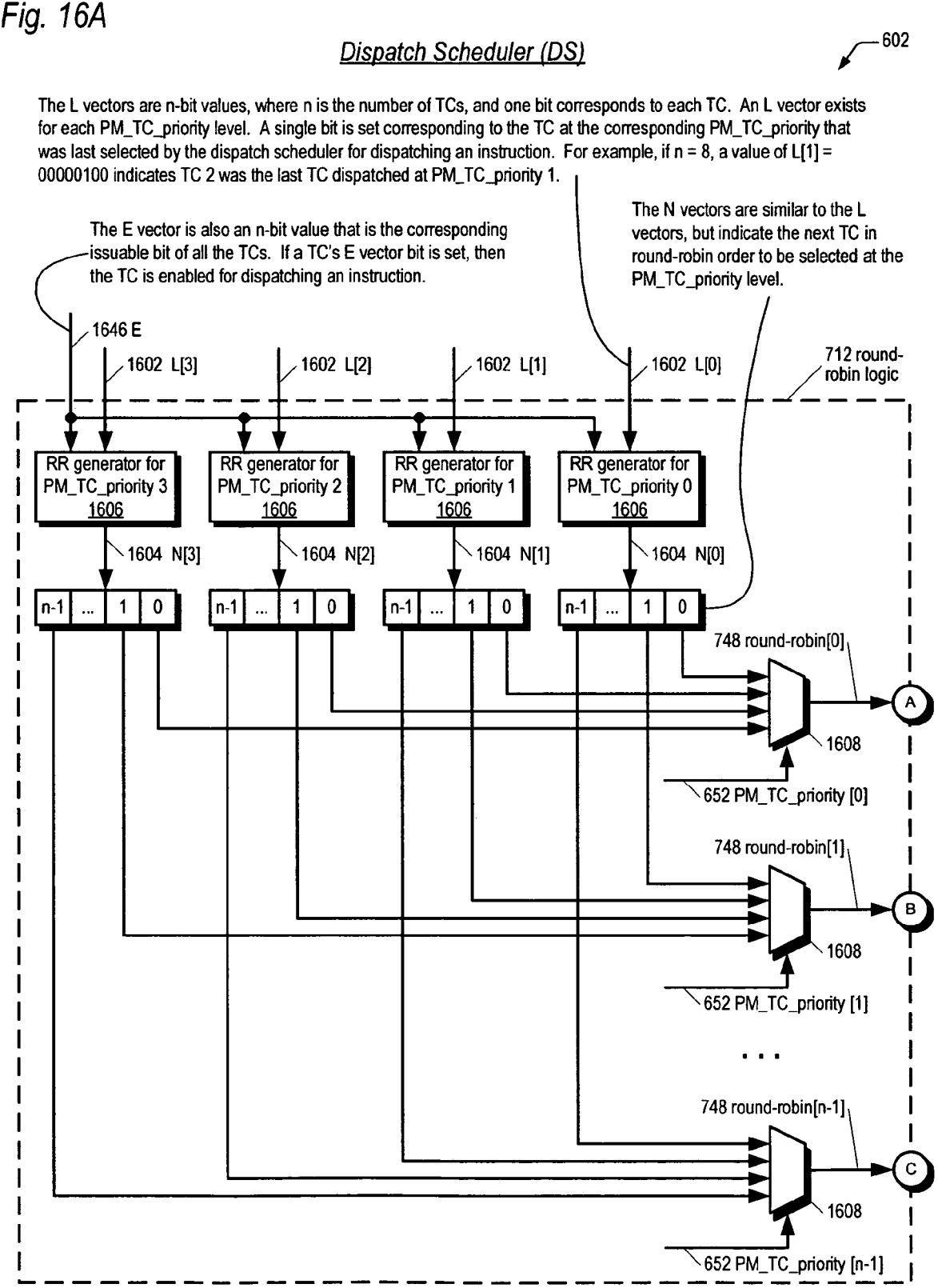
FIG. 16 is two block diagrams illustrating the dispatch scheduler of FIG. 6 including the round-robin logic of FIGS. 7 and 11 according to one embodiment of the present invention.
Figure 16B:
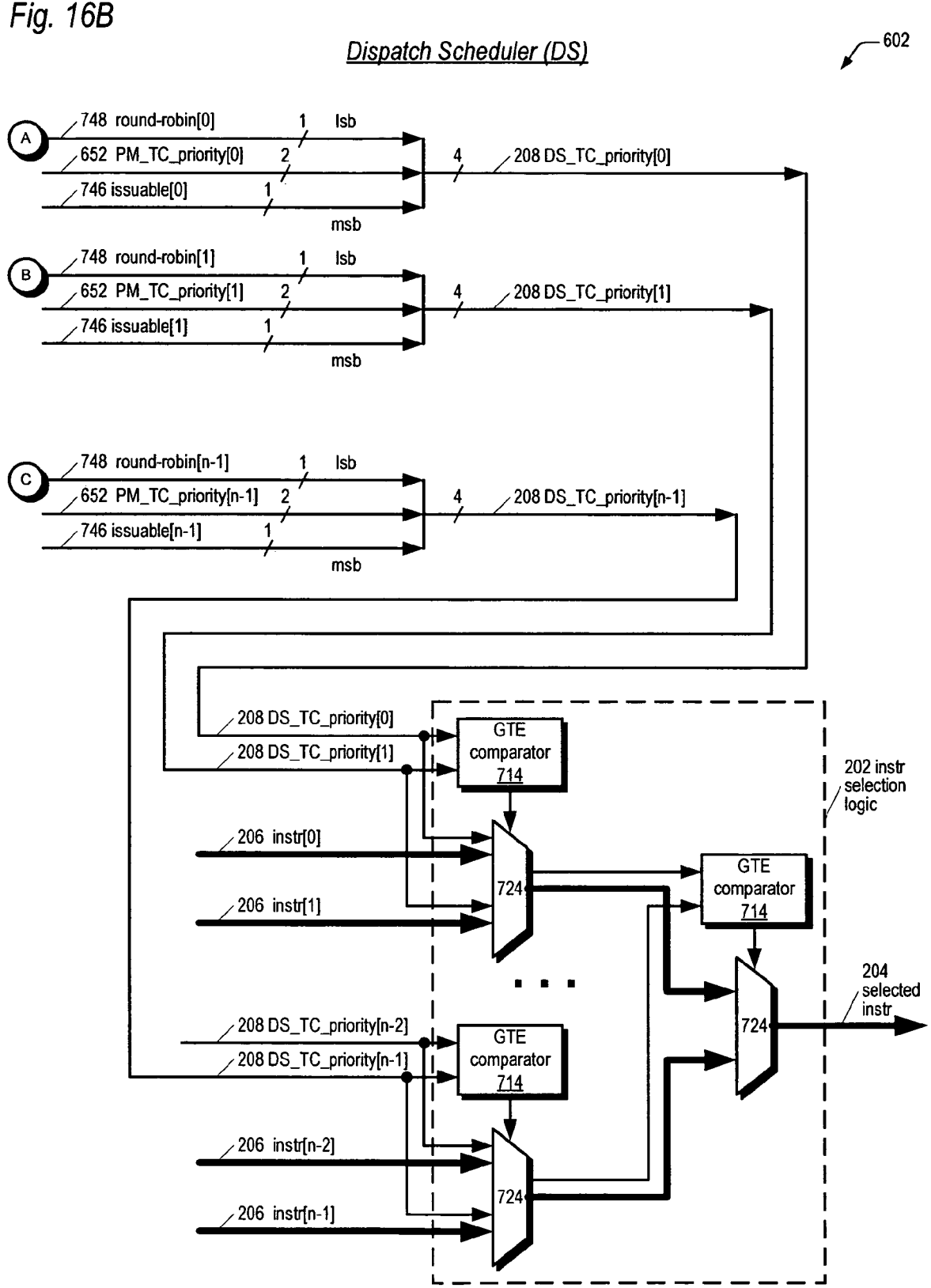

Referring now to FIG. 16, a block diagram illustrating the dispatch scheduler 602 of FIG. 6 including round-robin logic 712 of FIGS. 7 and 11 according to one embodiment of the present invention is shown. FIG. 16 comprises FIGS. 16A and 16B.

FIG. 16A illustrates the round-robin logic 712 of FIGS. 7 and 11 according to one embodiment of the present invention. The round-robin logic 712 includes four round-robin generators 1606: one for each of the four PM_TC_priority levels 652. Each of the round-robin generators 1606 receives an E vector 1646. The E vector 1646 is an n-bit vector, where n is the number of thread contexts and each of the thread contexts has a corresponding bit in the E vector 1646. A set bit in the E vector 1646 indicates that the corresponding thread context is enabled for instruction dispatching. In one embodiment, the E vector 1646 bits are the issuable bits 746 of FIGS. 7 and 11.

Each of the round-robin generators 1606 also receives an L vector 1602 that is unique to the corresponding PM_TC_priority 652. That is, there is an L vector 1602 for each of the four PM_TC_priority 652 levels. The L vectors 1602 are also n-bit vectors, where n is the number of thread contexts and each of the thread contexts has a corresponding bit in each of the four L vectors 1602. A set bit in an L vector 1602 indicates that the corresponding thread context was the last thread context at the corresponding PM_TC_priority 652 actually selected for instruction dispatching by the dispatch scheduler 602. Thus, for example, if the number of thread contexts is eight, an L vector 1602 value of 00000100 for PM_TC_priority 652 level 1 indicates thread context 2 was the last thread context dispatched at PM_TC_priority 652 level 1. In one embodiment, the L vector 1602 is generated by the instruction selection logic 202 and stored for provision to the round-robin logic 712. In one embodiment, each L vector 1602 is updated only when the dispatch scheduler 602 selects for dispatch an instruction from a thread context at the corresponding PM_TC_priority 652. Thus, advantageously, the L vector 1602 is maintained for each PM_TC_priority 652 level so that round-robin fairness is accomplished at each PM_TC_priority 652 level independent of the other PM_TC_priority 652 levels.

Each of the round-robin generators 1606 generates an N vector 1604 that is unique to the corresponding PM_TC_priority 652. The N vectors 1604 are also n-bit vectors, where n is the number of thread contexts and each of the thread contexts has a corresponding bit in each of the four N vectors 1604. A set bit in an N vector 1604 indicates that the corresponding thread context is the next thread context in round-robin order to be selected at the corresponding PM_TC_priority 652.

The round-robin logic 712 includes n four-input muxes 1608: one for each of the n thread contexts. Each mux 1608 receives its corresponding bit from each of the four N vectors 1604. That is, the mux 1608 for thread context 0 receives bit 0 from each of the N vectors 1604; mux 1608 for thread context 1 receives bit 1 from each of the N vectors 1604; and so forth, to the mux 1608 for thread context n−1 that receives bit n−1 from each of the N vectors 1604. Each mux 1608 also receives as a select control input the PM_TC_priority 652 value for its respective thread context. Each of the muxes 1608 selects the input specified by the PM_TC_priority 652 value. The output of each of the muxes 1608 is the corresponding round-robin bit 748 of FIGS. 7 and 11. The round-robin bits 748 are provided to the selection logic 202 of FIG. 16B.

Referring now to FIG. 16B, the round-robin bit 748 of each thread context is combined with its corresponding PM_TC_priority 652 bits and issuable bit 746 to form its corresponding DS_TC_priority 208 of FIGS. 7 and 11. FIG. 16B also includes the selection logic 202 of FIG. 7. In one embodiment, the comparators 714 of FIG. 7 are greater-than-or-equal (GTE) comparators. That is, the GTE comparators 714 compare the two DS_TC_priority 208 input values and if the top value is greater-than-or-equal to the lower value, the GTE comparator 714 outputs a control signal to cause its respective mux 724 to select the top value. The selection logic 202 is configured such that the top value always corresponds to a lower enumerated thread context, i.e., a thread context which has a bit in the L vectors 1602, N vectors 1604, and E vector 1646 that is more to the right, i.e., a less significant bit, than the bottom value. Thus, for example, in FIG. 16B, one of the comparators 714 receives the DS_TC_priority 208 for thread context 0 and thread context 1; if the DS_TC_priority 208 for thread context 0 is greater than or equal to the DS TC_priority 208 for thread context 1, then the comparator 714 will control its mux 724 to select the instruction 206 and DS_TC_priority 208 for thread context 0; otherwise (i.e., only if the DS_TC_priority 208 for thread context 0 is less than the DS_TC_priority 208 for thread context 1), the comparator 714 will control its mux 724 to select the instruction 206 and DS_TC_priority 208 for thread context 1.

Referring now to FIG. 17, a block diagram illustrating a round-robin generator 1606 of FIG. 16 according to one embodiment of the present invention is shown. Although only one round-robin generator 1606 is shown in FIG. 17, the dispatch scheduler 602 comprises one round-robin generator 1606 for each PM_TC_priority 652, as shown in FIG. 16A.

The round-robin generator 1606 includes a first set of inverters 1718 that receive the L vector 1602 of FIG. 16 and generate an n-bit ~L vector 1792. The round-robin generator 1606 also includes a second set of inverters 1716 that receive the E vector 1646 of FIG. 16 and generate an n-bit ~E vector 1796.

The round-robin generator 1606 also includes a barrel-incrementer 1712 that receives the L vector 1602, the ~L vector 1792, and the ~E vector 1796. The barrel-incrementer 1712 generates an S vector 1704, which is the sum of the L vector 1602 rotated left 1-bit and the Boolean AND of the ~E vector 1796 and the ~L vector 1792, according to two embodiments, as described in more detail below with respect to FIGS. 18A and 18B. In two other embodiments, the barrel-incrementer 1712 generates an S vector 1704, which is the sum of the L vector 1602 rotated left 1-bit and the ~E vector 1796, as described in more detail below with respect to FIGS. 18C and 18D.

The round-robin generator 1606 also includes a set of AND gates 1714 that perform the Boolean AND of the S vector 1704 and the E vector 1646 to generate the N vector 1604 of FIG. 16.

Referring now to FIG. 18A, a block diagram illustrating the barrel-incrementer 1712 of FIG. 17 according to one embodiment of the present invention is shown. The barrel-incrementer 1712 includes a plurality of full-adders 1802 coupled in series. In the embodiment illustrated in FIG. 18A, the full-adders 1802 are 1-bit full-adders, and the number of 1-bit full-adders 1802 is n, where n is the number of thread contexts. However, the barrel-incrementer 1712 may be incremented with fewer full-adders capable of adding larger addends, depending upon the number of thread contexts and speed and power requirements.

In the barrel-incrementer 1712 of FIG. 18A, each full-adder 1802 receives two addend bits and a carry-in bit and generates a corresponding sum bit of the S vector 1704 and a carry-out bit. Each full-adder 1802 receives as its carry-in the carry-out of the full-adder 1802 rotatively to its right. Thus, the right-most full-adder 1802 receives as its carry-in the carry-out of the left-most full-adder 1802. The first addend input to each of the full-adders 1802 is the Boolean AND of the corresponding ~E vector 1796 and ~L vector 1792 bits. The second addend input to each of the full-adders 1802 is the 1-bit left rotated version of the corresponding L vector 1602 bit. In the embodiment of FIG. 18A, the ~E vector 1796 is Boolean ANDed with the ~L vector 1792 to guarantee that at least one bit of the first addend to the full adders 1802 is clear. This prevents the single set increment bit of the second addend (the 1-bit left rotated L vector 1602) from infinitely rippling around the ring of full-adders 1802 of the barrel-incrementer 1712. As may be observed from FIG. 18A, the apparatus is aptly referred to as a "barrel-incrementer" because it increments one addend, namely the ~E vector 1796 (modified to guarantee at least one clear bit), by a single set bit in a left-rotative manner; furthermore, the single increment bit may increment the addend at any position in the addend.

By rotating left 1-bit the single set bit L vector 1602, the single set bit will be in the bit position with respect to the full-adders 1802 corresponding to the next thread context 1-bit rotatively left of the last thread context at the corresponding PM_TC_priority 652 for which the dispatch scheduler 602 dispatched an instruction. By using the ~E vector 1796 as the first addend input, the first addend has a set bit in each thread context position that is not enabled and a clear bit in each thread context position that is enabled. Consequently, the single set bit of the 1-bit left-rotated L vector 1602 addend will rotatively ripple left from its bit position until it reaches a clear bit position, i.e., a bit position of a thread context that is enabled. This is illustrated by the example here, in which only thread contexts 1 and 3 are enabled, and thread context 3 was the last dispatched thread context at the PM_TC_priority 652:

~E=11110101
L=00001000
L'=00010000 (L left-rotated 1-bit)
~E & ~L=11110101
S=00000110 (~E & ~L barrel-incremented by L')

However, if no thread contexts are enabled, the single set bit of the 1-bit left-rotated L vector 1602 addend will ripple left from its bit position until it returns where it started and stop there, as shown here:

~E=11111111
L=00001000
L'=00010000 (L left-rotated 1-bit)
~E & ~L=11110111
S=00001000 (~E & ~L barrel-incremented by L')

Further, if the single set bit of the 1-bit left-rotated L vector 1602 addend is clear in the ~E vector 1796, such as bit 4 here below, then bit 4 of the S vector 1704 will be set and the rotated L vector 1602 set bit will not ripple any further:

~E=11100011
L=00001000
L'=00010000 (L left-rotated 1-bit)
~E & ~L=11100011
S=11110011 (~E & ~L barrel-incremented by L')

Furthermore, the AND gate 1714 of FIG. 17 functions to guarantee that only one bit of the N vector 1604 is set. A bit vector in which only one bit is set is commonly referred to as a 1-hot, or one-hot, vector. For example, in the last example above, even though the S vector 1704 has multiple bits set, the AND gate 1714 generates a resulting N vector 1604 with a single set bit, as here:

~E=11100011
L=00001000
L'=00010000
~E & ~L=11100011
S=11110011
E=00011100
N=00010000

Generally, the barrel-incrementer 1712 of FIG. 18A may be described by the following equation:

{Cout.$i$, Sum.$i$}=$A.i+B.i+Cin.i$, where A.$i$ is one of the n bits of the ~E vector 1796 Boolean ANDed with the corresponding bit of the ~L vector 1792, B.$i$ is a 1-bit left rotated corresponding one of the n bits of the L vector 1602, Sum.$i$ is a binary sum of (A.$i$+B.$i$+Cin.$i$), Cout.$i$ is the carry out of (A.$i$+B.$i$+Cin.$i$), Cin.$i$=Cout.$i$-1, and Cin.0=Cout.n-1.

As may be observed from the foregoing, an advantage of the round-robin generator 1606 of FIG. 17 employing the barrel-incrementer 1712 of FIG. 18A is that its complexity is n, where n is the number of thread contexts, rather than $n^2$, as the conventional round-robin circuit. That is, the round-robin generator 1606 built around the barrel-incrementer 1712 of FIG. 18A scales linearly with the number of thread contexts. The same is true of the barrel-incrementer 1712 of FIGS. 18B-18D below.

Referring now to FIG. 18B, a block diagram illustrating the barrel-incrementer 1712 of FIG. 17 according to an alternate embodiment of the present invention is shown. The barrel-incrementer 1712 of FIG. 18B is an optimized version of the barrel-incrementer 1712 of FIG. 18A in which the full-adders 1802 are replaced with the combination of a half-adder 1812 and an OR gate 1814. The half-adder 1812 receives as its carry-in the output of the OR gate 1814. The OR gate 1814 receives as its two inputs the carry-out of the half-adder 1812 to its right and the corresponding 1-bit left-rotated L vector 1602 bit. Thus, collectively, the half-adder 1812 and OR gate 1814 combination performs the same function as the full-adder 1802 of the barrel-incrementer 1712 of FIG. 18A. The optimization of replacing the full-adder 1802 will a half-adder 1812 and OR gate 1814 is possible due to the fact that it is known that only one of the inputs to the OR gate 1814, if at all, will be true. That is, only one of the L vector 1602 input bit or the carry-out of the half-adder 1812 to the right will be true. An advantage of the barrel-incrementer 1712 of FIG. 18B is that it may be smaller and consume less power than the barrel-incrementer 1712 of FIG. 18A since it is optimized to take advantage of the fact that only one of the inputs to the OR gate 1814 will be true.

Generally, the barrel-incrementer 1712 of FIG. 18B may be described by the following equation:

{Cout.$i$, Sum.$i$}=$A.i+(B.i$ OR $Cin.i)$, where A.$i$ is one of the n bits of the ~E vector 1796 Boolean ANDed with the corresponding bit of the ~L vector 1792, B.$i$ is a 1-bit left rotated corresponding one of the n bits of the L vector 1602, Sum.$i$ is a binary sum of A.$i$+(B.$i$ OR Cin.$i$), Cout.$i$ is the carry out of A.$i$+(B.$i$ OR Cin.$i$), Cin.$i$=Cout.$i$-1, and Cin.0=Cout.n-1.

Because the embodiments of the barrel-incrementers 1712 of FIGS. 18A and 18B comprise a ring of adders in series, some automated logic synthesis tools may have difficulty synthesizing the circuit. In particular, they may generate a timing loop. To alleviate this problem, the embodiments of FIGS. 18C and 18D break the ring of adders by employing two rows of adders, as will now be described.

Referring now to FIG. 18C, a block diagram illustrating the barrel-incrementer 1712 of FIG. 17 according to an alternate embodiment of the present invention is shown. The embodiment of FIG. 18C employs a first row of full-adders 1822 and a second row of full-adders 1824 coupled in series, but not in a ring. That is, the carry-out of the left-most full-adder 1824 of the second row is not provided to the carry-in of the right-most full-adder 1822 of the first row. Rather, the first row of full-adders 1822 is coupled in series, and receives the same inputs as the full-adders 1802 of FIG. 18A; however, a binary zero value is provided to the carry-in of the right-most full-adder 1822 of the first row, the carry-out of the left-most full-adder 1822 of the first row is provided as the carry in the of the right-most full-adder 1824 of the second row, and the carry-out of the left-most full-adder 1824 of the second row is discarded. Furthermore, the sum output of the first row full-adders 1822, referred to as intermediate n-bit sum S' in FIG. 18C, is provided as the first addend input to the second row full-adders 1824. Still further, the second addend input to the second row full-adders 1824 is a binary zero, except for the right-most second row full-adder 1824, which receives the left-most bit of the L vector 1602. The second row of full-adders 1824 generates the S vector 1704. As may be observed, advantageously, the barrel-incrementer 1712 of FIG. 18C does not include a ring and therefore may be synthesized more successfully by some synthesis software tools than the embodiments of FIGS. 18A and 18B. However, a disadvantage of the barrel-incrementer 1712 of FIG. 18C is that it is larger than the embodiments of FIGS. 18A and 18B, and consumes more power, although its complexity is advantageously still n, rather than $n^2$. It is also noted that the embodiments of FIGS. 18C and 18D do not need the ~L vector 1792 input since there is not a ring of adders for the single increment bit of the second addend (i.e., the L vector 1602) to infinitely ripple around.

Referring now to FIG. 18D, a block diagram illustrating the barrel-incrementer 1712 of FIG. 17 according to an alternate embodiment of the present invention is shown. The barrel-incrementer 1712 of FIG. 18D is an optimized version of the barrel-incrementer 1712 of FIG. 18C in which each of the first row of full-adders 1822 is replaced with the combination of a half-adder 1832 and an OR gate 1834, similar to the embodiment of FIG. 18B; and, each of the second row full-adders 1824 is replaced with a half-adder 1836. Additionally, the second row includes a single OR gate 1838 that receives the left-most bit of the L vector 1602 and the carry-out of the left-most half-adder 1832 of the first row; the OR gate 1838 provides its output to the carry-in of the right-most half-adder 1836 of the second row. Thus, the barrel-incrementer 1712 of FIG. 18D enjoys the optimization benefits of the barrel-incrementer 1712 of FIG. 18B and the synthesis tool benefits of the barrel-incrementer 1712 of FIG. 18C.

Figure 19A:
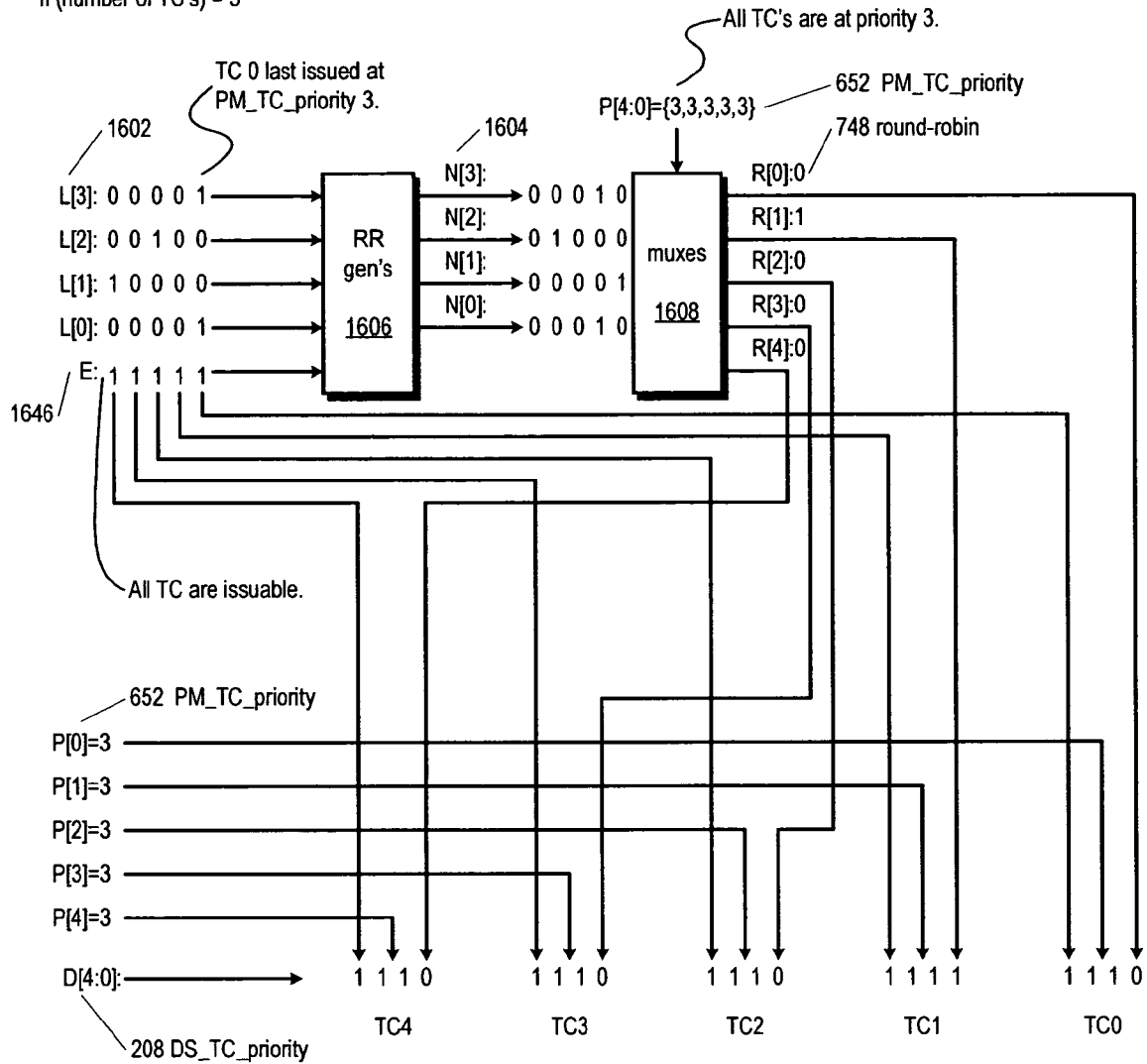
FIG. 19 is two block diagrams illustrating two examples of operation of the dispatch scheduler employing the round-robin generators of FIG. 16 according the present invention.

Referring now to FIG. 19A, a block diagram illustrating an example of operation of the dispatch scheduler 602 employing the round-robin generators 1606 of FIG. 16 according the present invention is shown. FIG. 19A includes collectively the round-robin generators 1606 and muxes 1608 of FIG. 16A. In the example, the number of thread contexts (denoted n) is 5, and the thread contexts are denoted 0 through 4. In the example, the number of PM_TC_priority 652 levels is 4, denoted 0 through 3.

In the example of FIG. 19A, all bits of the E vector 1646 are set, i.e., all thread contexts are enabled for dispatching an instruction; all of the thread contexts are at PM_TC_priority 652 level 3; the L vector 1602 for PM_TC_priority 652 level 3 is 00001, indicating the last thread context from which the dispatch scheduler 602 dispatched an instruction at PM_TC_priority 652 level 3 was thread context 0. The L vector 1602 for PM_TC_priority 652 levels 2, 1, and 0, are 00100, 10000, and 00001, respectively.

Given the inputs just described, the round-robin generators 1606 generate an N vector 1604 for PM_TC_priority 652 level 3 with a value of 00010, indicating that thread context 1 is selected as the next thread context in round-robin order for dispatch at PM_TC_priority 652 level 3. Thread context 1 is selected since it is the first thread context rotatively left of thread context 0 that is enabled, as indicated by a set bit in the E vector 1646. The round-robin generators 1606 generate an N vector 1604 value of 01000, 00001, and 00010 for PM_TC_priority 652 levels 2, 1, and 0, respectively.

Because each of the thread contexts are at PM_TC_priority 652 level 3, the corresponding mux 1608 for each thread context selects the corresponding bit of the N vector 1604 of PM_TC_priority 652 level 3. Consequently, the round-robin bit 748 for thread context 0 (denoted R[0] in FIG. 19A) is 0; the round-robin bit 748 for thread context 1 is 1; the round-robin bit 748 for thread context 2 is 0; the round-robin bit 748 for thread context 3 is 0; and the round-robin bit 748 for thread context 4 is 0. Therefore, the resulting DS_TC_priority 208 for thread contexts 0 through 4 are: 1110, 1111, 1110, 1110, and 1110, respectively. Consequently, the selection logic 202 selects thread context 1 for instruction dispatch because it has the greatest DS_TC_priority 208. It is noted that although all the thread contexts are enabled and all are at the same PM_TC_priority 652, thread context 1 is selected because it is the next thread context in left-rotative round-robin order from the last selected thread context (which was thread context 0) at the highest enabled PM_TC_priority 652 level.

Referring now to FIG. 19B, a block diagram illustrating a second example of operation of the dispatch scheduler 602 employing the round-robin generators 1606 of FIG. 16 according the present invention is shown. FIG. 19B is similar to FIG. 19A; however, the input conditions are different. In the example of FIG. 19B, the E vector 1646 value is 01011, i.e., only thread contexts 0, 1, and 3 are enabled for dispatching an instruction; thread contexts 2 and 4 are at PM_TC_priority 652 level 3, thread contexts 1 and 3 are at PM_TC_priority 652 level 2, and thread context 0 is at PM_TC_priority 652 level 1; the L vector 1602 for PM_TC_priority 652 levels 3 through 0 are 01000, 00010, 10000, 00010, indicating the last thread context from which the dispatch scheduler 602 dispatched an instruction at PM_TC_priority 652 levels 3 through 0 are 3, 1, 4, and 1, respectively.

Given the inputs just described, the round-robin generators 1606 generate an N vector 1604 for PM_TC_priority 652 levels 3 through 0 with a value of 00001, 01000, 00001, and 01000, respectively, indicating that thread contexts 0, 3, 0, and 3, respectively, are selected as the next thread context in round-robin order for dispatch within PM_TC_priority 652 levels 3 through 0, respectively. It is noted that thread context 4 is skipped over in the PM_TC_priority 652 level 3 N vector 1604 since thread context 4 is not enabled, even though thread context 4 is the next thread context rotatively-left of thread context 3, which was the last selected thread context at PM_TC_priority 652 level 3; similarly, thread context 2 is skipped over in PM_TC_priority 652 levels 2 and 0 since thread context 2 is not enabled.

Because thread contexts 2 and 4 are at PM_TC_priority 652 level 3, the corresponding muxes 1608 select the corresponding bit of the N vector 1604 of PM_TC_priority 652 level 3; because thread contexts 1 and 3 are at PM_TC_priority 652 level 2, the corresponding muxes 1608 select the corresponding bit of the N vector 1604 of PM_TC_priority 652 level 2; because thread context 0 is at PM_TC_priority 652 level 1, the corresponding mux 1608 selects the corresponding bit of the N vector 1604 of PM_TC_priority 652 level 1. Consequently, the round-robin bit 748 for thread contexts 0 through 4 are 1, 0, 0, 1, and 0, respectively. Therefore, the resulting DS_TC_priority 208 for thread contexts 0 through 4 are: 1011, 1100, 0110, 1101, and 0110, respectively. Consequently, the selection logic 202 selects thread context 3 for instruction dispatch because it has the greatest DS_TC_priority 208. It is noted that although thread context 1 is also enabled and at the highest PM_TC_priority 652 that is enabled (PM TC_priority 652 level 2), thread context 3 is selected because the bit corresponding to thread context 3 in the N vector 1604 for PM_TC_priority 652 level 2 is set (hence the round-robin bit 748 for thread context 3 is set) and the bit corresponding to thread context 1 is clear (hence the round-robin bit 748 for thread context 1 is clear).

Figure 20:
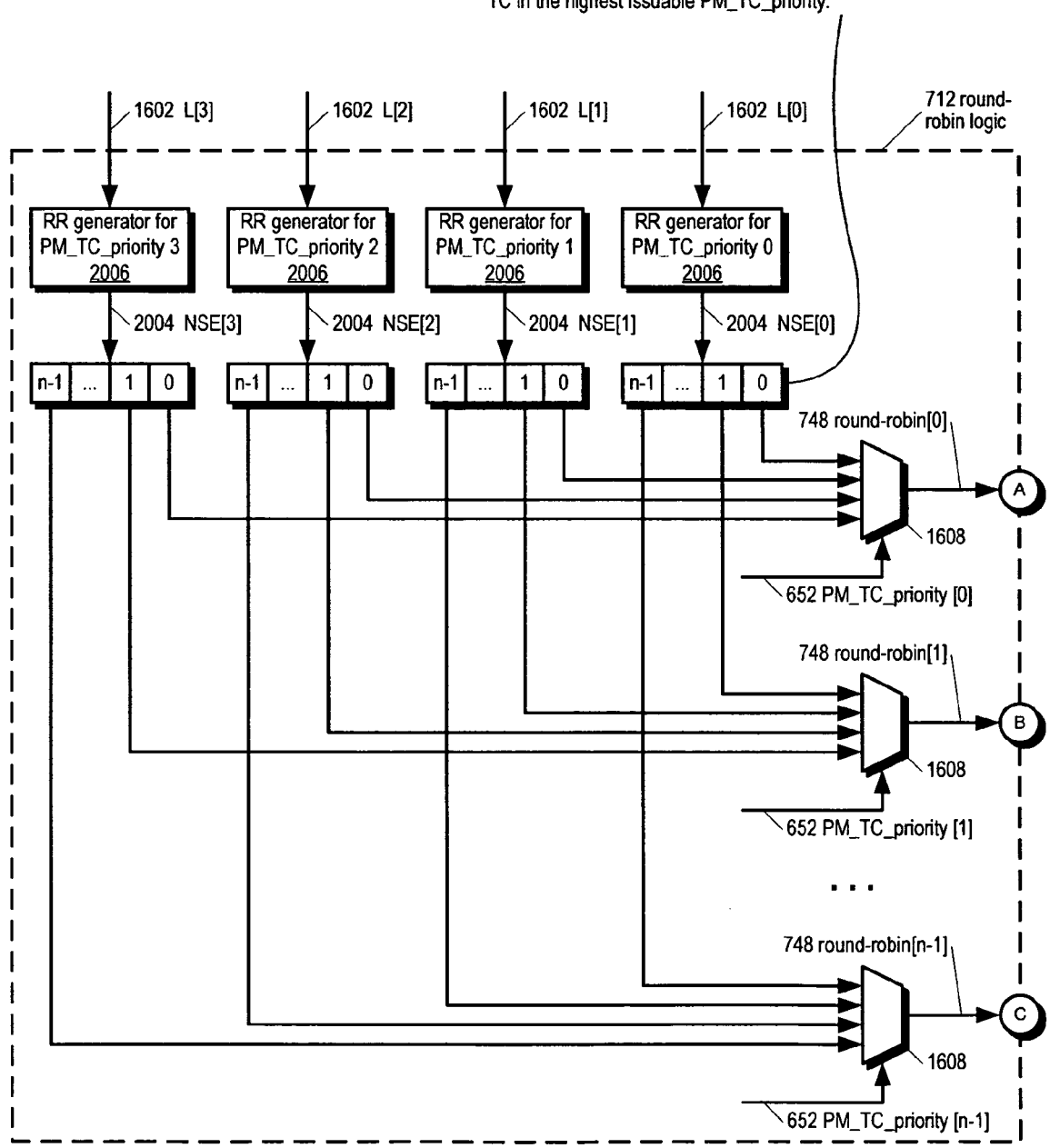
FIG. 20 is a block diagram illustrating the dispatch scheduler of FIG. 6 including the round-robin logic of FIGS. 7 and 11 according to an alternate embodiment of the present invention.

Referring now to FIG. 20, a block diagram illustrating the dispatch scheduler 602 of FIG. 6 including round-robin logic 712 of FIGS. 7 and 11 according to an alternate embodiment of the present invention is shown. The dispatch scheduler 602 of FIG. 20 is similar to the dispatch scheduler 602 of FIG. 16, except that the round-robin generators 2006 of FIG. 20 are different from the round-robin generators 1606 of FIG. 16, as described below with respect to FIGS. 21 and 22. The portion of the dispatch scheduler 602 shown in FIG. 16B is similar to a like portion of the alternate embodiment of FIG. 20, and is therefore not duplicated in the Figures.

In one aspect, the round-robin generators 2006 of FIG. 20 are different from the round-robin generators 1606 of FIG. 16 because they do not receive the E vector 1646. In another aspect, the round-robin generators 2006 each generate a corresponding NSE vector 2004, rather than the N vector 1604 generated by the round-robin generators 1606 of FIG. 16. The NSE vectors 2004 are similar to the N vectors 1604, however, the NSE vectors 2004 are sign-extended; thus, the NSE vectors 2004 are not 1-hot. Consequently, by design, two or more thread contexts may have an equal highest DS_TC_priority 208. The greater-than-or-equal comparators 714 of FIG. 16B work in conjunction with the round-robin bits 748 selected from the NSE vectors 2004 to select the desired round-robin thread context in the highest enabled PM_TC_priority 652, as described below. For example, assume the NSE vector 2004 at one of the PM_TC_priority 652 levels is 11100. This value indicates that thread contexts 4, 3, and 2 have priority over thread contexts 1 and 0 with respect to round-robin order selection. If, for example, all of the thread contexts are at this PM_TC_priority 652 level, the GTE comparators 714 of the dispatch scheduler 602 will search for an issuable thread context in the order 2, 3, 4, 0, 1.

Referring now to FIG. 21, a block diagram illustrating the round-robin generator 2006 of FIG. 20 according to one embodiment of the present invention is shown. Although only one round-robin generator 2006 is shown in FIG. 21, the dispatch scheduler 602 comprises one round-robin generator 2006 for each PM_TC_priority 652, as shown in FIG. 20. An advantage of the alternate embodiment of the round-robin generator 2006 of FIG. 21 that employs the sign-extended character of the NSE vector 2004 is that the NSE vectors 2004 may be calculated independent of the E vector 1646, i.e., independent of the instruction issuability of the thread contexts, unlike the round-robin generator 1606 embodiment of FIG. 17.

The round-robin generator 2006 includes a mux 2102 that receives as its two inputs the L vector 1602 and the output of a register 2124. The register 2124 receives and stores the output of the mux 2102. The mux 2102 also receives an instr_dispatched control signal 2158 that is true if an instruction is dispatched from the corresponding PM_TC_priority 652 during the current dispatch cycle; otherwise, the instr_dispatched control signal 2158 is false. In one embodiment, the instr_dispatched signal 2158 may be false for all PM_TC_priority 652 levels, such as if no thread contexts have an issuable instruction or if the execution pipeline 114 is stalled and currently unable to receive instructions to execute. The mux 2102 selects the L vector 1602 input if the instr_dispatched control signal 2158 is true; otherwise, the mux 2102 selects the register 2124 output. Thus, mux 2102 and register 2124 work in combination to retain the old L vector 1602 value until an instruction is dispatched by the dispatch scheduler 602 at the corresponding PM_TC_priority 652 level. Thus, advantageously, round-robin order is retained within the PM_TC_priority 652 level independent of the other PM_TC_priority 652 levels.

The round-robin generator 2006 also includes a rotate left 1-bit function 2106 configured to receive and rotate the output of the register 2124 left 1-bit. Hence, the output of the rotate left 1-bit function 2106 is a 1-hot vector pointing to the thread context rotatively-left of the last dispatched thread context bit. For example, if n is 8, and if the L vector 1602 value is 10000000, then the output of the rotate left 1-bit function 2106 is 00000001.

The round-robin generator 2006 also includes a sign-extender 2108 configured to receive the output of the rotate left 1-bit function 2106 and to sign-extend it to generate the NSE vector 2004 of FIG. 20. For example, if the L vector 1602 value is 00000100, then the output of the sign-extender 2108 is 11111000. In one embodiment, the rotate left 1-bit function 2106 does not include any active logic, but simply comprises signal wires routed appropriately from the register 2124 output to the sign-extender 2108 input to accomplish the 1-bit left rotation.

Referring now to FIG. 22A, a block diagram illustrating a first example of operation of the dispatch scheduler 602 having round-robin generators 2006 of FIG. 20 according the present invention is shown. FIG. 22A is similar to FIG. 19A; however, FIG. 22A illustrates collectively the round-robin generators 2006, rather than the round-robin generators 1606 of FIG. 16. Additionally, the L vector 1602 input for PM_TC_priority 652 level 3 is 00010, rather than 00001. Finally, the round-robin generators 2006 do not receive the E vector 1646.

Given the inputs of FIG. 22A, the round-robin generators 2006 generate an NSE vector 2004 for PM_TC_priority 652 level 3 with a value of 11100, indicating that thread context 2 is selected as the next thread context in round-robin order for dispatch at PM_TC_priority 652 level 3. Thread context 2 is selected since it is the first thread context rotatively left of thread context 1. The round-robin generators 2006 generate an NSE vector 2004 value of 11000, 11111, and 11110 for PM_TC_priority 652 levels 2, 1, and 0, respectively.

Because each of the thread contexts are at PM_TC_priority 652 level 3, the corresponding mux 1608 for each thread context selects the corresponding bit of the N vector 2004 of PM_TC_priority 652 level 3. Consequently, the round-robin bit 748 for thread context 0 is 0; the round-robin bit 748 for thread context 1 is 0; the round-robin bit 748 for thread context 2 is 1; the round-robin bit 748 for thread context 3 is 1; and the round-robin bit 748 for thread context 4 is 1. Therefore, the resulting DS_TC_priority 208 for thread contexts 0 through 4 are: 1110, 1110, 1111, 1111, and 1111, respectively. Consequently, the selection logic 202 selects thread context 2 for instruction dispatch because it has the greatest or equal DS_TC_priority 208. More specifically, thread context 2 is the highest thread context in the instruction selection logic 202 mux tree (i.e., it has the right-most bit in the NSE vector 2004) that has the greatest or equal DS_TC_priority 208. It is noted that although all thread contexts are enabled and all are at the same PM_TC_priority 652, thread context 2 is selected because it is the next thread context in left-rotative round-robin order from the last selected thread context (which was thread context 1) at the highest enabled PM_TC_priority 652 level.

Figure 22B:
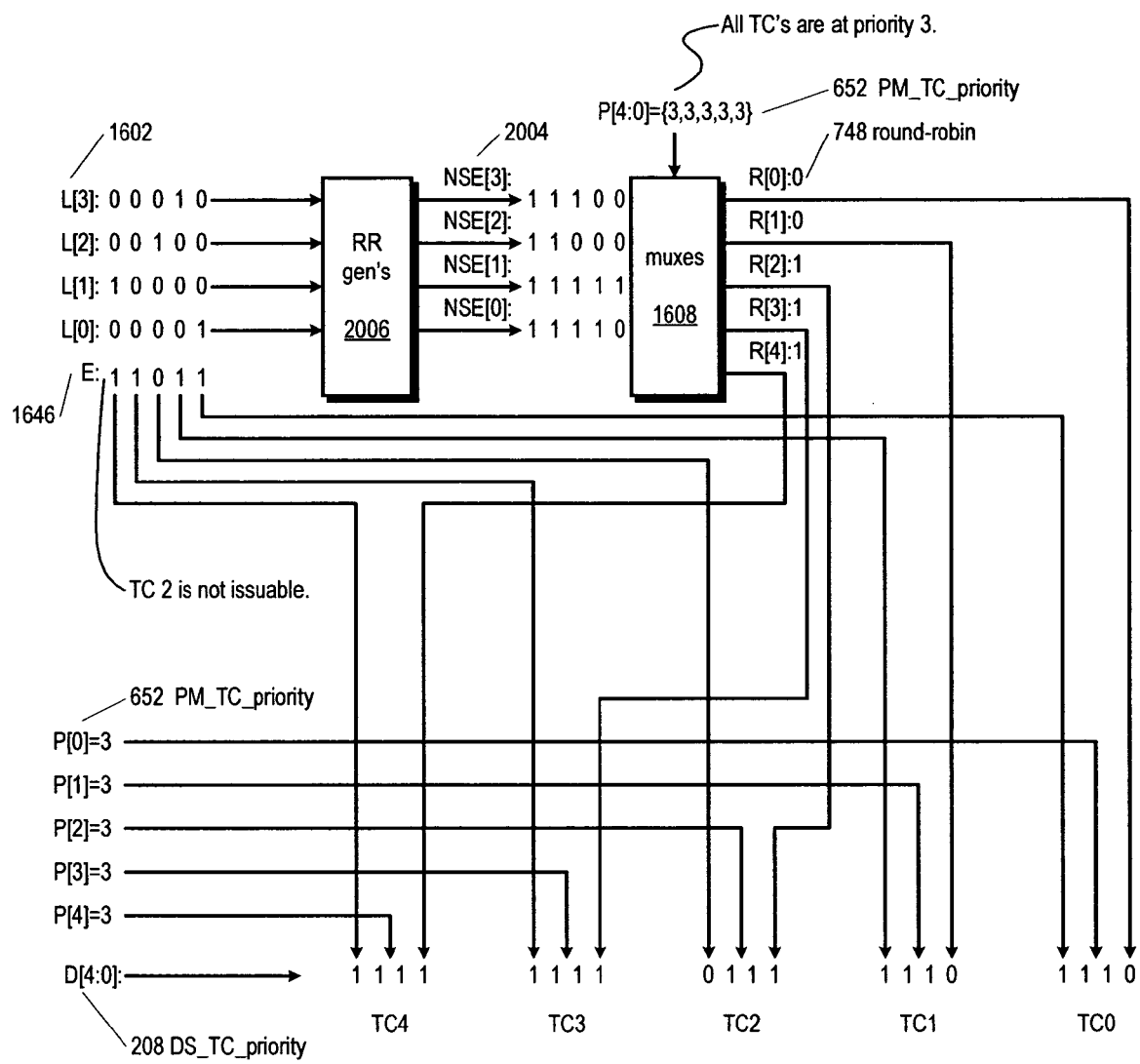
FIG. 22 is four block diagrams illustrating four examples of operation of the dispatch scheduler having round-robin generators of FIG. 20 according the present invention.

Referring now to FIG. 22B, a block diagram illustrating a second example of operation of the dispatch scheduler 602 employing the round-robin generators 2006 of FIG. 20 according to the present invention is shown. FIG. 22B is similar to FIG. 22A; however, the input conditions are different. In the example of FIG. 22B, the E vector 1646 value is 11011, i.e., thread context 2 is disabled for dispatching an instruction.

Given the inputs just described, the round-robin generators 2006 generate an NSE vector 2004 for PM_TC_priority 652 levels 3 through 0 with a value of 11100, 11000, 11111, and 11110, respectively, indicating that thread contexts 2, 3, 0, and 1, respectively, are the next thread context in round-robin order for dispatch within PM_TC_priority 652 levels 3 through 0, respectively.

Because all the thread contexts are at PM_TC_priority 652 level 3, the corresponding muxes 1608 select the corresponding bit of the NSE vector 2004 of PM_TC_priority 652 level 3. Consequently, the round-robin bit 748 for thread contexts 0 through 4 are 0, 0, 1, 1, and 1, respectively. Therefore, the resulting DS_TC_priority 208 for thread contexts 0 through 4 are: 1110, 1110, 0111, 1111, and 1111, respectively. Consequently, the selection logic 202 selects thread context 3 for instruction dispatch because it is the highest thread context in the instruction selection logic 202 mux tree that has the greatest or equal DS_TC_priority 208. It is noted that although thread context 2 is also at PM_TC_priority 652 level 3 and has its round-robin bit 748 set and is higher in the instruction selection logic 202 mux tree, it is not selected because it is not enabled.

Figure 22C:
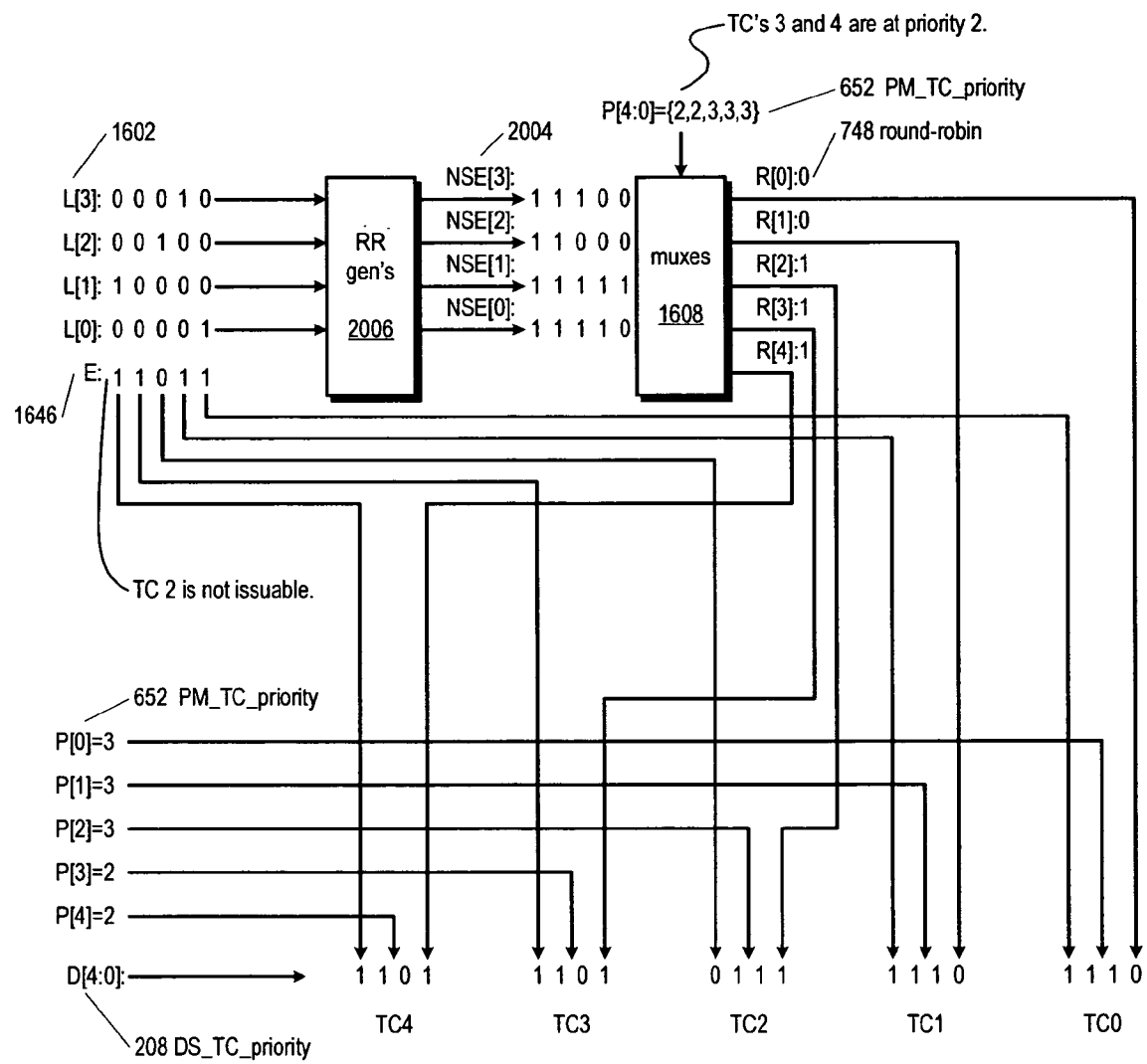

Referring now to FIG. 22C, a block diagram illustrating a third example of operation of the dispatch scheduler 602 employing the round-robin generators 2006 of FIG. 20 according the present invention is shown. FIG. 22C is similar to FIG. 22B; however, the input conditions are different: thread contexts 3 and 4 are at PM_TC_priority 652 level 2 instead of level 3.

Given the inputs to FIG. 22C, the round-robin generators 2006 generate an NSE vector 2004 for PM_TC_priority 652 levels 3 through 0 with a value of 11100, 11000, 11111, and 11110, respectively, indicating that thread contexts 2, 3, 0, and 1, respectively, are the next thread context in round-robin order for dispatch within PM_TC_priority 652 levels 3 through 0, respectively.

Because thread contexts 0, 1, and 2, are at PM_TC_priority 652 level 3, the corresponding muxes 1608 select the corresponding bit of the NSE vector 2004 of PM_TC_priority 652 level 3; because thread contexts 3 and 4 are at PM_TC_priority 652 level 2, the corresponding muxes 1608 select the corresponding bit of the NSE vector 2004 of PM_TC_priority 652 level 2. Consequently, the round-robin bit 748 for thread contexts 0 through 4 are 0, 0, 1, 1, and 1, respectively. Therefore, the resulting DS_TC_priority 208 for thread contexts 0 through 4 are: 1110, 1110, 0111, 1101, and 1101, respectively. Consequently, the selection logic 202 selects thread context 0 for instruction dispatch because it is the highest thread context in the instruction selection logic 202 mux tree that has the greatest or equal DS_TC_priority 208. It is noted that although thread context 2 is also at PM_TC_priority 652 level 3 and has its round-robin bit 748 set and is higher in the instruction selection logic 202 mux tree, it is not selected because it is not enabled. Furthermore, although thread contexts 3 and 4 also have their round-robin bits 748 set and are enabled, they are at PM_TC_priority 652 level 2, which is lower than thread context 0, which is at PM_TC_priority 652 level 3.

Figure 22D:
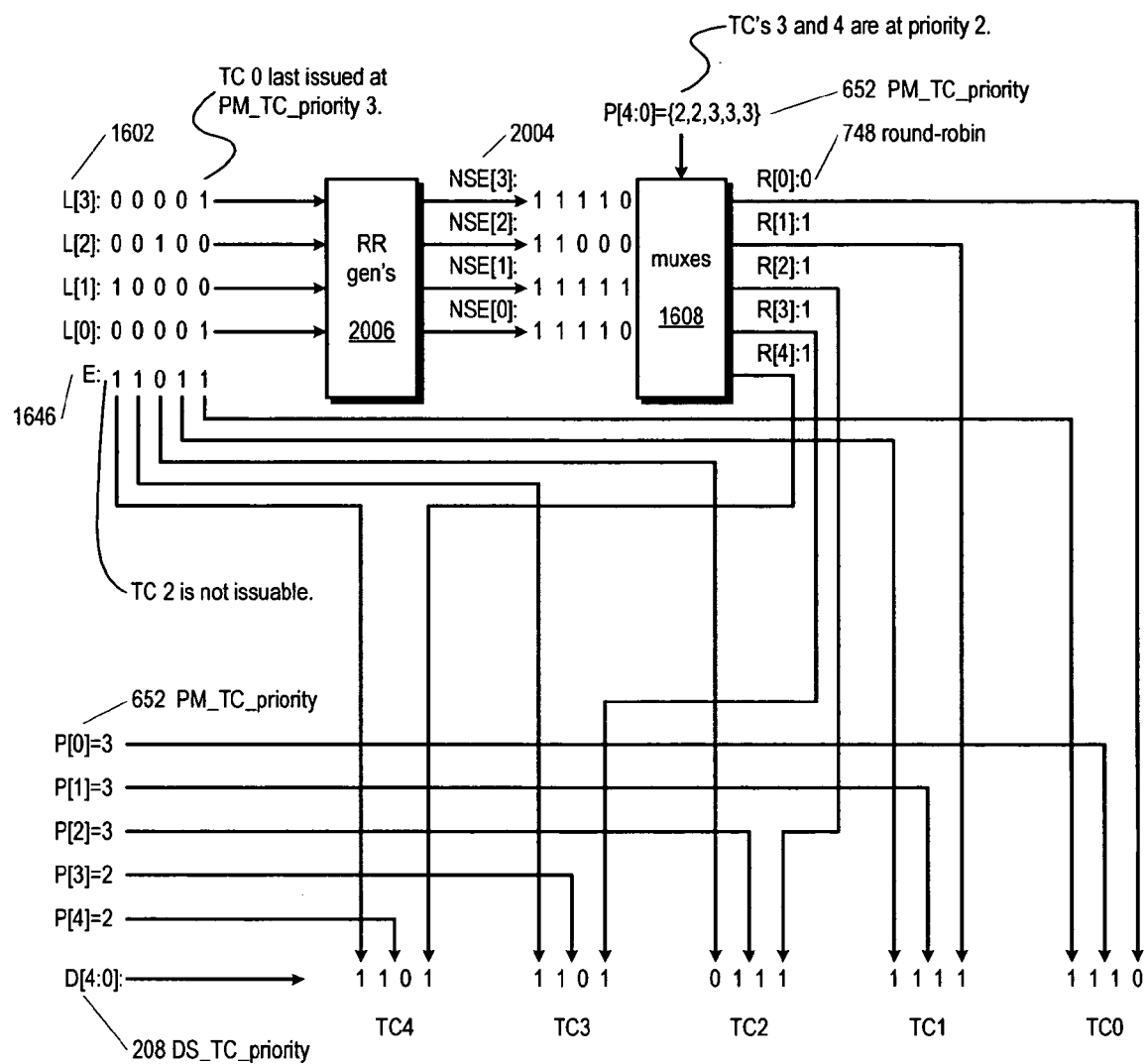

Referring now to FIG. 22D, a block diagram illustrating a fourth example of operation of the dispatch scheduler 602 employing the round-robin generators 2006 of FIG. 20 according the present invention is shown. FIG. 22D is similar to FIG. 22C; however, the input conditions are different: the L vector 1602 for PM_TC_priority 652 level 3 is 00001, indicating that thread context 0 was the last thread context dispatched at PM_TC_priority 652 level 3, rather than thread context 1 as in FIG. 22C.

Given the inputs to FIG. 22D, the round-robin generators 2006 generate an NSE vector 2004 for PM_TC_priority 652 levels 3 through 0 with a value of 11110, 11000, 11111, and 11110, respectively, indicating that thread contexts 1, 3, 0, and 1, respectively, are the next thread context in round-robin order for dispatch within PM_TC_priority 652 levels 3 through 0, respectively.

Because thread contexts 0, 1, and 2, are at PM_TC_priority 652 level 3, the corresponding mux 1608 for each selects the corresponding bit of the NSE vector 2004 of PM_TC_priority 652 level 3; because thread contexts 3 and 4 are at PM_TC_priority 652 level 2, the corresponding mux 1608 for each selects the corresponding bit of the NSE vector 2004 of PM_TC_priority 652 level 2. Consequently, the round-robin bit 748 for thread contexts 0 through 4 are 0, 1, 1, 1, and 1, respectively. Therefore, the resulting DS_TC_priority 208 for thread contexts 0 through 4 are: 1110, 1111, 0111, 1101, and 1101, respectively. Consequently, the selection logic 202 selects thread context 1 for instruction dispatch because it is the highest thread context in the instruction selection logic 202 mux tree that has the greatest or equal DS_TC_priority 208. It is noted that although thread context 2 is also at PM_TC_priority 652 level 3 and is enabled, its round-robin bit 748 is clear, whereas the round-robin bit 748 for thread context 1 is set, which causes the instruction selection logic 202 to select thread context 1 for dispatch.

Figure 23:
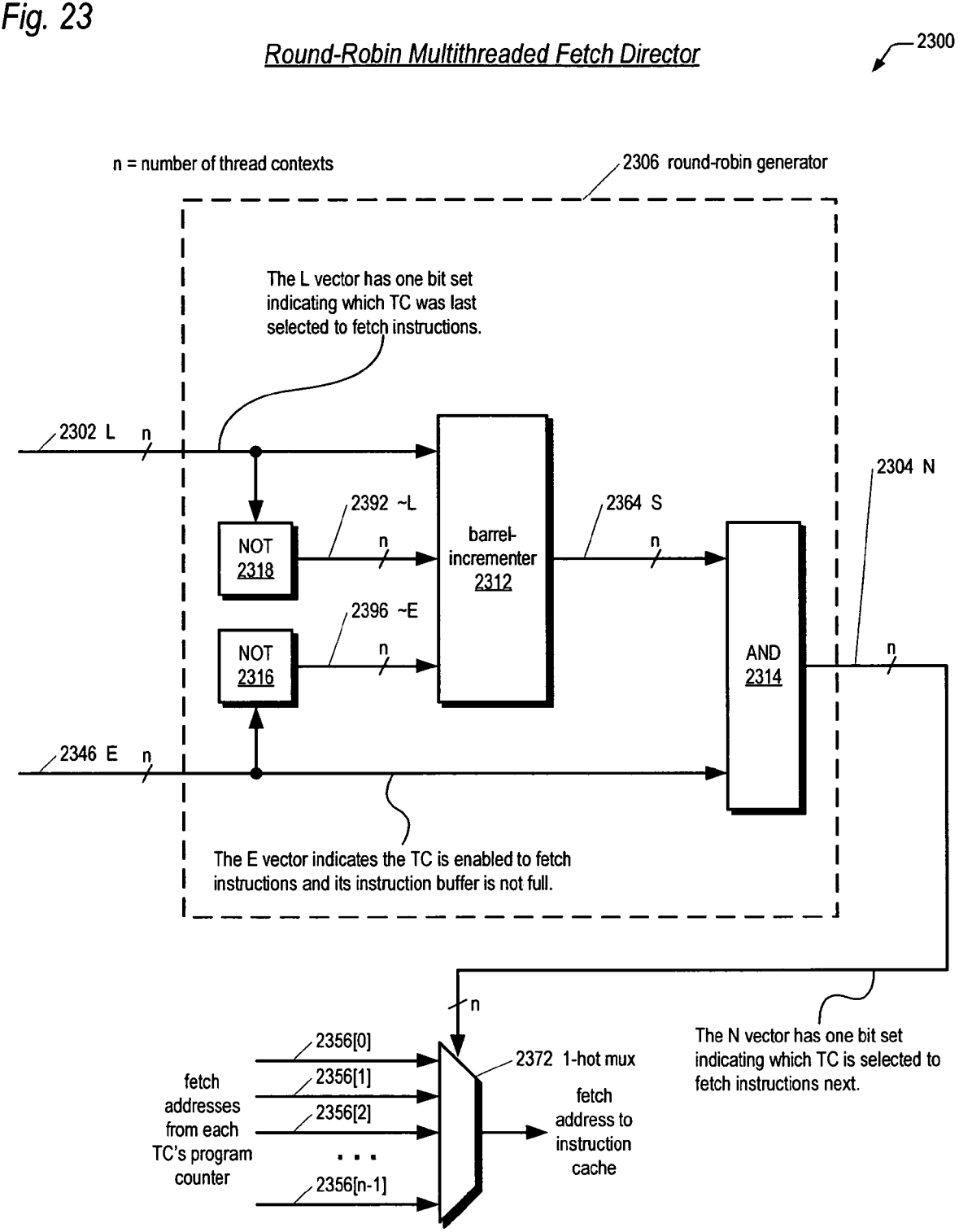
FIG. 23 is a block diagram illustrating a round-robin multithreaded fetch director for operation in the instruction fetcher of FIG. 1 according to the present invention.

Referring now to FIG. 23, a block diagram illustrating a round-robin multithreaded fetch director 2300 for operation in the instruction fetcher 104 of FIG. 1 according to the present invention is shown. The fetch director 2300 incorporates a barrel-incrementer-based round-robin generator 2306 similar to the round-robin generators 1606 of the dispatch scheduler 602 of FIG. 17. As discussed above, the microprocessor 100 concurrently fetches instructions from the instruction cache 102 of FIG. 1 for each thread context that is enabled for execution.

Each thread context includes a program counter (PC) register that stores the address of the next instruction in the thread of execution. The upper portion of the address stored in the program counter register is a fetch address 2356 used to fetch instruction bytes from the instruction cache 102. For example, in one embodiment the size of a cache line is 32 bytes, and the fetch address 2356 comprises all of the program counter address bits except the lower 5 bits. The fetch address 2356 of each of the thread contexts is provided to a mux 2372 of the fetch director 2300. Each clock cycle, the fetch director 2300 mux 2372 selects one of the thread context fetch addresses 2356 to provide to the instruction cache 102 to select a cache line of instruction bytes. In one embodiment, the fetch director 2300 fetches two instructions for the selected thread context per fetch cycle; however, the fetch director 2300 is adaptable to fetch more or less instructions each cycle as required by the design of the microprocessor 100.

In the embodiment of FIG. 23, the mux 2372 is a 1-hot mux. A 1-hot mux is a mux that receives a decoded version of a select control signal such that there is one select signal per data input, and only one of the select input bits can be true, and the true select bit selects its corresponding data input for the output. The select control signal received by the mux 2372 is a 1-hot N vector 2304 similar to the N vector 1604 of FIG. 16. In particular, the N vector 2304 is an n-bit vector, where n is the number of thread contexts, and each of the thread contexts has a corresponding bit in the N vector 2304, and only one bit of the N vector 2304 is set corresponding to the thread context selected next for instruction fetching.

The fetch director 2300 receives an L vector 2302. The L vector 2302 is similar to the L vector 1602 of FIG. 16. In particular, the L vector 2302 is an n-bit vector, where n is the number of thread contexts, and each of the thread contexts has a corresponding bit in the L vector 2302, and only one bit of the L vector 2302 is set corresponding to the thread context last selected for instruction fetching.

The fetch director 2300 also includes two sets of inverters 2316 and 2318, a barrel-incrementer 2312, and a set of AND gates 2314, similar to inverters 1716 and 1718, barrel-incrementer 1712, and AND gates 1714, respectively, of FIG. 17. The barrel-incrementer 2312 may be configured according to any of the embodiments of FIGS. 18A through 18D.

The first set of inverters 2318 receive the L vector 2302 and generate an n-bit ~L vector 2392. The second set of inverters 2316 receive an n-bit E vector 2346 and generate an n-bit ~E vector 2396. The E vector 2346 is similar to the E vector 1646 of FIG. 17, except that the E vector 2346 of FIG. 23 indicates that the corresponding thread context is enabled for instruction fetching, rather than that the corresponding thread context is enabled for instruction dispatching. Although the microprocessor 100 includes hardware to support multiple thread contexts, fewer than all of the thread contexts may be allocated and enabled for execution by software at a given time. For example, when the microprocessor 100 is reset, initially only one thread context is allocated and enabled for execution. In one embodiment, a thread context does not request instruction fetching (i.e., its respective E vector 2346 bit is not set) if it is not enabled for execution or if its instruction buffer 106 of FIG. 1 is full. In one embodiment, a thread context does not request instruction fetching if the most recent fetch for the thread context caused a miss in the instruction cache 102 and the missing cache line has not yet been filled.

The barrel-incrementer 2312 receives the L vector 2302, the ~L vector 2392, and the ~E vector 2396. The barrel-incrementer 2312 generates an S vector 2364, which is the sum of the L vector 2302 rotated left 1-bit and the Boolean AND of the ~E vector 2396 and the ~L vector 2392, according to the two embodiments of FIGS. 18A and 18B; alternatively, the barrel-incrementer 2312 generates an S vector 2364, which is the sum of the L vector 2302 rotated left 1-bit and the ~E vector 2396, according to the two embodiments of FIGS. 18C and 18D.

The AND gates 2314 perform the Boolean AND of the S vector 2364 and the E vector 2346 to generate the N vector 2304, which is provided as the 1-hot select control input for the 1-hot mux 2372.

As may be observed, the fetch director 2300 advantageously selects among the thread contexts for instruction fetching in a fair round-robin manner, and allows for disabled states (i.e., not all thread contexts may be enabled to request instruction fetching each selection cycle), and yet has complexity n, wherein n is the number of thread contexts, rather than complexity $n^2$, as in a conventional round-robin circuit supporting a variable number of enabled requestors. Advantageously, the fetch director 2300 scales linearly with the number of thread contexts, which may be of substantial importance in a microprocessor 100 that supports a relatively large number of thread contexts.

In one embodiment, the fetch director 2300 is pipelined to enable an increase in the clock frequency of the microprocessor 100. In particular, a register is coupled between the output of AND gate 2314 and the select control input of 1-hot mux 2372 for receiving the N vector 2304 from the AND gate 2314 during one clock cycle and providing the N vector 2304 to the 1-hot mux 2372 on the next clock cycle. In this embodiment, under some circumstances the access of the instruction cache 102 is aborted during the second cycle. For example, if the fetch director 2300 receives a late indication that the previous fetch of the instruction cache 102 for the thread context selected by the N vector 2304 caused a miss in the instruction cache 102, then the fetch director 2300 will abort the instruction cache 102 access. In one embodiment, the output of the register provides the L vector 1602 to the round-robin generator 2306.

In one embodiment, the N vector 2304, in addition to selecting a fetch address 2356 for provision to the instruction cache 102, is also used to select one of a plurality of nano-TLBs (translation lookaside buffers) associated with the thread contexts in a hierarchical TLB system, such as the TLB system described in related U.S. patent application Ser. No. 11/075,041, entitled THREE-TIERED TRANSLATION LOOKASIDE BUFFER HIERARCHY IN A MULTI-THREADING MICROPROCESSOR, having at least one common inventor and which is assigned to common assignee MIPS Technologies, Inc., and which is incorporated by reference herein for all purposes.

Figure 24:
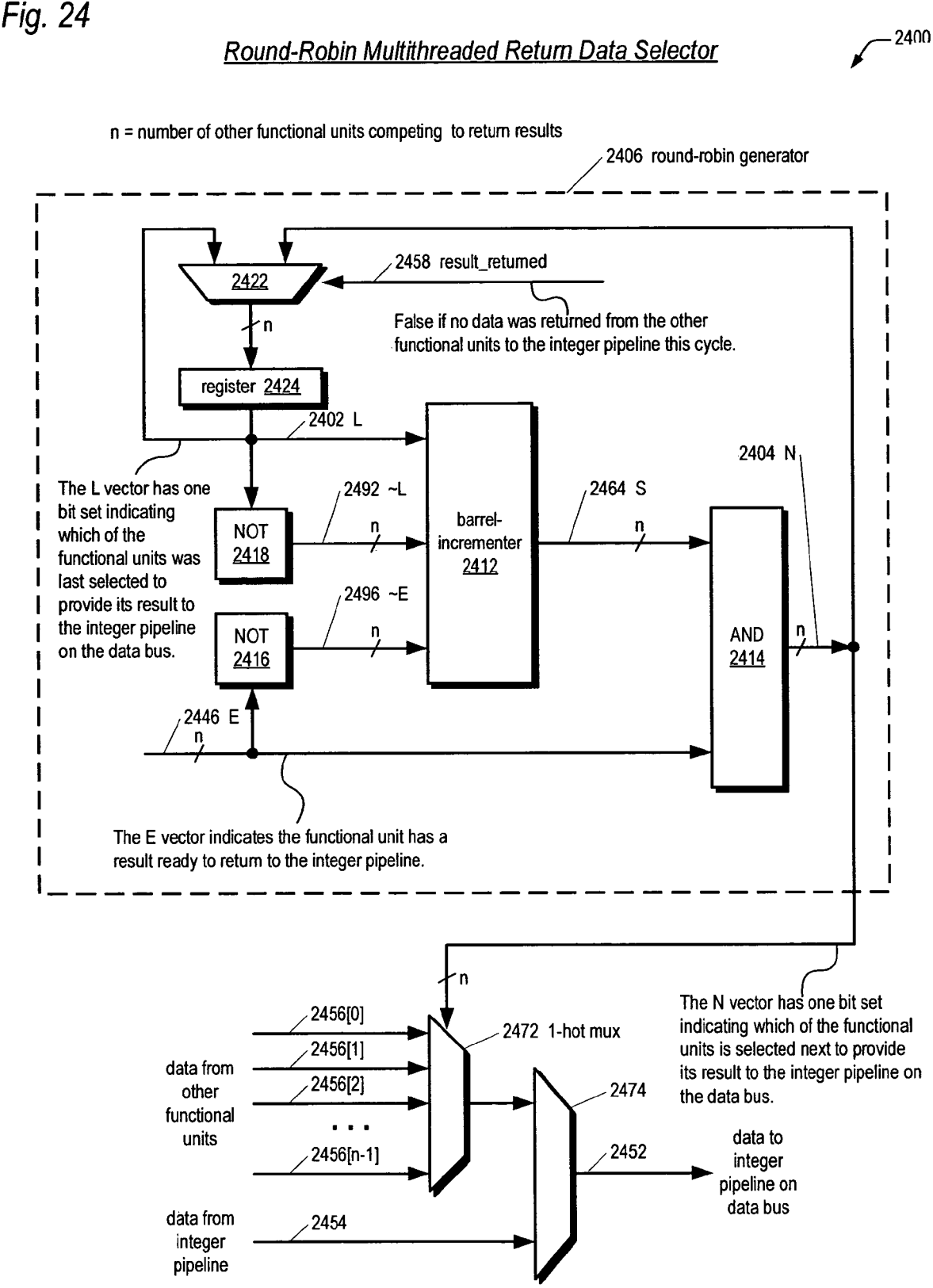
FIG. 24 is a block diagram illustrating a round-robin multithreaded return data selector for operation in the microprocessor pipeline of FIG. 1 according to the present invention.

Referring now to FIG. 24, a block diagram illustrating a round-robin multithreaded return data selector 2400 for operation in the write-back stage 116, execution pipeline 114, and/or register files 112 of FIG. 1 according to the present invention is shown. The return data selector 2400 incorporates a barrel-incrementer-based round-robin generator 2406. As discussed above, the microprocessor 100 may include a plurality of execution units 114, such as one or more multiply-divide units, floating-point units, load-store units, single instruction multiple data (SIMD) units, and/or coprocessors, that concurrently execute instructions of the multiple thread contexts to generate instruction results or data 2456. The various data 2456 from the functional units are provided back to the integer pipeline of the microprocessor 100. In one embodiment, the write-back stage 116 provides the various data 2456 from the functional units to the integer pipeline of the microprocessor 100. In one embodiment, the various data 2456 from the functional units are provided back to the register files 112.

The data 2456 of each of the functional units is provided to a mux 2472 of the return data selector 2400. Each clock cycle, the return data selector 2400 mux 2472 selects the data 2456 of one of the thread contexts to output to one input of a second mux 2474. In one embodiment, the integer pipeline also generates its own data 2454 that is provided as an input to the second mux 2474. If the integer pipeline has valid data 2454 to return, the second mux 2474 selects the integer pipeline data 2454 for its output 2452; otherwise, the second mux 2474 selects the data output by the first mux 2472, which is the selected data 2456 from the other functional units.

In the embodiment of FIG. 24, the mux 2472 is a 1-hot mux. The select control signal received by the mux 2472 is a 1-hot N vector 2404 similar to the N vector 2304 of FIG. 23. In particular, the N vector 2404 is an n-bit vector, where n is the number of functional units, and each of the functional units has a corresponding bit in the N vector 2404, and only one bit of the N vector 2404 is set corresponding to the functional unit selected for returning its data 2456 to the integer pipeline.

The return data selector 2400 also includes a third mux 2422 and a register 2424, which are similar to mux 2102 and register 2124 of FIG. 21. The mux 2422 receives as its two inputs an L vector 2402 and the output of register 2424. The L vector 2402 is similar to the L vector 2302 of FIG. 23. In particular, the L vector 2402 is an n-bit vector, where n is the number of functional units, and each of the functional units has a corresponding bit in the L vector 2402, and only one bit of the L vector 2402 is set corresponding to the functional units last selected for returning its data 2456 to the integer pipeline. The register 2424 receives and stores the output of the mux 2422. The mux 2422 also receives a result_returned control signal 2458 that is true if data 2456 of one of the functional units is returned during the current return cycle; otherwise, the result_returned control signal 2458 is false. The mux 2422 selects the L vector 2402 input if the result_returned control signal 2458 is true; otherwise, the mux 2422 selects the register 2424 output. Thus, mux 2422 and register 2424 work in combination to retain the old L vector 2402 value until data 2456 is returned by one of the functional units to the integer pipeline by the return data selector 2400. In particular, if mux 2452 selects data 2454 from the integer pipeline, then the result_returned signal 2458 is false, which causes the register 2424 to retain the old L vector 2402 value. Thus, advantageously, round-robin order is retained among the various functional units.

The fetch director 2400 also includes two sets of inverters 2416 and 2418, a barrel-incrementer 2412, and a set of AND gates 2414, similar to inverters 2316 and 2318, barrel-incrementer 2312, and AND gates 2314, respectively, of FIG. 23. The barrel-incrementer 2412 may be configured according to any of the embodiments of FIGS. 18A through 18D.

The first set of inverters 2418 receive the L vector 2402 output from the register 2424 and generate an n-bit ~L vector 2492. The second set of inverters 2416 receive an n-bit E vector 2446 and generate an n-bit ~E vector 2496. The E vector 2446 is similar to the E vector 2346 of FIG. 23, except that the E vector 2446 of FIG. 24 indicates that the corresponding functional unit has valid data 2456 to return to the integer pipeline, rather than that a thread context is enabled for instruction fetching.

The barrel-incrementer 2412 receives the L vector 2402, the ~L vector 2492, and the ~E vector 2496. The barrel-incrementer 2412 generates an S vector 2464, which is the sum of the L vector 2402 rotated left 1-bit and the Boolean AND of the ~E vector 2496 and the ~L vector 2492, according to the two embodiments of FIGS. 18A and 18B; alternatively, the barrel-incrementer 2412 generates an S vector 2464, which is the sum of the L vector 2402 rotated left 1-bit and the ~E vector 2496, according to the two embodiments of FIGS. 18C and 18D.

The AND gates 2414 perform the Boolean AND of the S vector 2464 and the E vector 2446 to generate the N vector 2404, which is provided as the 1-hot select control signal for the 1-hot mux 2472.

As may be observed, the return data selector 2400 advantageously selects among the thread contexts for returning data to the integer pipeline in a fair round-robin manner, and allows for disabled states (i.e., not all functional units may have valid data to be returned to the integer pipeline each selection cycle), and yet has complexity n, wherein n is the number of functional units, rather than complexity $n^2$, as in a conventional round-robin circuit supporting a variable number of enabled requesters. Advantageously, the return data selector 2400 scales linearly with the number of functional units, which may be of substantial importance in a microprocessor 100 that supports a relatively large number of functional units.

Referring now to FIG. 25, a block diagram illustrating a round-robin multithreaded fetch director 2500 for operation in the instruction fetcher 104 of FIG. 1 according to an alternate embodiment of the present invention is shown. The fetch director 2500 of FIG. 25 is different from the fetch director 2300 of FIG. 23 in that the fetch director 2500 of FIG. 25 prioritizes the thread contexts for fetching based on various criteria. In one embodiment, the thread contexts are prioritized in one of three priorities. The highest priority includes thread contexts having an empty instruction buffer 106 of FIG. 1; the middle priority is occupied, if at all, by the thread context that was last dispatched for execution by the dispatch scheduler 602 and not last selected for fetching by the fetch director 2500; the lowest priority is occupied by all other thread contexts. In the embodiment of FIG. 25, the highest priority is denoted priority 2, the middle priority is denoted priority 1, and the lowest priority is denoted priority 0.

The fetch director 2500 includes a first round-robin generator 2506A configured to generate a first N vector 2504A for fetch priority 2. The fetch director 2500 also includes a second round-robin generator 2506B configured to generate a second N vector 2504B for fetch priority 0. The N vectors 2504A and 2504B are 1-hot vectors similar to the N vector 2304 of FIG. 23. In particular, the N vectors 2504A and 2504B are n-bit vectors, where n is the number of thread contexts, and each of the thread contexts has a corresponding bit in the N vector 2504, and only one bit of the N vector 2504 is set corresponding to the thread context selected next for instruction fetching at the respective fetch priority. In one embodiment, each of the round-robin generators 2506 is similar to the round-robin generator 2306 of FIG. 23.

The first and second round-robin generators 2506 each receive an L vector 2302 similar to like-number L vector 2302 of FIG. 23. In particular, the L vector 2302 is an n-bit vector, where n is the number of thread contexts, and each of the thread contexts has a corresponding bit in the L vector 2302, and only one bit of the L vector 2302 is set corresponding to the thread context last selected for instruction fetching. In the embodiment of FIG. 25, the L vector 2302 is provided on the output of a register 2594.

The second round-robin generator 2506B also receives an E[0] vector 2346 similar to like-numbered E vector 2346 of FIG. 23. In particular, if a thread context's corresponding bit in the E[0] vector 2346 is set, this indicates that the corresponding thread context is enabled for instruction fetching. The first round-robin generator 2506A also receives an E[2] vector 2546. If a thread context's corresponding bit in the E[2] vector 2546 is set, this indicates that the corresponding thread context is enabled for instruction fetching and its respective instruction buffer 106 is empty. The first and second round-robin generators 2506 generate their respective N vectors 2504 based on their respective inputs.

The fetch director 2500 also includes a three-input mux 2596. The mux 2596 receives the first N vector 2504A and the second N vector 2504B as data inputs. The mux 2596 also receives a last_dispatched_TC vector 2586. The last_dispatched_TC vector 2586 is an n-bit 1-hot vector whose set bit indicates the thread context that was last dispatched for execution. The mux 2596 selects one of its data inputs specified by a selection control fetch_priority signal 2584 generated by control logic 2592. The output of mux 2596 is denoted fetch_TC signal 2588 and is provided to the input of register 2594, which latches in the fetch_TC 2588 value for provision as the L vector 2302 on the next clock. The fetch_TC signal

2588 is a 1-hot vector having one bit set to indicate which TC is selected to fetch instructions next.

The control logic 2592 generates the fetch_priority 2584 based on three inputs: the L vector 2302, the last_dispatched_TC vector 2586, and an instruction_buffer_empty vector 2582 that indicates which of the thread contexts, if any, have a respective instruction buffer 106 that is empty. In one embodiment, the instruction_buffer_empty signal 2582 is an n-bit vector comprising the empty signal 318 of FIG. 3 of each of the thread contexts. The fetch_priority 2584 indicates the highest of the three fetch priorities that has at least one thread context satisfying the condition of the fetch priority. A TC satisfies the conditions of fetch priority 2 if it has an empty instruction buffer 106 and is enabled for fetching (as indicated by the E[0] vector 2346). A TC satisfies the conditions of fetch priority 1 if it was the thread context last dispatched for execution (as indicated by last_dispatched_TC vector 2586), was not the last fetched thread context (as indicated by the L vector 2302), and is enabled for fetching (as indicated by the E[0] vector 2346). All other thread contexts that are enabled for fetching satisfy fetch priority 0. Advantageously, the first round-robin generator 2506A causes the thread contexts within the highest fetch priority to be fetched in a round-robin manner if multiple thread contexts satisfy the conditions of the highest fetch priority; and the second round-robin generator 2506A causes the thread contexts within the lowest fetch priority to be fetched in a round-robin manner if multiple thread contexts satisfy the conditions of the lowest fetch priority.

The fetch director 2500 also includes a mux 2372 similar to like-numbered mux 2372 of FIG. 23. Each clock cycle, the fetch director 2500 mux 2372 selects one of the thread context fetch addresses 2356 to provide to the instruction cache 102 to select a cache line of instruction bytes specified by the L vector 2302 of FIG. 25 similar to the operation of mux 2372 of FIG. 23.

Although the present invention and its objects, features, and advantages have been described in detail, other embodiments are encompassed by the invention. For example, although embodiments have been described in which embodiments of a round-robin generator have been employed in a dispatch scheduler, a fetch director, and/or a return data selector, the round-robin generator embodiments are not limited to those uses. On the contrary, the round-robin generators may be employed in any application in which multiple requesters request access to a shared resource, and some of the requestors may not be requesting each selection cycle, i.e., may be disabled during the selection cycle. Furthermore, the round-robin generators may be employed in applications in which each requester requests access at a priority level among multiple priority levels, and one of the multiple requestors at the highest priority level must be chosen in a fair manner. Furthermore, although round-robin generator embodiments have been described that are built around a barrel-incrementer, and the barrel-incrementer has been described as using particular types of adders, such as full-adders or half-adders of various widths, the barrel-incrementer may be constructed using other types of adders and other widths. Finally, although embodiments have been described with four PM_TC_priority 652 levels, any number of priority levels may be employed.

While various embodiments of the present invention have been described above, it should be understood that they have been presented by way of example, and not limitation. It will be apparent to persons skilled in the relevant computer arts that various changes in form and detail can be made therein without departing from the spirit and scope of the invention.

For example, in addition to using hardware (e.g., within or coupled to a Central Processing Unit ("CPU"), microprocessor, microcontroller, digital signal processor, processor core, System on Chip ("SOC"), or any other programmable device), implementations may also be embodied in software (e.g., computer readable code, program code, instructions and/or data disposed in any form, such as source, object or machine language) disposed, for example, in a computer usable (e.g., readable) medium configured to store the software. Such software can enable, for example, the function, fabrication, modeling, simulation, description and/or testing of the apparatus and methods described herein. For example, this can be accomplished through the use of general programming languages (e.g., C, C++), GDSII databases, hardware description languages (HDL) including Verilog HDL, VHDL, and so on, or other available programs, databases, and/or circuit (i.e., schematic) capture tools. Such software can be disposed in any known computer usable medium including semiconductor, magnetic disk, optical disc (e.g., CD-ROM, DVD-ROM, etc.) and as a computer data signal embodied in a computer usable (e.g., readable) transmission medium (e.g., carrier wave or any other medium including digital, optical, or analog-based medium). As such, the software can be transmitted over communication networks including the Internet and intranets.

It is understood that the apparatus and method described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the above-described exemplary embodiments, but should be defined only in accordance with the following claims and their equivalents.

I claim:

1. An apparatus having a multithreading microprocessor, the microprocessor including circuitry to dispatch instructions to an execution pipeline that concurrently executes N threads each having a priority, the priority being one of P priorities, the apparatus comprising:

P round-robin vectors, corresponding to the P priorities, each having N bits corresponding to the N threads, each being a 1-bit left-rotated and subsequently sign-extended version of an N-bit input vector, said input vector having a single bit true corresponding to a last one of the N threads selected for dispatching at a corresponding one of the P priorities;

N P-input multiplexers, each coupled to receive a corresponding one of said N bits of each of said P round-robin vectors, each configured to select for output one of said P inputs specified by the corresponding thread priority; and selection logic, coupled to receive an instruction from each of the N threads and to select for dispatching to the execution pipeline one of said N instructions corresponding to one of the N threads having a dispatch value greater than or equal to any of the N threads left thereof in said N-bit input vectors;

wherein said dispatch value of each of the N threads comprises a least-significant bit equal to said corresponding P-input multiplexer output, a most-significant bit that is true if said corresponding instruction is dispatchable, and middle bits comprising the priority of the thread.

2. The apparatus as recited in claim 1, wherein the priority of each of the N threads is dynamically updatable among the P priorities.

3. The apparatus as recited in claim 1, wherein said dispatch value middle bits further comprise at least one bit indicating a likelihood said corresponding instruction will stall in the execution pipeline if dispatched thereto.

4. The apparatus as recited in claim 1, further comprising:
P round-robin circuits, coupled to receive said P input vectors, and configured to generate said P round-robin vectors, and coupled to provide said P N-input vectors to said N P-input multiplexers.

5. The apparatus as recited in claim 4, wherein each of said P round-robin circuits corresponding to the P priorities comprises:
a storage element configured to store said input vector;
wherein if said one of said N instructions selected by said selection logic has a priority other than said corresponding priority, then said storage element retains a current value of said input vector;
wherein if said one of said N instructions selected by said selection logic has said corresponding priority, then said storage element receives a new value of said input vector.

6. The apparatus as recited in claim 4, wherein each of said P round-robin circuits corresponding to the P priorities comprises:
a sign-extender, coupled to sign-extend said 1-bit left-rotated N-bit input vector to generate said corresponding round-robin vector.

7. The apparatus as recited in claim 1, wherein said selection logic comprises:
a plurality of greater-than-or-equal comparators, coupled to receive said dispatch values for the N threads, and to generate an indication of said one of the N threads having a dispatch value greater than or equal to any of the N threads left thereof in said N-bit input vectors.

8. The apparatus as recited in claim 7, wherein said selection logic comprises:
a tree of multiplexers, coupled to said comparators and coupled to receive said N instructions, configured to select said one of said N instructions corresponding to said one of the N threads indicated by said indication generated by said plurality of greater-than-or-equal comparators.

9. The apparatus as recited in claim 1, wherein said corresponding instruction is dispatchable if an instruction buffer from which said instruction is dispatched is non-empty.

10. The apparatus as recited in claim 1, wherein said corresponding instruction is dispatchable if said corresponding one of the N threads is unblocked from executing instructions.

11. The apparatus as recited in claim 1, wherein said corresponding instruction is dispatchable if said corresponding one of the N threads is in an active state.

12. The apparatus as recited in claim 1, wherein said corresponding instruction is dispatchable if said corresponding one of the N threads is unstalled in the execution pipeline.

13. The apparatus as recited in claim 1, wherein the instructions are received from N instruction buffers associated with corresponding ones of the N threads.

14. A method for dispatching instructions to an execution pipeline in a multithreading microprocessor that concurrently executes N threads each having a priority, the priority being one of P priorities, the method comprising:
generating P round-robin vectors, corresponding to the P priorities, each having N bits corresponding to the N threads, each being a 1-bit left-rotated and subsequently sign-extended version of an N-bit input vector, the input vector having a single bit true corresponding to a last one of the N threads selected for dispatching at a corresponding one of the P priorities;
for each of the N threads, receiving a corresponding one of the N bits of each of the P round-robin vectors, and selecting as a round-robin bit one of the P received corresponding one of the N bits of each of the P round-robin vectors specified by the corresponding thread priority; and
receiving an instruction from each of the N threads, and selecting for dispatching to the execution pipeline one of the N instructions corresponding to one of the N threads having a dispatch value greater than or equal to any of the N threads left thereof in the N-bit input vectors;
wherein the dispatch value of each of the N threads comprises a least-significant bit equal to the round-robin bit of the thread, a most-significant bit that is true if the corresponding instruction of the thread is dispatchable, and middle bits comprising the priority of the thread.

15. The method as recited in claim 14, further comprising:
dynamically updating the priority of each of the N threads among the P priorities.

16. The method as recited in claim 14, wherein the dispatch value middle bits further comprise at least one bit indicating a likelihood the corresponding instruction will stall in the execution pipeline if dispatched thereto.

17. The method as recited in claim 14, further comprising:
receiving the P input vectors, and generating the P round-robin vectors, and providing the P N-input vectors to the N P-input multiplexers.

18. A computer program product for use with a computing device, the computer program product comprising:
a computer readable storage medium, having computer readable program code embodied in said readable storage medium, for causing an apparatus for dispatching instructions to an execution pipeline in a multithreading microprocessor that concurrently executes N threads each having a priority, the priority being one of P priorities, said computer readable program code comprising:
first program code to cause the generation of P round-robin vectors, corresponding to the P priorities, each having N bits corresponding to the N threads, each being a 1-bit left-rotated and subsequently sign-extended version of an N-bit input vector, said input vector having a single bit true corresponding to a last one of the N threads selected for dispatching at a corresponding one of the P priorities;
second program code to cause the generation of N P-input multiplexers, each coupled to receive a corresponding one of said N bits of each of said P round-robin vectors, each configured to select for output one of said P inputs specified by the corresponding thread priority; and
third program code to cause the generation of selection logic, coupled to receive an instruction from each of the N threads and to select for dispatching to the execution pipeline one of said N instructions corresponding to one of the N threads having a dispatch value greater than or equal to any of the N threads left thereof in said N-bit input vectors, wherein said dispatch value of each of the N threads comprises a least-significant bit equal to said corresponding P-input multiplexer output, a most-significant bit that is true if said corresponding instruction is dispatchable, and middle bits comprising the priority of the thread.

19. The computer program product of claim 18, wherein said computer readable program code further comprises:

fourth program code to cause the generation of P round-robin circuits, coupled to receive said P input vectors, and configured to generate said P round-robin vectors, and coupled to provide said P N-input vectors to said N P-input multiplexers.

20. The computer program product of claim 19, wherein said computer readable program code further comprises:

fifth program code to cause the generation of a storage element configured to store said input vector, wherein if said one of said N instructions selected by said selection logic has a priority other than said corresponding priority, then said storage element retains a current value of said input vector, wherein if said one of said N instructions selected by said selection logic has said corresponding priority, then said storage element receives a new value of said input vector.

21. The computer program product of claim 19, wherein said computer readable program code further comprises:

fifth program code to cause the generation of a sign-extender, coupled to sign-extend said 1-bit left-rotated N-bit input vector to generate said corresponding round-robin vector.

22. The computer program product of claim 18, wherein said computer readable program code further comprises:

fourth program code to cause the generation of a plurality of greater-than-or-equal comparators, coupled to receive said dispatch values for the N threads, and to generate an indication of said one of the N threads having a dispatch value greater than or equal to any of the N threads left thereof in said N-bit input vectors.

23. The computer program product of claim 22, wherein said computer readable program code further comprises:

fifth program code to cause the generation of a tree of multiplexers, coupled to said comparators and coupled to receive said N instructions, configured to select said one of said N instructions corresponding to said one of the N threads indicated by said indication generated by said plurality of greater-than-or-equal comparators.

24. A multithreading microprocessor that concurrently executes N threads each having a priority, the priority being one of P priorities, comprising:

an execution pipeline, for executing the instructions dispatched thereto;

P round-robin vectors, corresponding to the P priorities, each having N bits corresponding to the N threads, each being a 1-bit left-rotated and subsequently sign-extended version of an N-bit input vector, said input vector having a single bit true corresponding to a last one of the N threads selected for dispatching at a corresponding one of the P priorities;

N P-input multiplexers, each coupled to receive a corresponding one of said N bits of each of said P round-robin vectors, each configured to select for output one of said P inputs specified by the corresponding thread priority; and selection logic, coupled to receive an instruction from each of the N threads and to select for dispatching to said execution pipeline one of said N instructions corresponding to one of the N threads having a dispatch value greater than or equal to any of the N threads left thereof in said N-bit input vectors;

wherein said dispatch value of each of the N threads comprises a least-significant bit equal to said corresponding P-input multiplexer output, a most-significant bit that is true if said corresponding instruction is dispatchable, and middle bits comprising the priority of the thread.

* * * * *